(12) United States Patent
Skoog et al.

(10) Patent No.: US 11,282,117 B2
(45) Date of Patent: Mar. 22, 2022

(54) SYSTEM FOR AUTOMATED TRACKING AND MANAGEMENT OF FUNDRAISING ACTIVITIES

(71) Applicant: Venture Expeditions, Burnsville, MN (US)

(72) Inventors: Ryan Skoog, Lakeville, MN (US); Aaron Smith, Rosemount, MN (US); Paul Hurckman, Minneapolis, MN (US)

(73) Assignee: Venture, Burnsville, MN (US)

( * ) Notice: Subject to any disclaimer, the term of this patent is extended or adjusted under 35 U.S.C. 154(b) by 936 days.

(21) Appl. No.: 14/935,242

(22) Filed: Nov. 6, 2015

(65) Prior Publication Data

US 2017/0132673 A1    May 11, 2017

(51) Int. Cl.
  *G06Q 30/02*  (2012.01)
  *G06Q 50/00*  (2012.01)
  *G06Q 20/10*  (2012.01)

(52) U.S. Cl.
  CPC ........ *G06Q 30/0279* (2013.01); *G06Q 20/10* (2013.01); *G06Q 50/01* (2013.01)

(58) Field of Classification Search
  CPC ................................. G06Q 30/0279
  USPC ............................................. 705/39
  See application file for complete search history.

(56) References Cited

U.S. PATENT DOCUMENTS

| | | | | |
|---|---|---|---|---|
| 5,621,640 A * | 4/1997 | Burke | .................... | G06Q 20/04 235/375 |
| 8,473,421 B2 * | 6/2013 | Scalisi | .................... | G06Q 20/10 705/319 |
| 8,965,410 B2 * | 2/2015 | Clark | .................... | H04W 4/021 455/456.3 |
| 2002/0049816 A1 * | 4/2002 | Costin, IV | ......... | G06Q 30/0601 709/206 |
| 2005/0021353 A1 * | 1/2005 | Aviles | ................ | G06Q 30/0279 705/34 |
| 2006/0122856 A1 | 6/2006 | Rushton et al. | | |
| 2008/0162349 A1 | 7/2008 | Pratt et al. | | |
| 2010/0145812 A1 | 6/2010 | Worth | | |

(Continued)

*Primary Examiner* — Mike Anderson
*Assistant Examiner* — Paul R Kloberg
(74) *Attorney, Agent, or Firm* — Craig J. Lervick; Larkin Hoffman Daly & Lindgren, Ltd.

(57) ABSTRACT

A fundraising coordination system which includes communication capacities with several different components or subsystems, including mobile devices and tracking devices, allows for fundraising activities to be carried out in an efficient and effective manner. The coordination system is configured with several cooperating modules including tracking module (in communication with a tracking device), a communication and promotion module, an event coordination module, a donations/pledges module, and a collections module. The various modules allow for fundraising activities, such as peer-to-peer and/or institutional fundraising, to be carried out in combination with tracking devices, thus providing efficiency and effectiveness. The use of tracking devices (e.g. gps tracking devices) makes the system more efficient by automatically tracking participant activities. Several modules may exist on either a mobile device, or a computing system, however overall communication capabilities are provided so automated tasks can be easily carried out.

8 Claims, 58 Drawing Sheets

(56) References Cited

U.S. PATENT DOCUMENTS

| | | | |
|---|---|---|---|
| 2010/0241476 A1* | 9/2010 | Fitzpatrick | G06Q 10/10 |
| | | | 705/7.18 |
| 2011/0264521 A1* | 10/2011 | Straka | G06Q 30/0251 |
| | | | 705/14.49 |
| 2011/0295749 A1* | 12/2011 | Scalisi | G06Q 20/10 |
| | | | 705/44 |
| 2012/0023025 A1* | 1/2012 | Lin | G06Q 20/401 |
| | | | 705/75 |
| 2012/0059759 A1 | 3/2012 | Bagarella et al. | |
| 2012/0116958 A1* | 5/2012 | Soholt | G06Q 30/0279 |
| | | | 705/39 |
| 2012/0197815 A1 | 8/2012 | Cameron et al. | |
| 2013/0218655 A1 | 8/2013 | Tietzen et al. | |
| 2014/0149287 A1 | 5/2014 | Mafolasire | |
| 2014/0229397 A1 | 8/2014 | Fink | |
| 2014/0370972 A1* | 12/2014 | Mullen | G06Q 50/34 |
| | | | 463/25 |
| 2015/0019273 A1 | 1/2015 | Grosz | |
| 2015/0371290 A1* | 12/2015 | Hexter | G06Q 30/0279 |
| | | | 705/329 |
| 2016/0203497 A1* | 7/2016 | Tietzen | G06Q 30/0226 |
| | | | 705/14.27 |

* cited by examiner

420

SIGN UP WITH EMAIL                                              X

FIRST NAME             LAST NAME              SUBMIT

EMAIL                  CREATE A PASSWORD

Legal information porttitor sapien turpis,sit amet malesuada sem varius vel.
Aliquam magna justo,placerat sed feugiat et, sollicitudin sed elit. **Terms of
Service and Privacy Policy**

FIG. 4

FUNDRAISER DETAILS

Title

Let's Feed 1,000 People!  — 16 Remaining  — 512

Subtitle (optional)

Vivamus non ullamcorper metus, id feugiat sem.
Maecenas varius, est non pellentesque porta.  — 8 Remaining  — 514

Start Date    End Date    Total Days

June 18, 2015    June 18, 2015 — 516    30

Start and end dates chosen by your team.

I have been very lucky over the past few years to meet a lot of of people who have made the long journey from North Korea to safety and freedom in South Korea, the US and elsewhere.

I've met North Koreans days after they left their homeland, people who have just started their lives in South korea, and some who are well into their resettlement and are probably more established and adjusted to South... Korean society than I'll ever be.

I've been very lucky over the past few years to meet a lot of people who have made the long journey from North korea to safety and freedom in South Korea, the US and elsewhere.

I've met North Koreans days after they left their homeland, people who have just started their lives in South Korea, and some who are well into their resettlement and are probably more established and adjusted to South... Korean society than I'll ever be.

710

About International Justice Mission

We are a global organization that protects the poor from violence in the developing world.

Our global team includes hundreds of lawyers, investigators, social workers, community activists and other professionals at work in nearly 20 communities.

We rescue individuals, one by one. That's where our work starts. But that's not where it ends.

Contact me

I have been very lucky over the past few years to meet a lot of of people who have made the long journey from North Korea to safety and freedom in South Korea, the US and elsewhere.

I've met North Koreans days after they left their homeland, people who have just started their lives in South korea, and some who are well into their resettlement and are probably more established and adjusted to South... Korean society than I'll ever be.

I've been very lucky over the past few years to meet a lot of people who have made the long journey from North korea to safety and freedom in South Korea, the US and elsewhere.

Members

Lorem ipsum dolor sit amet, consectetur adipiscing elit. Morbi malesuada risus in sem laoreet semper. Ut quis purus ut magna pulvinar fringilla.

Top Althletes [See All]

[CURRENT] ALL TIME

| ATHLETE | ATHLETE/DONOR | ATHLETE/DONOR |
|---|---|---|
| Terrence O'Filbert | Terrence O'Filbert | Terrence O'Filbert |
| 106  $1.6k  3.5k | 106  $1.6k  3.5k | 106  $1.6k  3.5k |

Top Donors [See All]

[CURRENT] ALL TIME

| DONOR | ATHLETE/SPONSOR | FUNDRAISER |
|---|---|---|
| Terrence O'Filbert | Terrence O'Filbert | Terrence O'Filbert |
| 0  $1.6k  3.5k | 0  $1.6k  3.5k | 106  $1.6k  3.5k |

FIG. 13(Continued)

PER-MILE PLEDGE | ONE-TIME DONATION

I will give

[ $1.00 ] per mile — 1412

$150.00 — Estimated total based on Gerald's goal of 150 miles

300 — Estimated meals provided

300 — Estimated lives impacted

☐ I agree to be charged monthly until my pledge is complete — 1416

[ $30.00 ] Max donation per month — 1414

Want to become a sponsor of this fundraiser? Click here!

[ Next > ]

— 1410

---

PER-MILE PLEDGE | ONE-TIME DONATION

I will give

[ $35.00 ] — 1422

100 — Estimated meals provided

100 — Estimated lives impacted

☐ Matching gift what's this?

Want to become a sponsor of this fundraiser? Click here!

[ Next > ]

SYSTEM FOR AUTOMATED TRACKING AND MANAGEMENT OF FUNDRAISING ACTIVITIES

BACKGROUND

Charitable and/or nonprofit organizations fulfill several valuable and immeasurable roles in today's society. The work done by these organizations and the results achieved affect the lives of thousands, if not millions of people daily. As is well known, to carry out their mission these organizations rely on funds from many different sources, including fundraising activities, direct donations, corporate donations, grants, endowments, organized fundraising events, etc. In addition, these organizations look to minimize costs wherever possible, so that a vast majority of funds raised are directed to the beneficiaries or goals of the organization.

Fundraising activities take on many different forms, from small neighborhood efforts, to group efforts, to large events. In the process of organizing and administering these fundraising activities, several tasks and steps are typically involved. As examples, some of these tasks include development of an event idea, promotion, organization of volunteers, reservation of facilities, and overall coordination required to carry out the fundraising event. To make the event successful, the diligent administration of the fundraising and collection activities is also a critically important task. In addition, promotion, advertising and participation are also critical factors which all contribute to the success of these events and the ultimate ability of the organization to reach their fundraising goals.

Many organized fundraising events involve physical activities of various types. As one particular example, a bike riding event has become a somewhat popular and common fundraising event. Other activities may include running, swimming, walking, hiking, playing volleyball, dancing, etc. In the bike riding example, participants or athletes agree to ride their bike for particular distances. To raise funds, these participants will typically arrange for donations based upon the distance they ride. For example, a particular participant will seek donations or pledges based upon a particular distance (e.g., $10.00 per mile). Thus, when the participant rides a predetermined distance (e.g., 100 miles), the donor is thus obligated to pay the amount pledged, which can be determined based upon the distance completed (e.g., $10.00 per mile×100 miles=$1,000.00). Naturally, it is also beneficial to provide accommodations for different types of donations, such as flat rate amounts, non-cash contributions, or other types of donations.

As the example above illustrates, there is a need to coordinate activities on both the participant side and the administration side of the above-referenced fundraising activities. On the administration side, there is a need to coordinate a roster of participants, facilities, promotional activities, advertising, accommodations for participants, and pledge activities. Tracking of pledges and the determination of final donation amounts is also an administrative task that can be cumbersome and involved (e.g. a amounts due after a participant has completed all or some portion of the biking event mentioned above). Typically, this requires maintaining records of all participants involved and the pledges related to their activities, verifying the completion of activities by the participants, and calculating donation amounts (whether final amounts or, pending progress based on partially completed activities). Clearly, this involves the collection and maintenance of information from several sources, which could be constantly changing. In addition, the collection of donations is occasionally an unpleasant but necessary activity, which can also be time consuming and cumbersome. From a participant side, it is necessary to provide the ability to define or set up a fundraising goal, accommodate enrollment, assist with the solicitation of donations, keep a record of the particular activity involved, and carry out the collection of donations. Again, this involves considerable amounts of record keeping and the management of information by the participant.

In addition to coordinating the multiple tasks or activities that may be involved, the promotion and advertising of events is also critical. Recently, social media has become an integral part of these promotion activities. Both individuals and organizations can easily promote activities utilizing social media, without a great deal of additional expense or involvement. Naturally, this type of promotion utilizes both traditional online capabilities (e.g. web based programs) and the use of mobile applications. Thus, it is beneficial to take advantage of these resources.

SUMMARY

To coordinate and carry out all the different aspects of various fundraising activities, the fundraising coordination system provides a method and tool to efficiently manage, promote and to efficiently organize activities of charitable organizations, so that fundraising activities and related administration are efficiently and effectively carried out. In addition, the system provides the benefits of additional synergy and collaboration, by making large amounts of information quickly available to various users of different types. In this particular context, users generally will include administrators who are tasked with organizing and administering events, participants, donors, sponsors, and the organizations themselves. Each of these users have different interests, responsibilities, and/or tasks necessary for effectively and efficiently carrying out fundraising activities.

As further outlined below, an organized and overall coordinated approach is beneficial to allow fundraising activities to be carried out efficiently and effectively. In this regard, technology and tools are provided by the fundraising coordination system which allows for the efficient administration of all necessary tasks. One primary tool allows for the efficient administration of events themselves, including organization and promotion activities. An aspect of this event administration is the ability of the system to track and monitor the status, progress and/or completion of activities. For example, when an event involves an activity of some type, a tracking device is used to monitor the participant's activities, and automatically record all relevant information. Using the biking example mentioned above, this tracking device (such as a GPS tracking device) will monitor the participant's activities (i.e. distance traveled) as they ride their bike. This information can then be used to easily and efficiently determine donation amounts, and track progress toward goals. Further, the system can then make use of this information to publicize activities, and promote the progress of individual participants. Additionally, the system and tools provided allow for the efficient follow-up activities, including the coordinated collection of pledges and donations. Ideally, these activities can take place in an automated manner, thus avoiding the need for extensive human interaction.

Further advantages of the organized system are set forth below. Several of these additional advantages include the ability to easily communicate and promote events, the collaborative or synergistic effect that additional promotion and information will have on many different users, the speed in which all necessary tasks are completed and overall efficiency involved.

BRIEF DESCRIPTION OF THE DRAWINGS

Further advantage of the system and tools provided will be seen from reading the following description, in conjunction with the drawings, in which.

DESCRIPTION OF THE PREFERRED EMBODIMENTS

Figure 1:
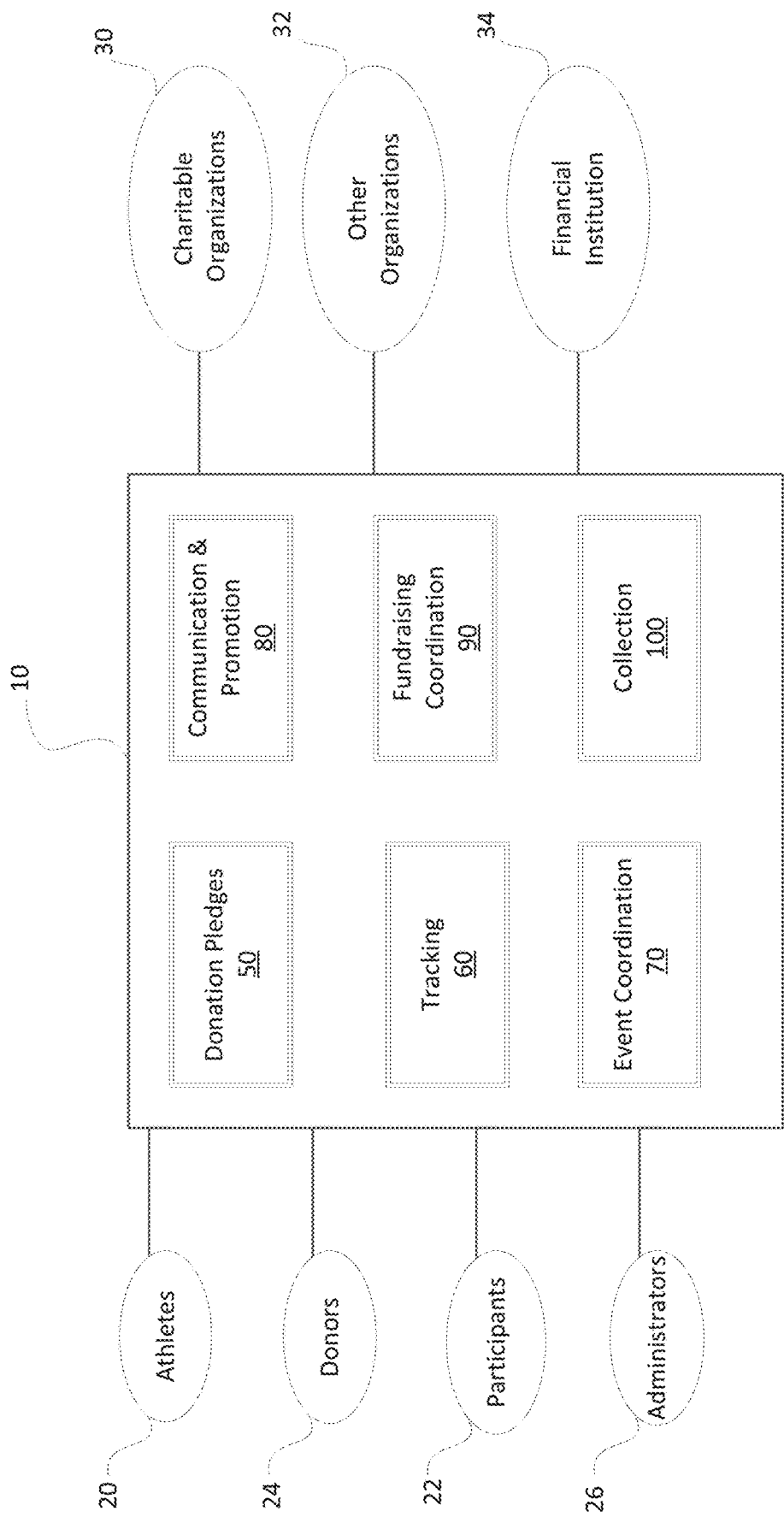
FIG. 1 is a schematic diagram of the present system.

As mentioned above, the fundraising coordination system 10 creates an organized approach to fundraising activities, and more specifically to an organization's fundraising activities. FIG. 1 schematically illustrates the fundraising coordination system 10, and several exemplary inputs involved. As shown, fundraising coordination system 10 includes various modules or components therein, designed to coordinate different aspects of fundraising activities. As also illustrated, several different organizations will have inputs, and/or communicate with system 10.

Again, fundraising coordination system 10 will include several modules or components to coordinate various activities, including a donations/pledges coordination module 50, an activity tracking module 60, an event coordination module 70, a communication and promotion module 80, a fundraising coordination module 90, and a collection module 100. Naturally, other modules and components may be included in the system 10, each designed to efficiently accommodate a different function or aspect of the overall coordination activities typically contemplated by non-profit or charitable organizations. As described in further detail below, the coordination of these modules provides the ability to carry out many types of fundraising activities, including peer-to-peer fundraising activities, which also makes specific use of activity tracking devices to automate several activities and create a very efficient and effective system. This capability is particularly helpful with distance or time-based fundraising activities (e.g. running, biking, swimming, walking, dancing, playing games, etc.) which involve pledges for a unit of distance or time. The correlation of activity tracking and fundraising administration conveniently allows the system to easily calculate donation amounts based upon the distance traveled (as tracked by integrated tracking devices) or time spent carrying out an activity (as tracked by an activity monitor and related timing device). This information can then be immediately available for other purposes, such as progress tracking or promotion.

As mentioned, several different entities will be involved, will have inputs, or will receive communication from system 10. These entities will likely include athletes 20, other participants 22, donors 24, and administrators 26, but also could organizations such as churches, fraternal organizations, companies, company subgroups, etc. These entities play different roles, each having the need to be involved with system 10. More importantly each entry will also benefit from the capabilities of system 10. For example, a charitable organization 30 is one prominent entity, which will obviously have a need to coordinate with system 10. As further discussed below, related organizations 32 will also benefit from the capabilities of system 10. Lastly, related financial institutions 34 will also benefit from communication or coordination with system 10. As described in further detail below, the involvement by financial institutions allows system 10 to provide automated payment capabilities, where payments can be easily and quickly processed without the need for further tracking and follow up by any individuals involved. In the preferred system, each of the participants, users, organizations, etc. are identified as an "entity". The system is then configured to track and identify these entities, as well as the ability to organize each entity in different categories and to manage the relationships between the various entities. In this manner, related information is easily updated and kept current. Maintaining appropriate relationships will cause changes to any one of the entity records to automatically cause changes to related entity records. As one example, an athlete or participant record will often be related to a team record. Changes to the entity record for the athlete (e.g. an update to donation amounts), will thus be easily reflected in the team entity record (e.g. an update to the collective donation amount of the team). Naturally, several other relationships will exist, as further outlined below.

As will be described in further detail below, each "entity" will have certain identities and characteristics. In many cases, these identities and characteristics will interact with other entities, thus providing consistency, and the ability to easily update all information. Further, an entity record is maintained within the system to further help in the coordination of activities, and the exchange of information required. Generally speaking, each entity will include a title or classification, with these titles or classifications defining the type of entity involved, thus coordinating how information related to how that entity is managed. For example, the entity may be an athlete or participant, who is involved in fundraising activities and may be a part of a team. Similarly, the entity may be a donor or sponsor, who is contributing funds. The entity may also be a charity, organization, team, a cause, or a campaign. (Also note that a campaign can be characterized as an event or an activity, which is further discussed below.) To provide coordination, this entity type or category is characterized by a title which is assigned to each entity within the system. In addition, the entity will have an identity or name. Following this same example, an athlete or participant (e.g. Joe Smith) will be identified as an entity and provided with the title athlete or participant. This athlete or participant title will be associated with the Joe Smith entity on each occasion. Further, the identity or name (Joe Smith) is also associated as will be appreciated, each entity is a category or object in it of itself, however the entity may have members or other entities which are included in its membership. For example, an athlete or participant may be a member of a team. Similarly, a donor will have a separate entity record, but may also be a part of an organization. Numerous correlations or relationships are possible.

Within the online or mobile user interface, each entity is typically represented with an identity card, which will identify or establish the identity of the particular entity, and will provide additional information. Part of this information is the progress or status of the various activities in which the entity is involved. As will be discussed further below in relation to campaigns, this will typically involve current progress against fundraising goals.

As suggested above, the concept of a campaign is central to the overall operation of the system 10. As contemplated, the campaign is an activity or fundraising goal of some type. As one common example, the campaign may include a bike event, scheduled to occur at a particular point in time with specific goals involved. More specifically, this could include biking a particular distance on a particular date. Using this example, it is contemplated that participants/athletes, a charitable organization, teams, and donors would be part of this particular campaign. As mentioned above, a campaign is an entity in and of itself within system 10, but will also have appropriate links and ties other entities.

In one preferred embodiment, system 10 is utilized to coordinate the fundraising activities of charitable organization 30 in a very directed, calculated and efficient manner. In this particular embodiment, a fundraising activity is defined by its previously determined cause goal or objective. Preferably, a measureable impact unit is initially defined, which directly correlates to a benefit or effect of the contemplated fundraising activity. In some cases, this may relate specifically to a monetary value. In other instances, the monetary value is further translated into some specific activity or event which impacts the lives of others. For example, the measureable impact unit may be the number of meals provided to various needy individuals. In this example, each dollar raised by the fundraising activity may equate to four meals for the hungry, thus dollar amounts are quickly translated to this benefit (e.g. meals), as it relates to the defined goal. In an alternative example, the goal may involve the building of schools in impoverished nations and the measurable impact unit may be one school building. Thus, some dollar amount of the fundraising activity is determined to correlate to one school so that fundraising activities are all directly focused on the desired goals. In yet another activity, the measurable impact unit may be the digging and establishing wells or water sources in certain parts of the country. Again, a dollar amount is tied to this activity, such as some amount equating to a single well. That said, although dollar amounts are involved, there is a more tangible/meaningful goal set and identified by all parties involved, and the system 10 provides the tools for all involved to quickly relate activities to these goals.

Figure 2:
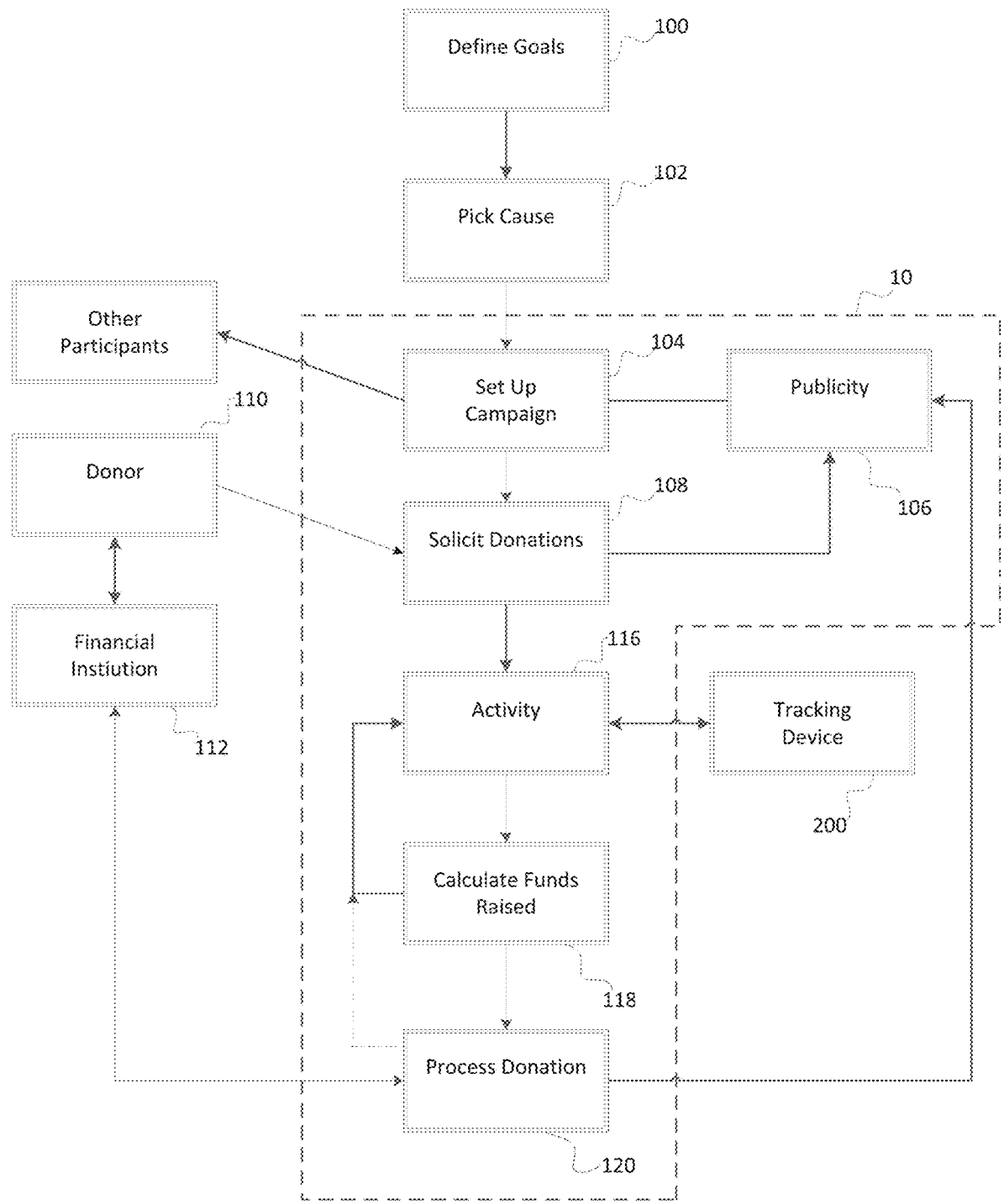
FIG. 2 is an overall flow chart illustrating one embodiment of typical participant activity.

In FIG. 2, a high level flowchart generally illustrates the applicability of the present system to one exemplary fundraising activity. In this illustrative example, an athlete or participant has the desire to run a particular distance over a particular period of time as a fundraising activity to assist the desired cause. For example, the athlete may desire to run 300 miles in a four month time period. Thus, as set forth in FIG. 2, the process starts at step 100 where the participant's goals are determined or established. Next, the participant will pick a cause. This will typically involve the identification of a charity or activity which will benefit others, and identification of the measurable impact unit discussed above. Having a goal and cause determined, the user can then set up their campaign within system 10. As discussed herein, a particular user may follow an individual goal, as the above example suggests. This goal, or "challenge", is typically selected by an individual, and may incorporate activities of others. A "campaign" is typically a fundraising activity or event, with a defined time period. Thus, part of an individual challenge may involve participation in a specific campaign (e.g. participation in a walk-a-thon).

As will generally be discussed below, this process will allow the user to define and create a written summary of their challenge or campaign, outline the benefits, possibly add personalized information related to the cause, etc. The ability to maintain these tools allows the system 10 to be used to further publicize the participant's desired activities. In one embodiment, this publicity is achieved automatically through several pre-established communication channels such as email listings, on-line publications, social media, etc. Although the reference above is to a user who wishes to carry out a particular activity, it is clearly contemplated that any group, organization, team, etc. can establish a challenge or campaign as outlined above. By identifying a campaign as an entity, as discussed above, it is possible for information related to the campaign to be maintained, while also including the necessary correlation with other entities.

Returning to FIG. 2, a next step may involve the participant soliciting donations at step 108. This activity will typically take place in a combined manner, with the individual carrying out those activities they deem most beneficial. To support these activities the system 10 also includes communication tools such as the ability to generate email messages, text messages, etc., thus allowing a user to easily solicit these donations. This also involves the publicity activities 106 which are contemplated. Obviously, donors 110 are a critical element of the overall process. System 10 also allows donors to easily input and communicate their donations using a prescribed interface. Again, each donor 110 is established as an entity, thus allowing access to and coordination with the system. As part of this process, donor 110 may provide additional information and/or coordinate with their financial institution 112 so that automatic payments can be set up.

Ideally, the participant will carry out or undertake the activity they have defined here as the next step (e.g., start the process of running). In this example, the participant will proceed to run at different times and over various distances. In order to further automate and provide efficiency, the participant will link a tracking device 200 which is capable of determining the distance they have travelled. In this particular example, tracking device 200 may include a cellular device having GPS tracking capabilities, a chip timer having the ability to communicate with certain markers, a step counting device, a stand-alone GPS device, an activity sensor with timing capabilities, etc. Each of these devices will allow a participant's activities to be tracked, thus automatically determining distances travelled, ground covered or time spent being active. Obviously, in the context of running, biking, swimming, walking, etc., it is very beneficial to track travelled distances. Other examples may involve time based pledges, such as a dance-a-thon, or a volleyball-a-thon, where a participant is involved is some activity for a period of time. In this example, pledges are typically time based, thus monitoring activity for a prolonged period of time is required. Here, the tracking device could include an accelerometer to verify a predetermined level of activity, along with a timer. It is contemplated that this tracking information may be uploaded automatically, using cellular communication for example, or may be periodically downloaded by the user.

As will be recognized, the ability to track participant activity, and automatically upload to the system provides a level of efficiency not presently available. Based on solicited donations, and information from tracking device 200, system 10 is thus able to calculate funds raised on a near-instantaneous basis. If the particular activity is a one-time event, the system will then move on to a donations processing step 120 where all the information collected is used to calculate funds raised and to automatically process donations, as designated by donors. As previously mentioned, donors will provide information from their financial institutions, preferably including authorizations for automated payments. With all this information, donation processing step 120 can automatically carry out the collection of funds based upon a participant's activities. In this manner, there is no need for a participant to collect on their own, thus providing a system which is more efficient and requiring less human interaction.

In addition to the donation processing steps, it is also beneficial to provide near-instantaneous publicity based upon the participant's activities. In the running event example generally discussed above, it is beneficial to constantly update the distances travelled by a particular participant, and the related fundraising activity achieved. The inclusion of tracking device 200 makes this feature possible. Obviously, this creates a more instantaneous record, and helps with accurate recording. In addition, publishing or sharing this information also can have a beneficial effect on other participants or other users involved. Individuals are typically motivated by the activities of other participants, and thus having near-instantaneous information regarding progress of other participants can be a motivating factor. In addition, it is typically beneficial for participants to see the success or results of their activities, thus providing personal gratification and satisfaction.

Figure 3:
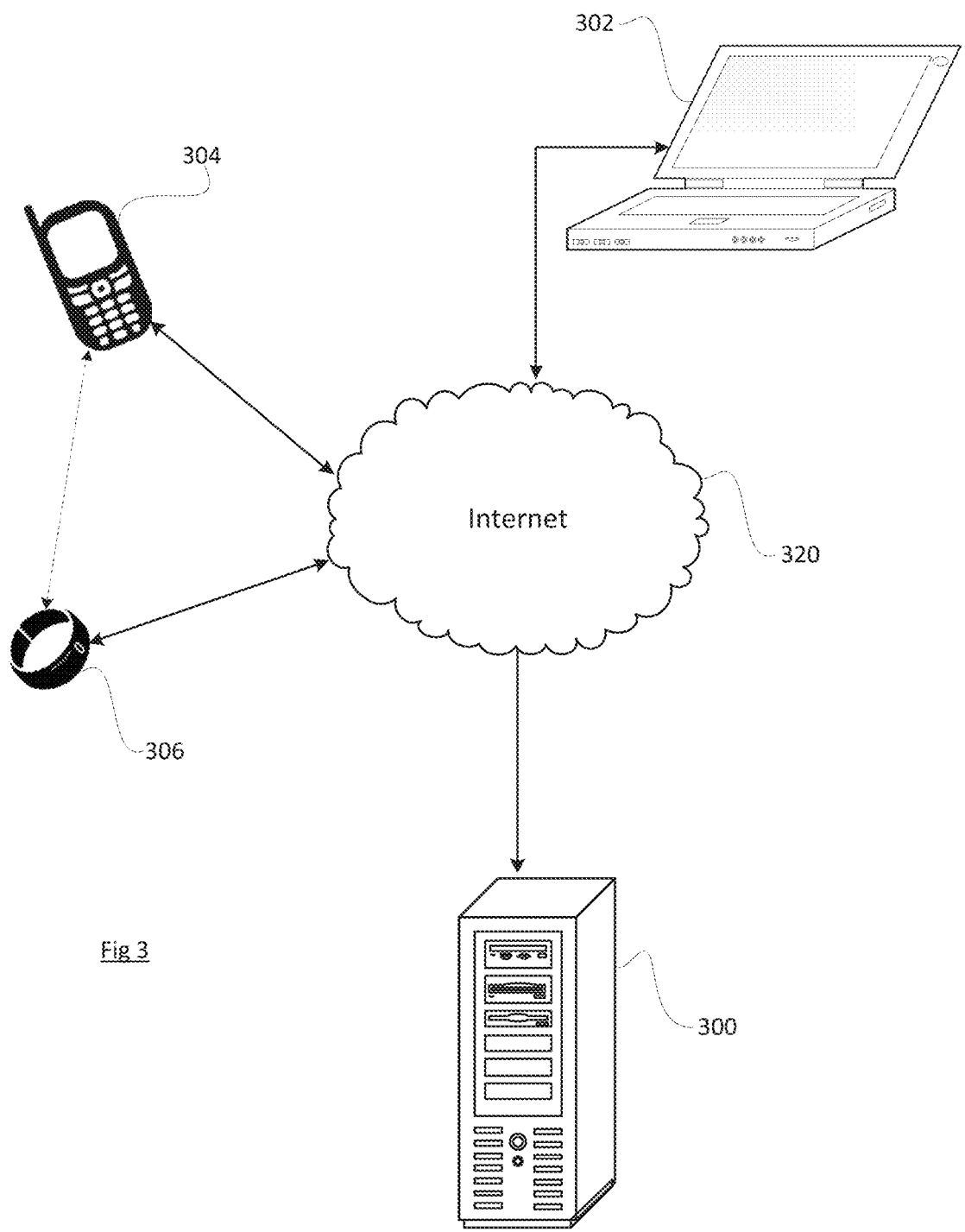
FIG. 3 is a high level system diagram showing examples of the various components involved in an embodiment of the system.

As suggested above, the fundraising coordination system 10 requires, or benefits from, the communication with several related devices and systems. One exemplary communication structure is generally illustrated in FIG. 3. Clearly, more sophisticated systems will be used, typically having network based computing capabilities and more complete communication capabilities. That said, it is contemplated that a computing device 300 will generally coordinate the overall activities of fundraising system 10. Computing device 300 could be a stand-alone computer, a server, or a cloud-based application. Those skilled in the art will recognize that there are many different ways to provide this overall coordination. As illustrated, computing device 300 is in communication with a network 320, such as the Internet.

In addition, a user interface device 302 is also included, which may include a personal computer, laptop, or similar devices. User interface device 302 and computing device 300 could be contained within a single device, or could be separate. Further, it is contemplated that system 10 would generally include at least one mobile device 304, and possibly a personal tracking device 306. Mobile device 304 will generally take the form of a mobile phone, such as the iPhone from Apple, an Android-based phone, such as the Samsung Galaxy, or the Motorola Razor, the LGE G5. Naturally, any other well-known computing devices could also be utilized. In a similar manner, personal tracking device 306 will generally include facilities to track activities of a user, whether this tracking is done via GPS, step counting, or other types of technologies which are capable of monitoring user activity. Obviously, many well-known versions of mobile device 304 may have GPS capabilities, accelerometers, or other components which provide and the ability to track activity. Thus, it is contemplated that the system could utilize tracking inputs from either mobile device 304 or personal tracking device 306, or both.

In the administration of fundraising activities, personal tracking device 306 or mobile device 304 provides a unique ability. Although personal tracking device 306 is traditionally utilized for measuring exercise and other related physical activity, its use as an input device for fundraising processes provides a unique and invaluable feature. Given that fundraising activities often involve physical activities of some type, the ability to track and provide activity related information (e.g. distance traveled, time carrying out activity, etc.) which is accurate and up to date, provides an invaluable function. As personal tracking device 306 or mobile device 304 is typically always related to a single user, the particular details related to personal tracking device can be easily stored in the entity records related to the participant/athlete. By incorporating the tracking device into a system which carries out peer-to-peer fundraising activities, these additional benefits of efficiency and accuracy are achieved.

Figure 4A:
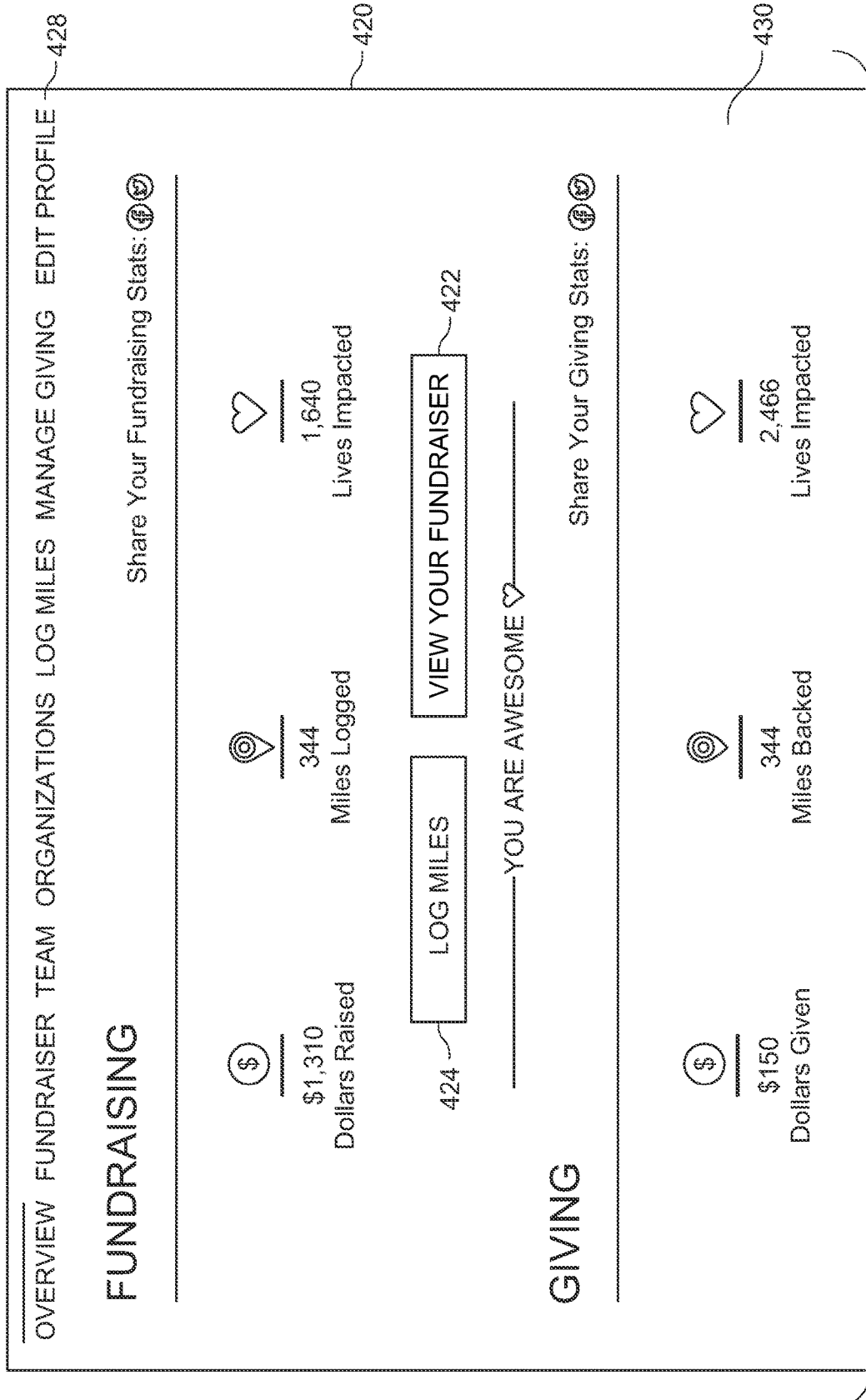
FIG. 4 is a general illustration of the sign-in process, while FIG. 4A an initial screen 420, which lists several details for the user.
FIG. 4B is a flow diagram illustrating one method of a registration/sign-in process.
Figure 4A:
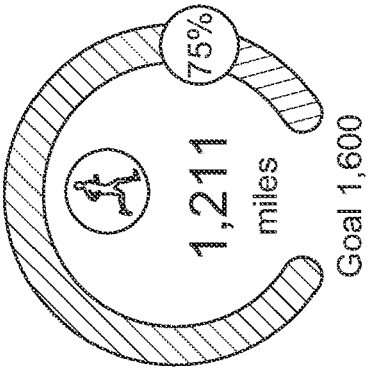

To allow user input and interaction with the system, it is obviously necessary for user interface 302 to accommodate set up and creation of accounts, profiles, fundraisers, campaigns, organizations, etc. It is contemplated that an initial step, from a user perspective, allows users to create a profile for themselves, for a charity, for a team, or for an organization of virtually any type. Thus, using a new user sign-on screen, this profile can be created and utilized as a starting point for further activities by the entity involved. If the new user is an individual, the individual will initially be invited to join existing fundraising campaigns or create a new fundraising campaign. Once example, of this initial process is generally shown in FIG. 4, which illustrates a initial sign-on screen 410. Upon completion of the information required, the process moves to an initial screen 420, which lists several details for the user. Generally, one possible version of this initial screen 420 is illustrated in FIG. 4A. Obviously, the selection made by the new user on welcome screen 420 will dictate how the system reacts. For example, the used may select to take certain actions related to a current fundraiser, such as selecting view button 422, or log miles button 424. Further, the user may have the ability to support an alternative fundraiser by using a "support a fundraiser button" 426. Other menu options are provided on menu bar 428.

Figure 4B:
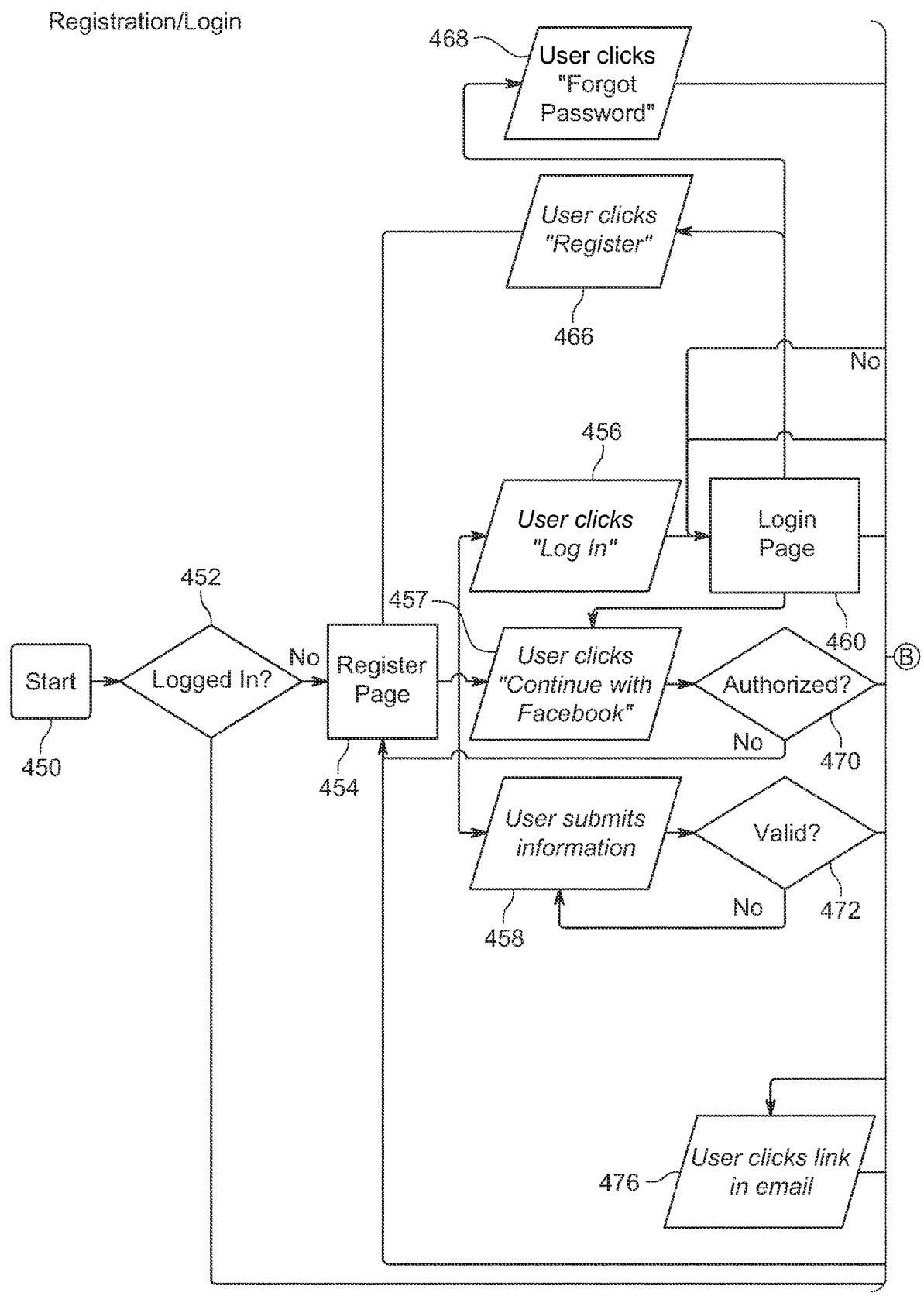
Figure 4B:
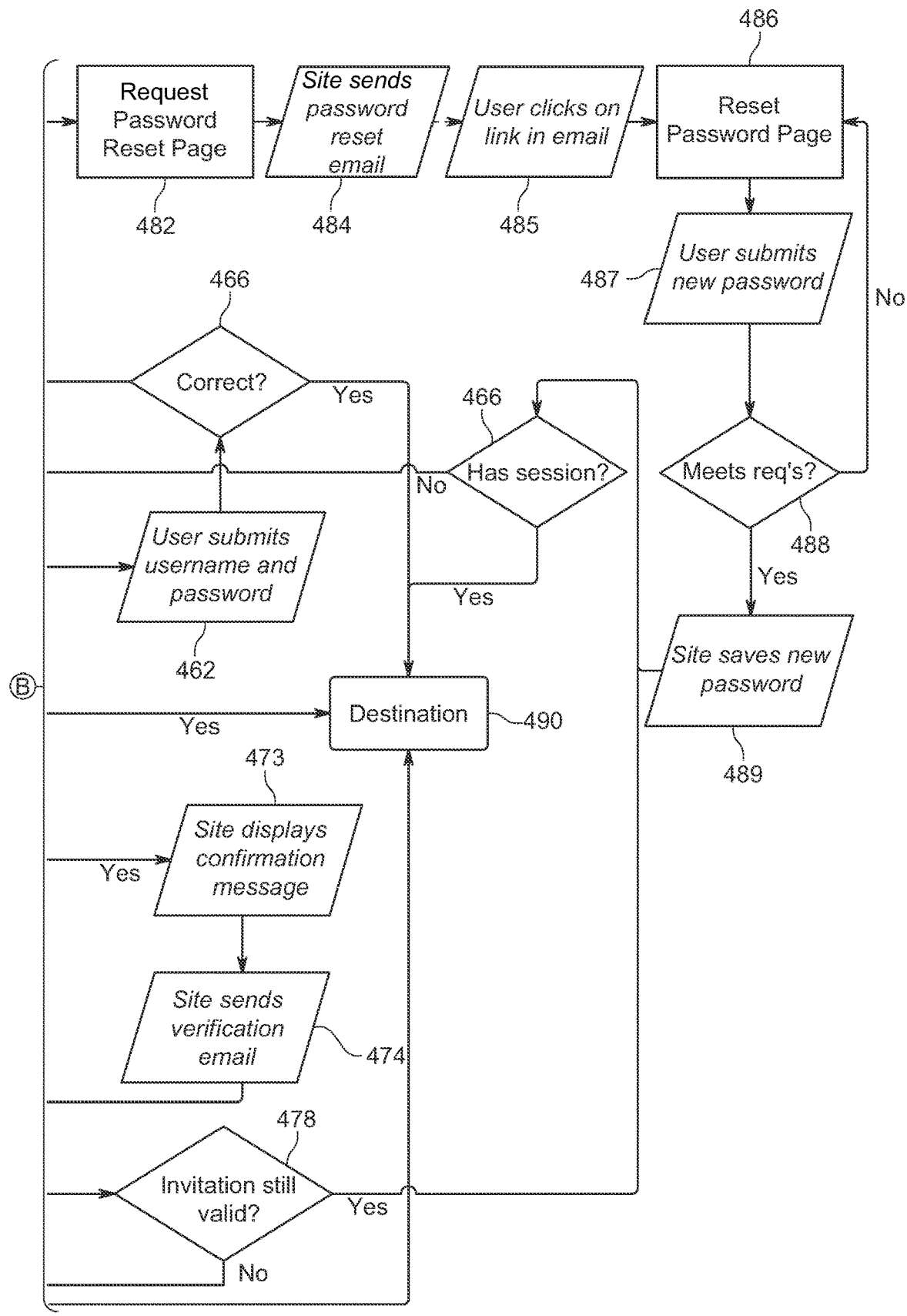

One example of the process for carrying out the login/registration operations is illustrated in FIG. 4B. As shown, the process starts at a start point 450, and quickly asks whether the users already logged in at step 452. If yes, the process moves to the desired user destination 490. If no (i.e. the user is not logged in), the process then moves to a registration page at step 454. Based on this page, which may take a format which would be well-understood by those skilled in the art. It is contemplated that the registration page will provide the option for an existing user to log in 456, for a new user to select login with Facebook 457 or submit new information 458. If login is selected, the process then moves to a login page 460, which will provide a mechanism to submit a username and password 462. Once this information is input, a validation step is carried out 464 to determine whether the information is correct. If correct (yes), the user is brought to the destination page. If incorrect (no), the user is directed back to login page 460. As will be appreciated, login page 460 may include mechanisms for the user to designate themselves as a new user, 466, or to indicate that they had forgotten their password 468. If the user clicks register at step 466, they are directed back to the registration page, which then allowed selection of login, continue with Facebook 457 or submit new information 458. Similarly, if the "forgot password" button is clicked, a separate process is followed.

At the registration page, should the user click "continue with Facebook" 457, an authorization step 470 is carried out. As will be appreciated, if authorization is valid or received, the user is brought to their destination for a night. If not, they are bought back to the registration page. From the registration page, should the user select "input new information," a similar validation step 472 is carried out. If not valid, the user is brought back to the data entry page 458. If it is validated, a confirmation is displayed 473, thus indicating to the user that appropriate information has been submitted, a verification email is sent 474, the user clicks the link in the email 476 and then is brought to a validation step where the validity of an invitation (sent via email) is checked. If this is validated, the system goes to one more validation step to determine if the session is still valid or not. If valid, the user is brought to their destination 490. If not valid, the user is brought back to the login page 460 since the account has now been created and the login process must be completed. Back at the email validation step, if it is determined that the invitation is no longer valid, the system then reverts back to registration page 454 for new interaction with user.

As previously mentioned, if a "forgot password step" has been entered, a process moves to a page where a password reset is requested 482, a password reset email is sent 484. In response, the user clicks on a link in the email 485, a new password page 486 is reached, which allows a user to submit a new password 487. The validity of this password is then checked at decision box 488. For example, the password may require both numbers and letters. If valid, the site saves the password 489, and then moves back through session validation step 480 to potentially reach destination 490. Should the password not meet requirements, the user is brought back to reset password page 486. As will be appreciated, the above-mentioned steps are relatively straightforward. That said, the process does ensure the validity of the user information and provides security within the system.

Figure 5:
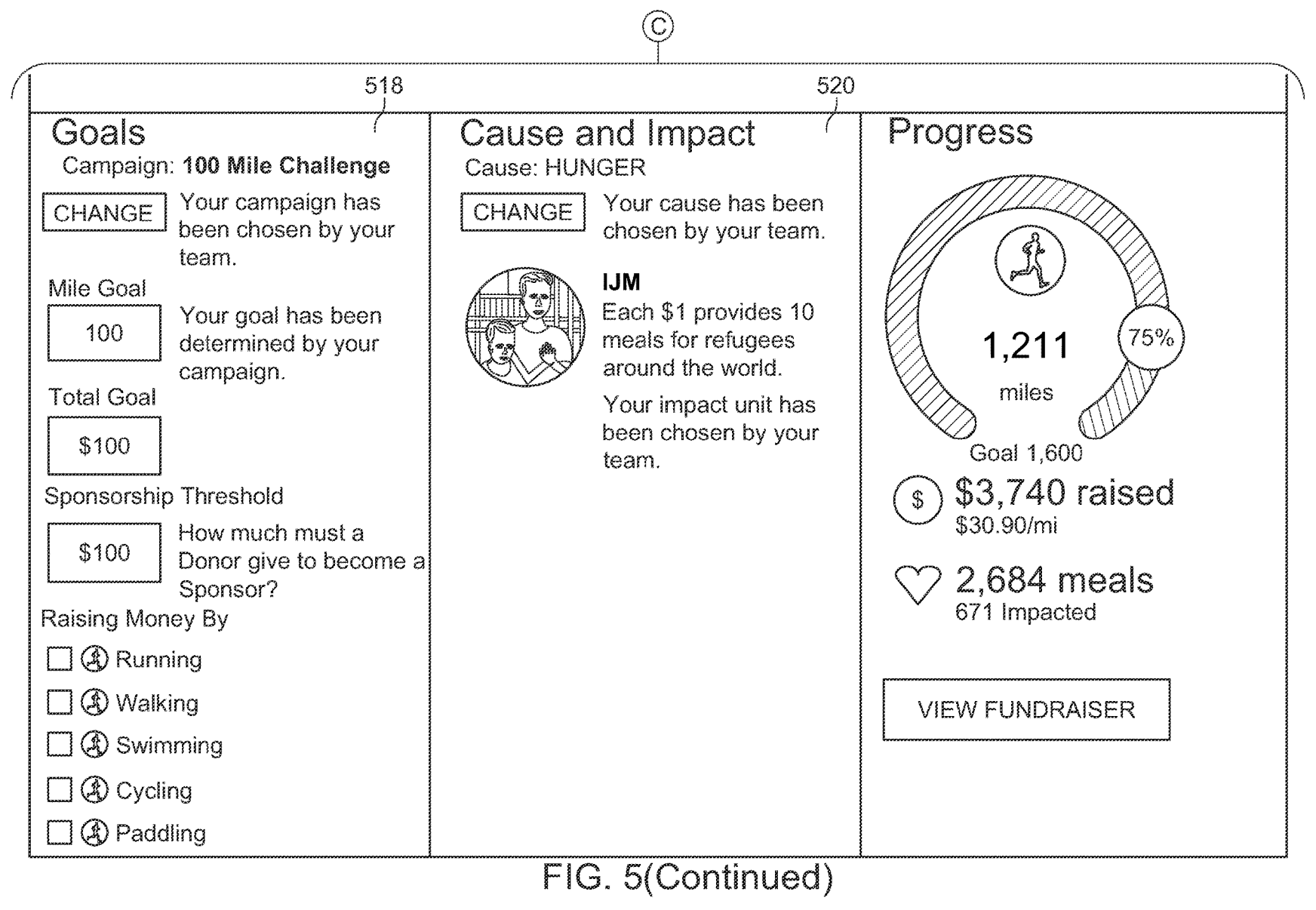

If a new campaign is selected, the system will move to a campaign or fundraiser enrollment process, which is generally illustrated in FIG. 5. Turning now to FIG. 5, the system will present a general fundraiser screen 510 and ask the user to enter several details of either a solo campaign or a team campaign. In this example, these details include a title 512, further subtitle or description 514, timeframe 516, and goals 518. In addition, a cause and impact 520 can be selected, and a description can be provided. Naturally other details could be included to better describe the campaign and the motivation behind it. While FIG. 5 illustrates one example, further details teams and campaigns will be discussed below in relation to FIGS. 11C and 11D.

Figure 5A:
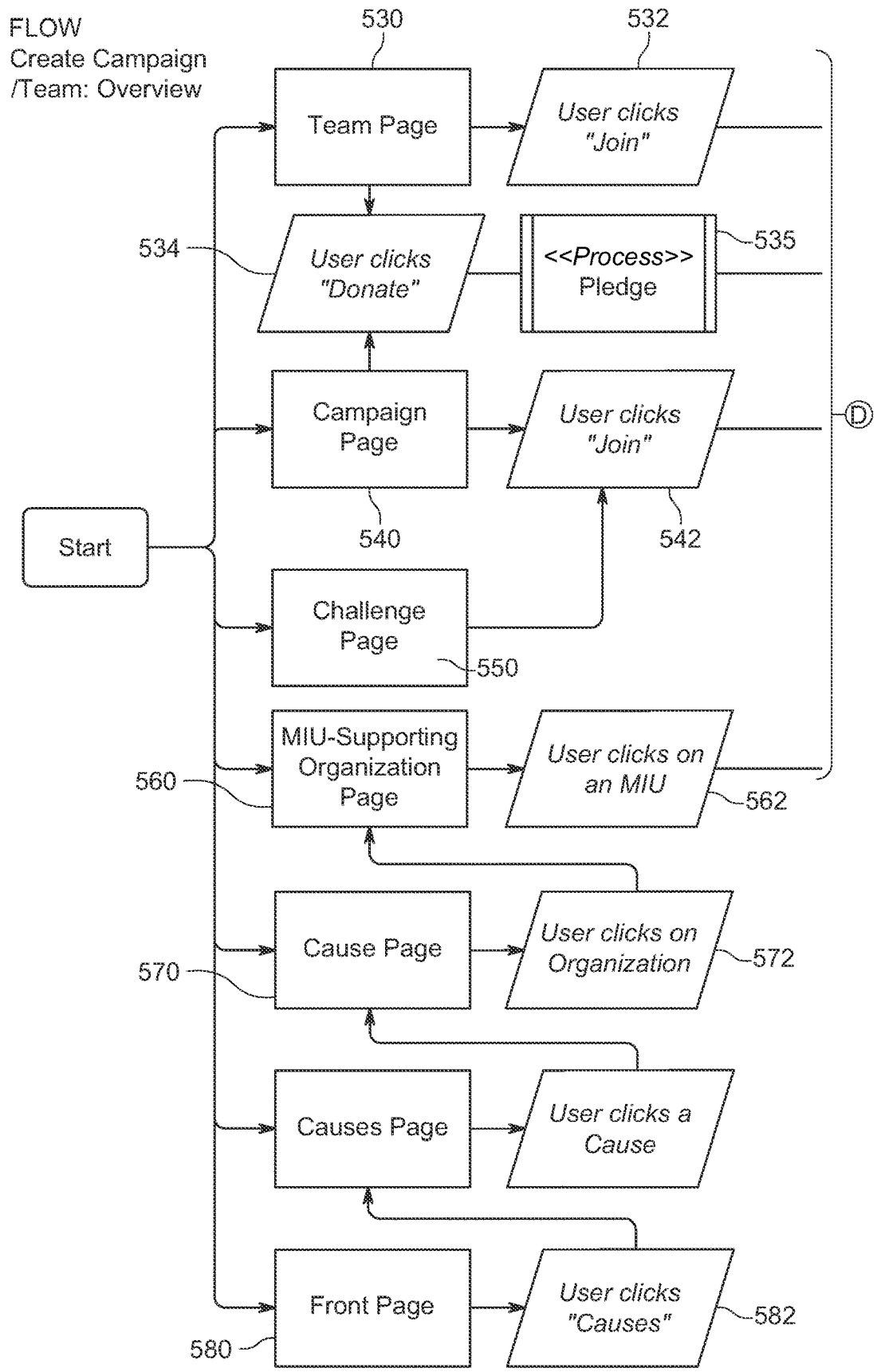
FIG. 5 illustrates steps to create a new campaign with FIG. 5A showing a flow diagram outlining the creation of a team and/or campaign, FIG. 5B showing various steps of potential campaign administration and FIG. 5C outlines the process of assembling a team.
Figure 5A:
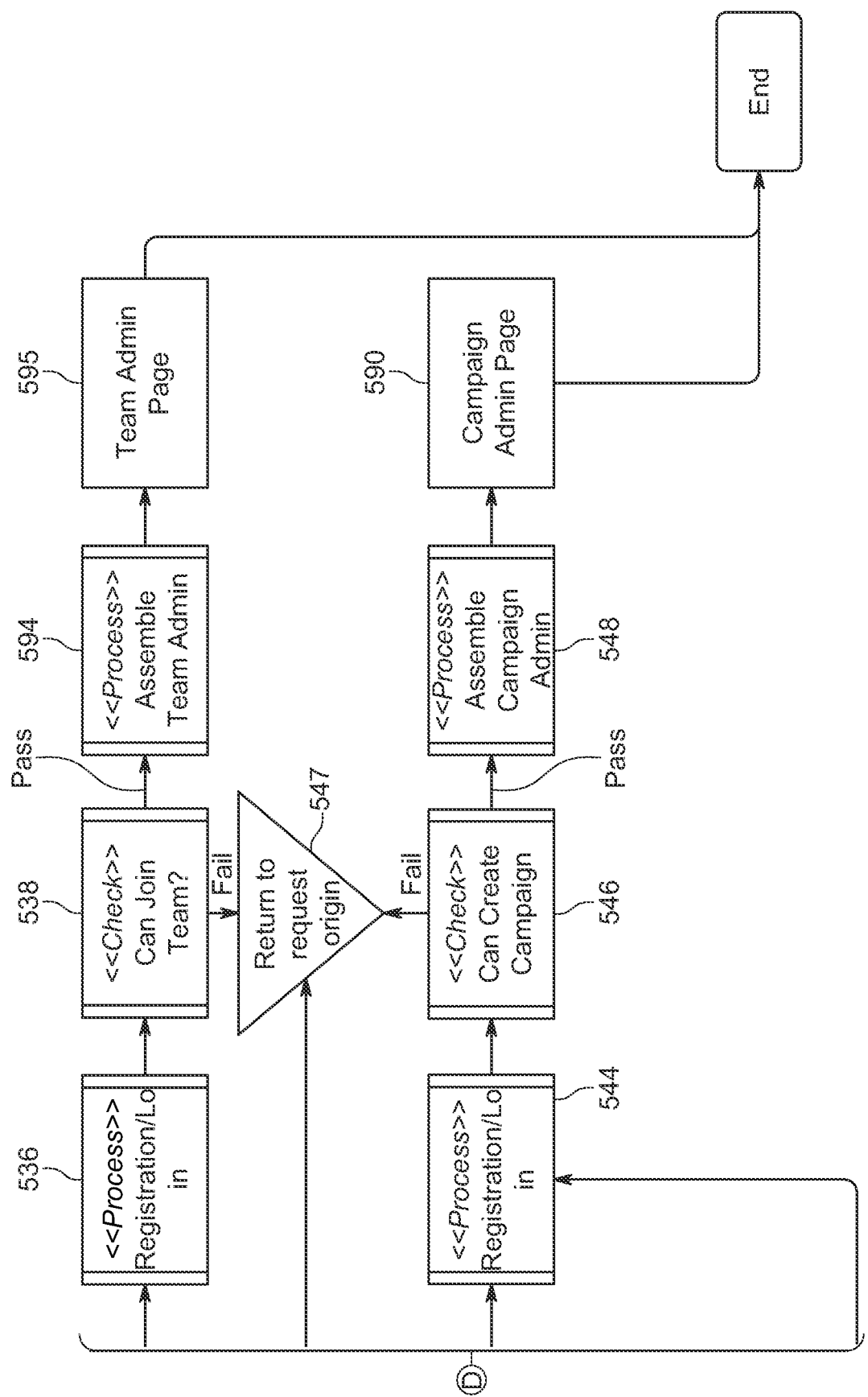
Figure 5B:
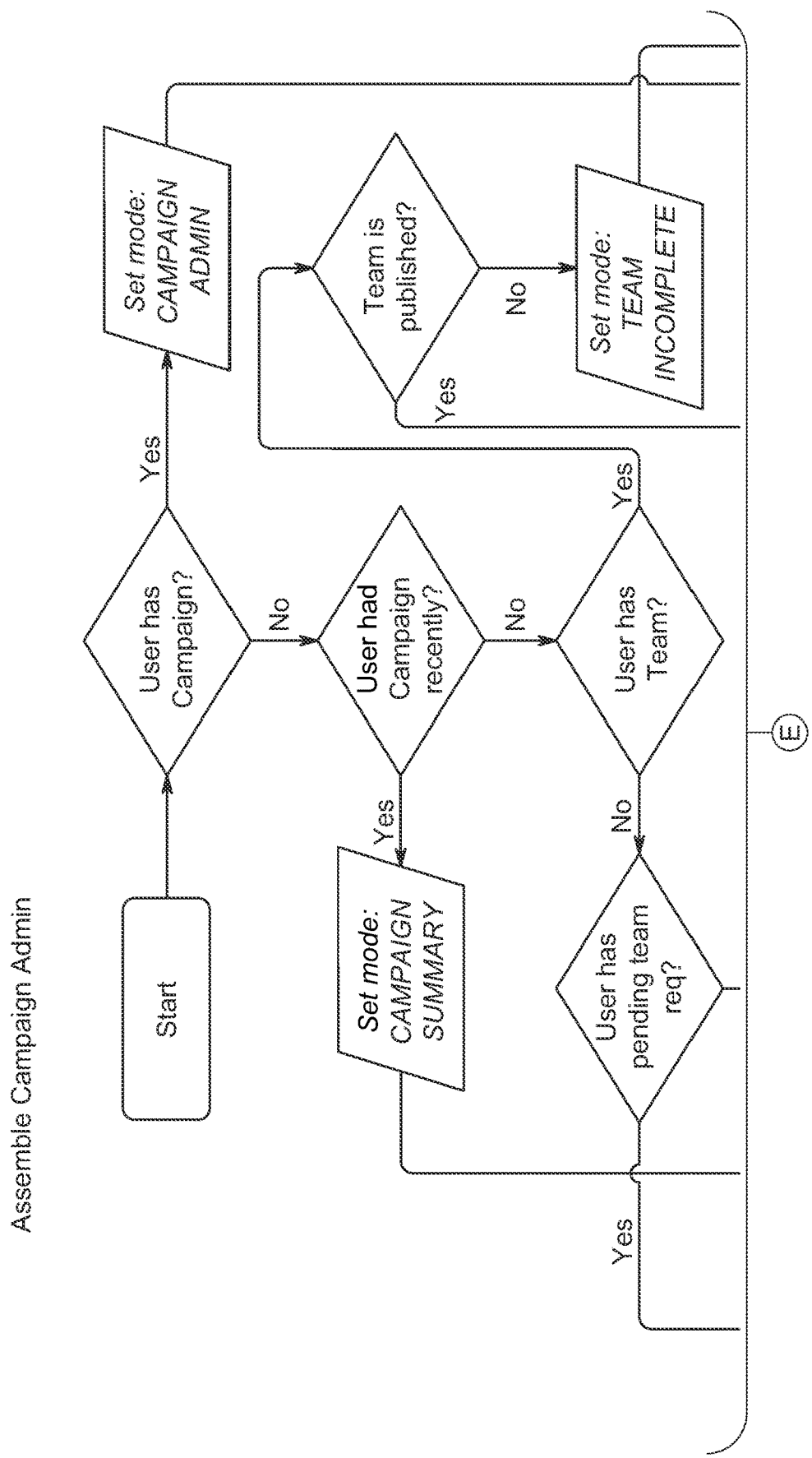
Figure 5B:
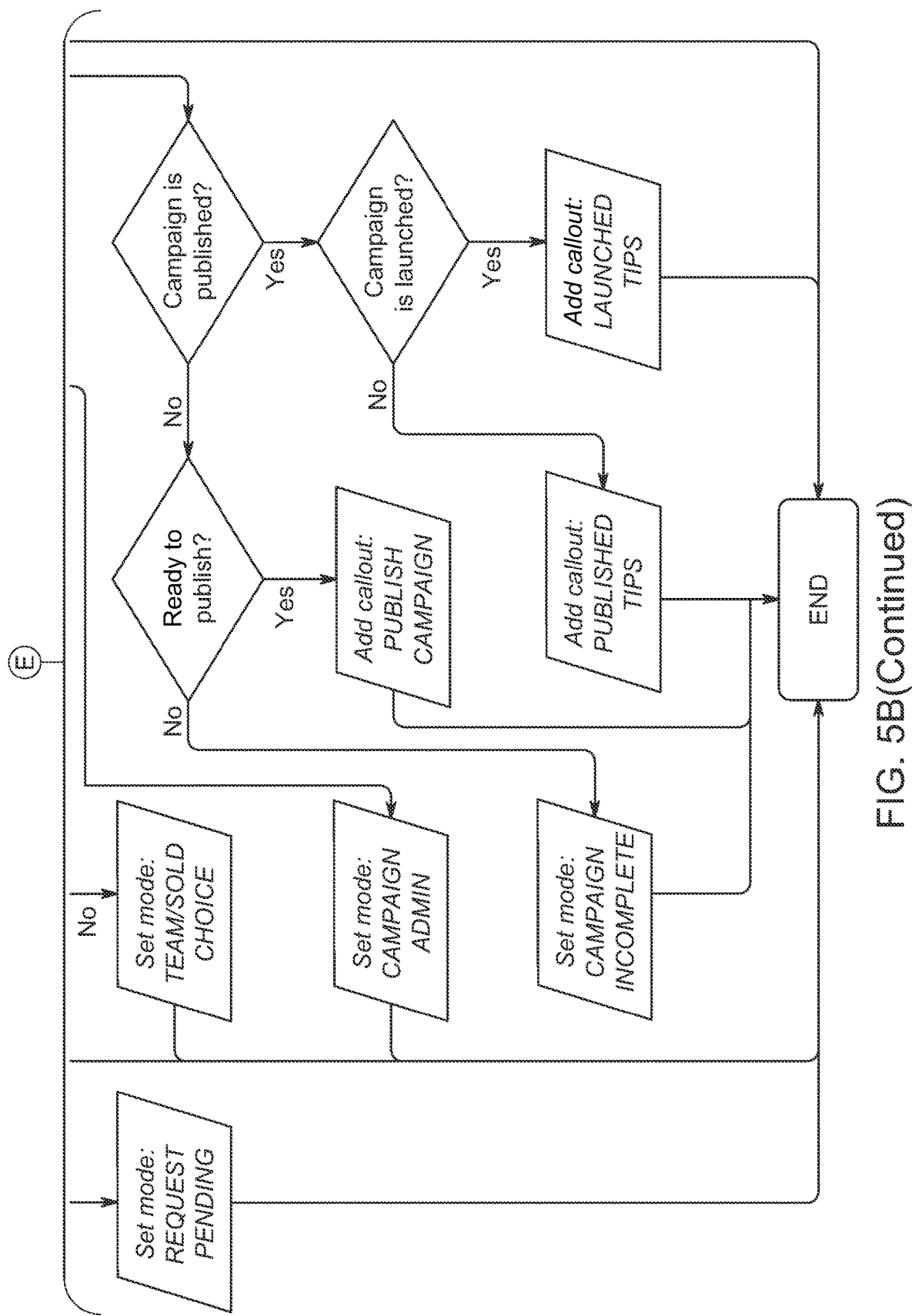

To provide further insight, FIG. 5A illustrates one exemplary process for creating new campaigns/teams. As suggested in relation to FIG. 4, the process starts with the display of an interface page so a user is allowed to select certain tools. It will be appreciated that each of these pages will be reached by selection of an appropriate control button or icon presented on the display. As contemplated, this will include the display of a team page 530, a campaign page 540, a challenge page 550, a supporting organization page 560, a cause page 570, or a front page 580. Starting with front page 580, the user will have the ability to select "causes" 582. This step will bring a user to cause page 570, which displays the various causes that currently exist. Here, at step 572, user is allowed to select one of the various causes having, which will then bring the user to a supporting organization page having lists the selected causes or campaigns. Thus then allows the user to confirm at step 562, that this is the desired cause. From here, the user will move to registration/log in process step 544.

As mentioned above, the process includes the display or either a challenge page 550 or a campaign page 540. As generally discussed above, a campaign is related to a group or entity that has a goal defined. A challenge page 550 will be related to the various campaigns, however, is an enticement or challenge by the entity to promote further activity and participation by others. As seen is FIG. 5A, the campaign page or challenge page allow the user to select "join" at step 542 which will also bring the user to login page 544. After the login process is carried out, the system then moves to creation check 546. Generally speaking, this is a check to determine whether the user can create a new campaign. If not, the system will direct the user back to the original request at step 547. As illustrated in subprocess 546-1, this process checks to see if the particular user has a current campaign. If they do, the user will see a display indicating they have a campaign and allow movement to the particular campaign page. Alternatively, if a campaign doesn't exist, the process moves to step 548 which allows the assembly of a campaign. The process for assembling a campaign is described in more detail in FIG. 5B, which will be further discussed below.

Eventually, the campaign enrollment process will move to a campaign administration page 590. From the campaign administration page 590 a user is allowed to select or launch a campaign, create a new campaign, or move to a team administration process.

Figure 5C:
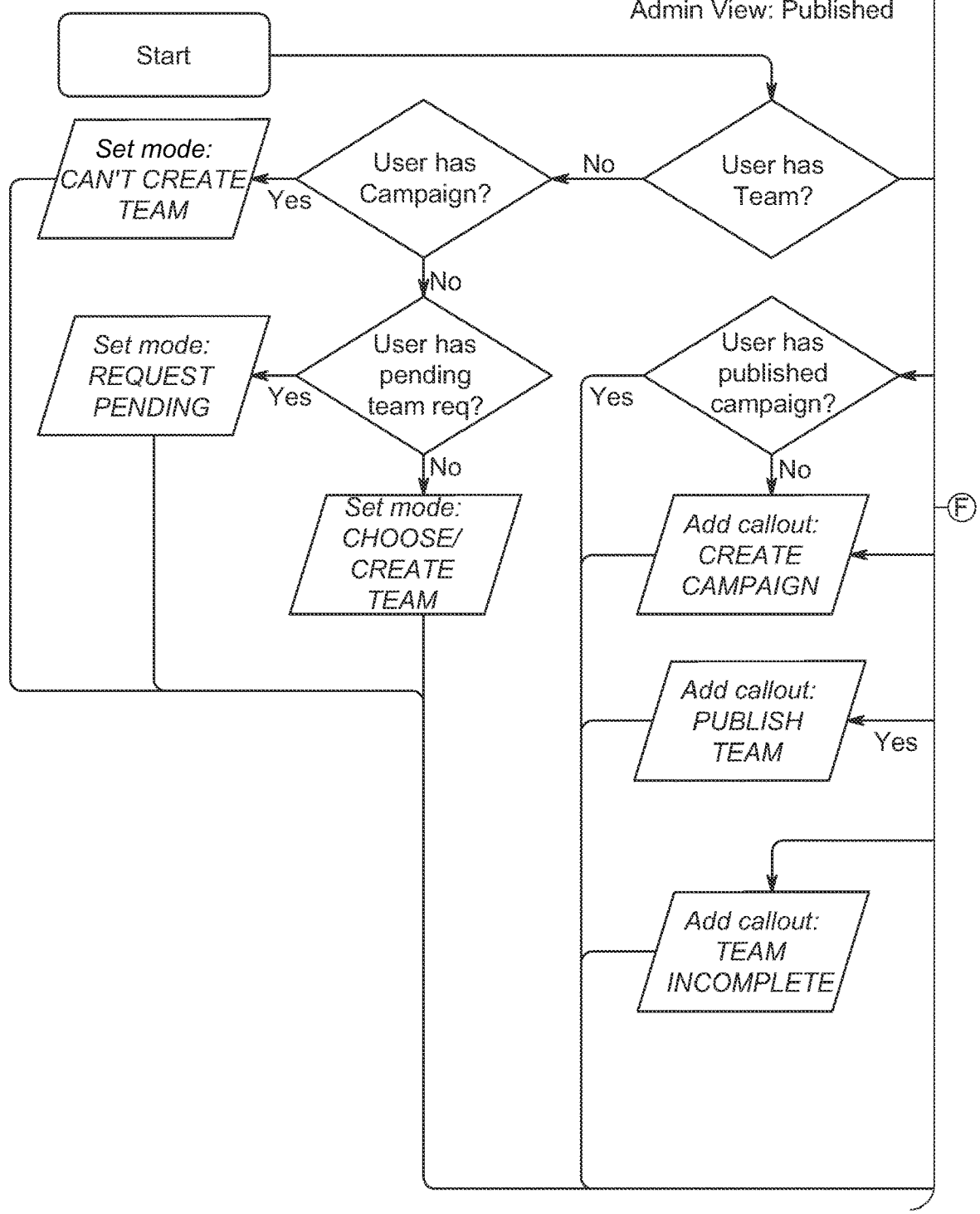
Figure 5C:
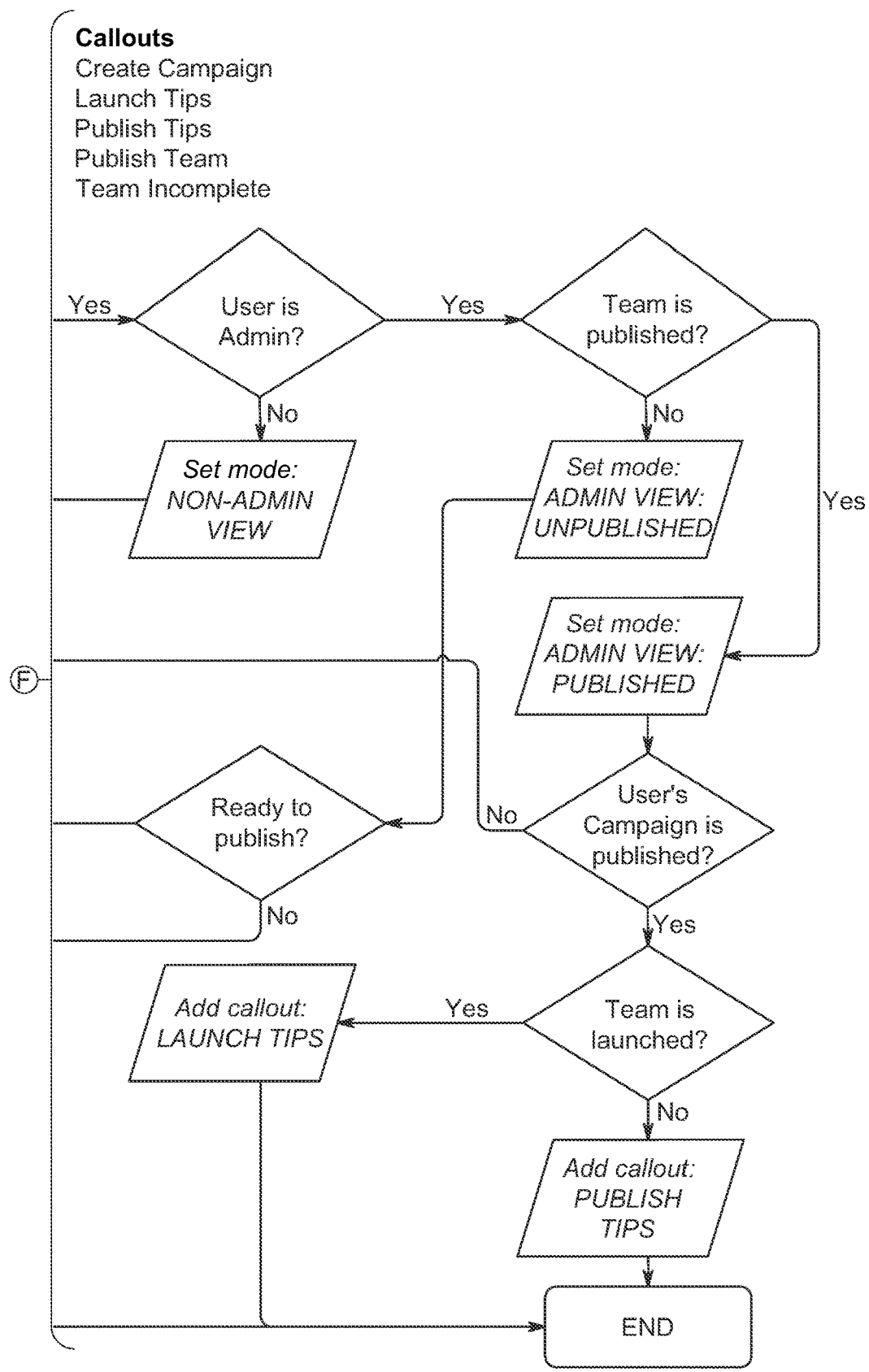
Figure 6:
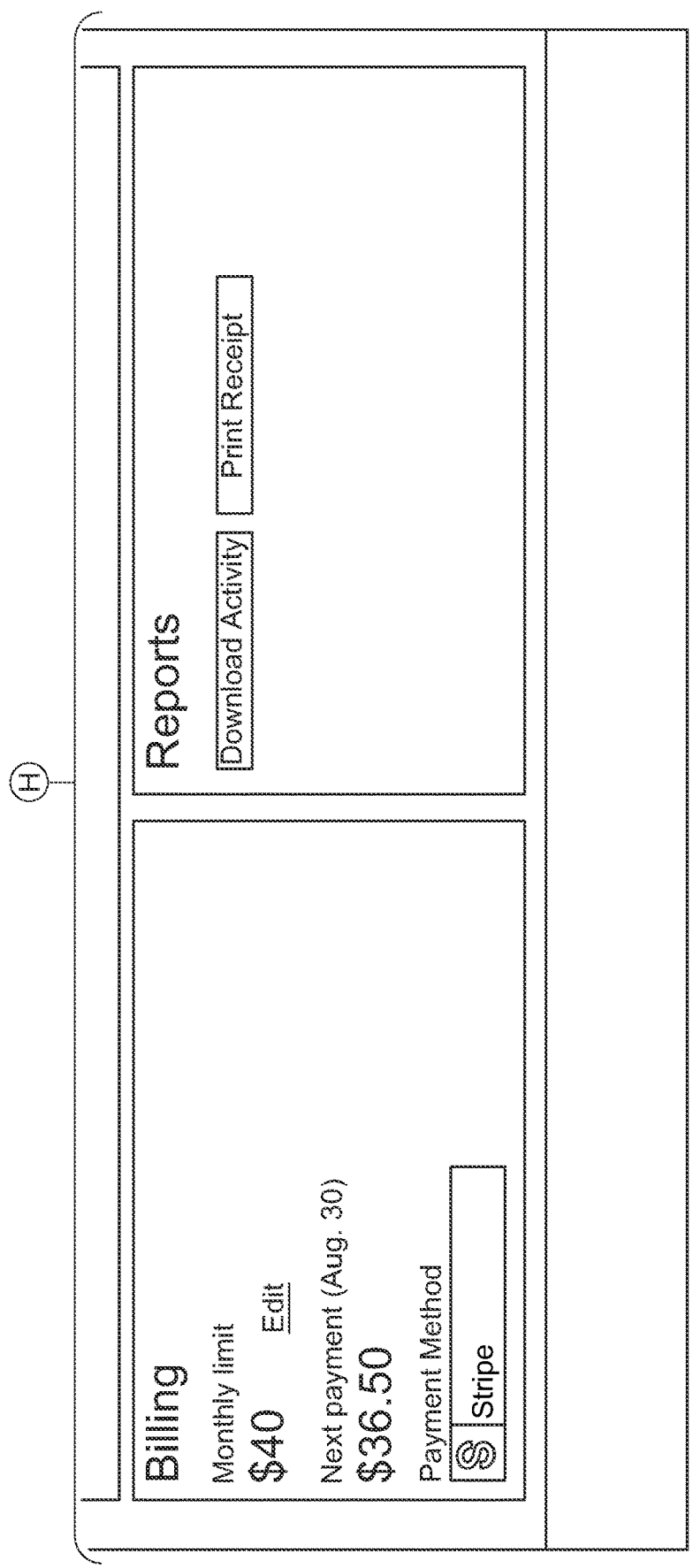
FIG. 6 is an illustration of a profile update screen.

As mentioned above, a team page 530 may also be displayed to users. From this team page a user can click a join button 532 or a donate button 534. In each particular case, the system will then move to the next process. More specifically, selecting the join button will bring the user to a team registration/login page 536. Similarly, selecting "donate" will bring to a pledge processing page 535. From pledge page 535, once the process is carried out, the user is again brought back to the original request or page, at step 547. This particular process will be further discussed below in relation to FIG. 14A. Similarly, from the team registration/login page, a check process 538 is carried out. Again, if this check fails, the user is brought back to the original page at step 547. More specifically, subprocess 538-1 is illustrated in FIG. 5A, which checks for the validity of a team membership for the particular user. More specifically, the process will determine if the user already has a team, or a campaign. If either of these exist, the process then identifies the existence of the team/campaign and moves the user to that point. Alternatively, if the user does not have a campaign or a team at this point and time, the process will move to processing step 594. For the details regarding the assemble team administration page or team processing page is illustrated in FIG. 5C. Once all of these processes are carried out, a team admin page 595 is displayed. From team admin page, the user is allowed to join a team, launch a team, or create a new team. As will be appreciated, alternative processes could be provided as necessary to achieve similar steps of creating teams, and campaigns. That said, through the processes discussed above, it should be clear that the system 10 will accommodate the creation of new campaigns, while also providing the ability to generally customize the presentation and details involved.

Figure 7:
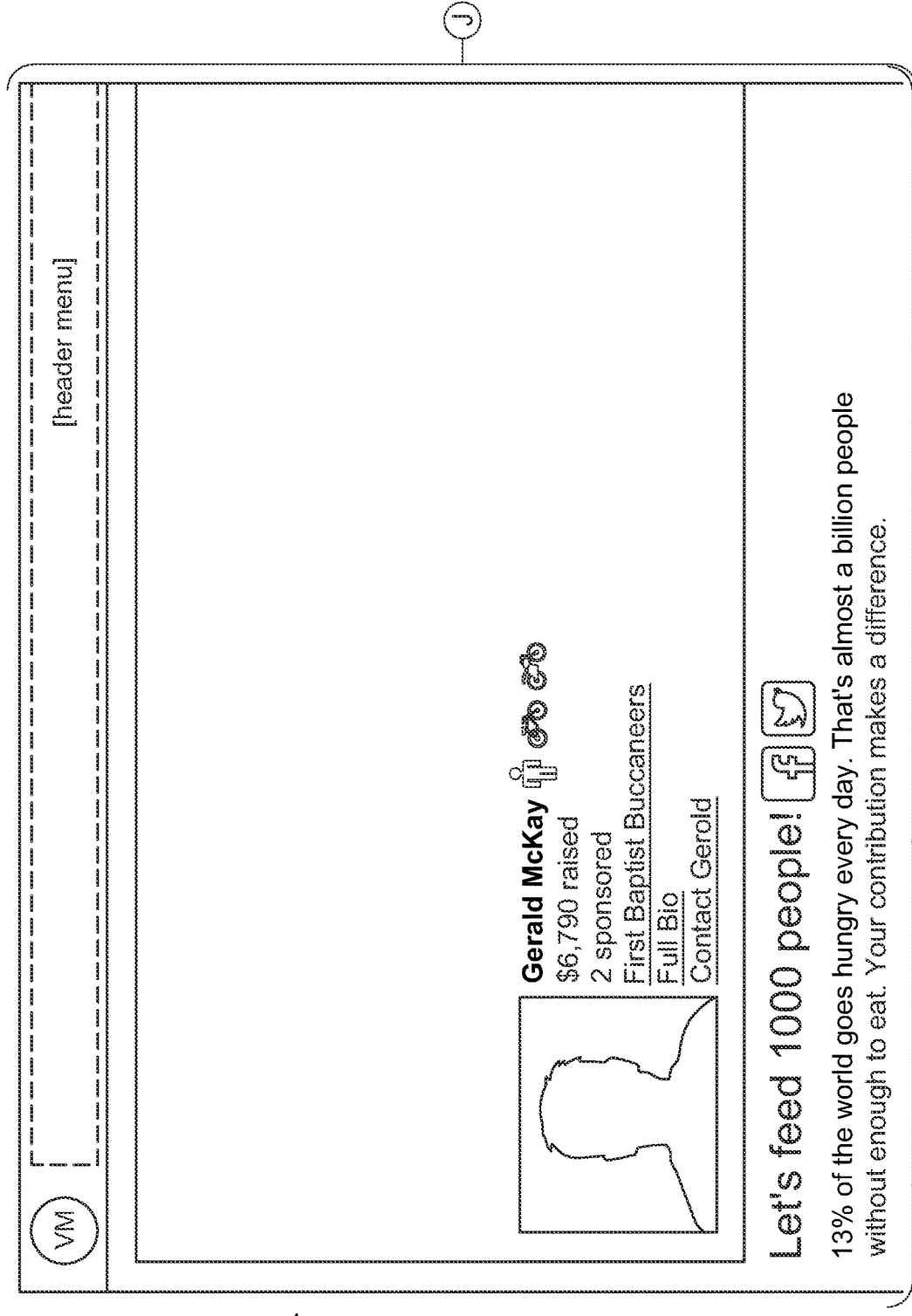
FIG. 7 is an illustration of a dashboard promoting the details and accomplishments of a user.
Figure 7:
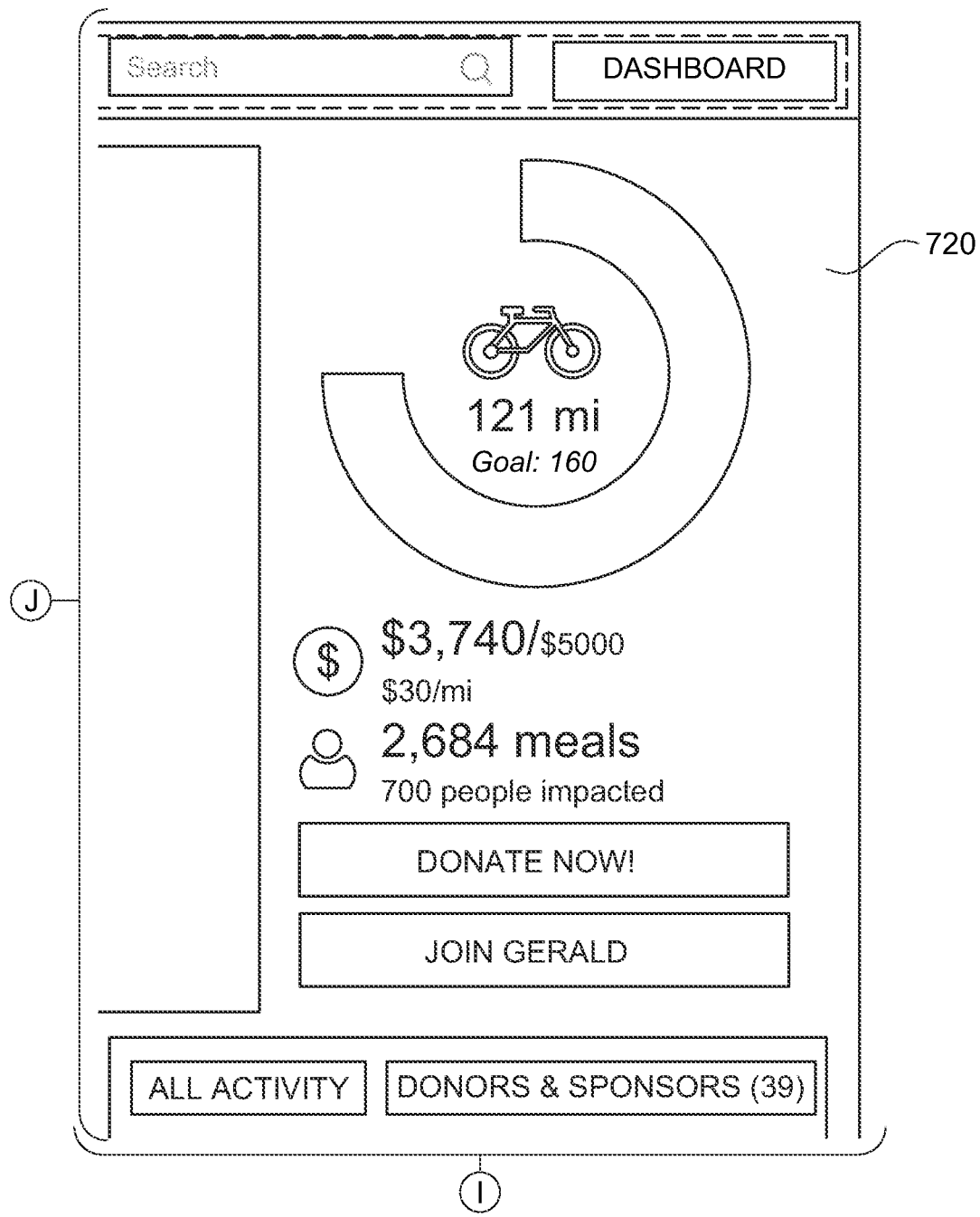
Figure 7:
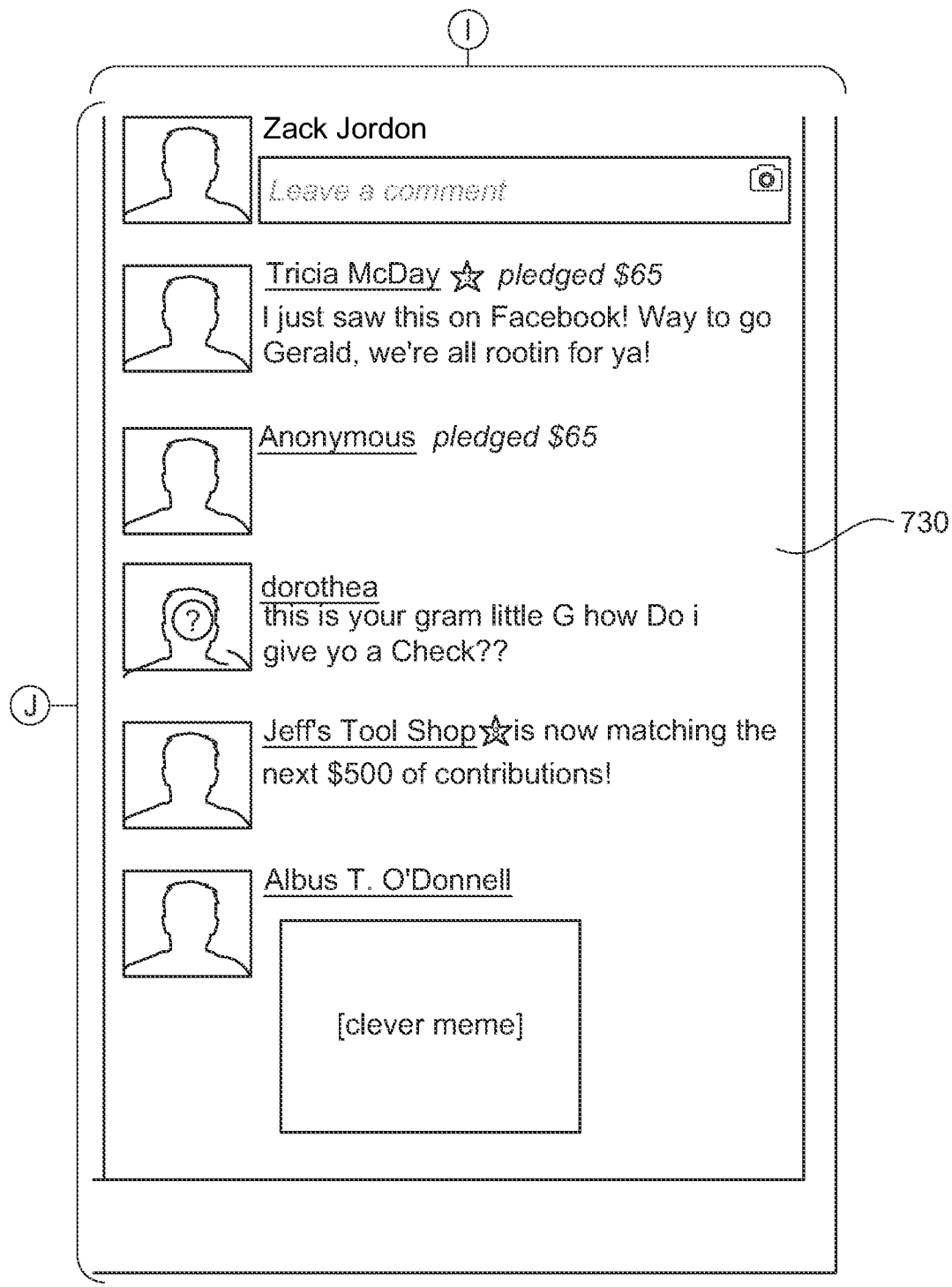
Figure 8:
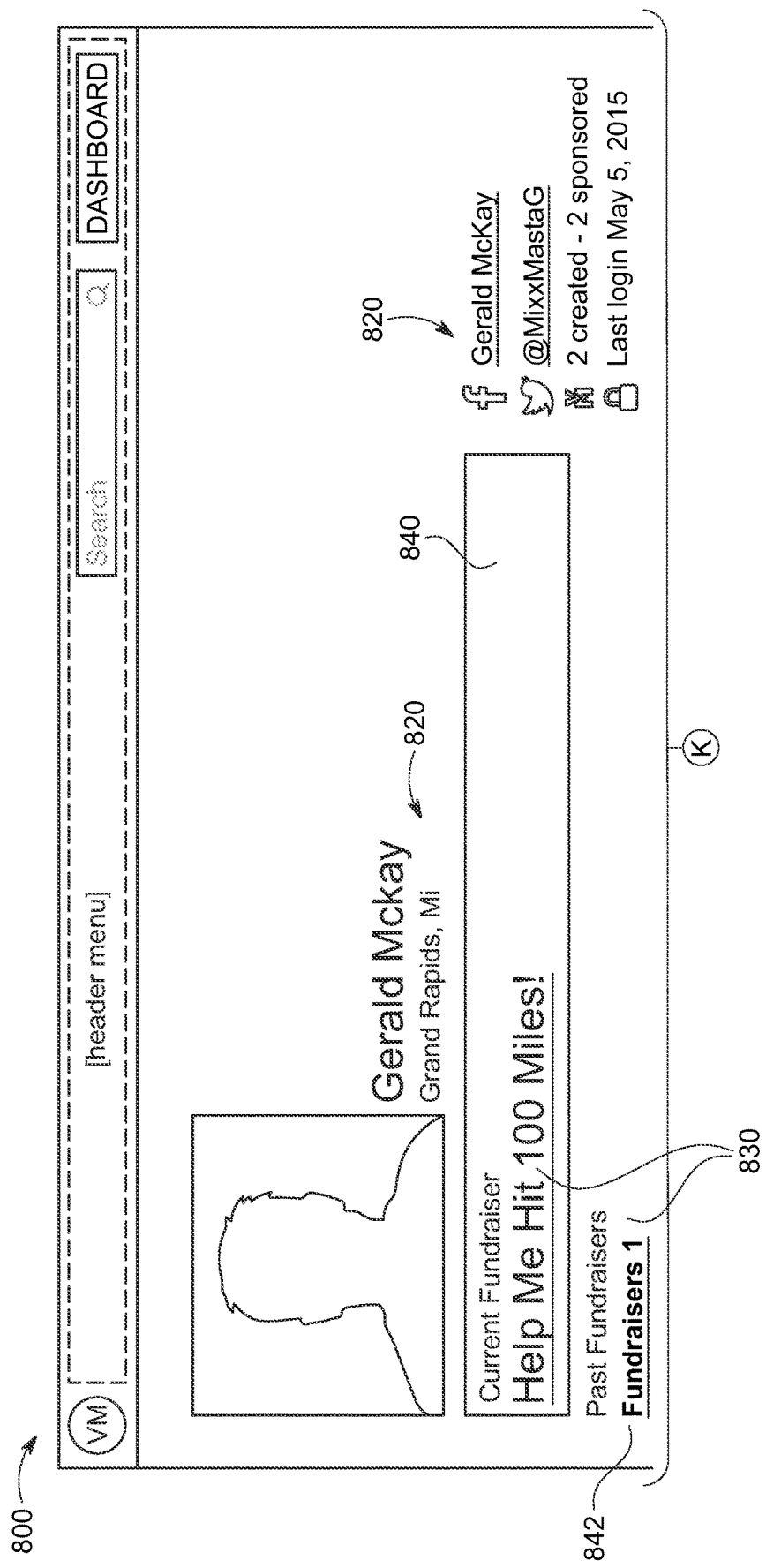
FIG. 8 is a user summary page, listing various fundraisers and personal expressions.

Again, as generally suggested above, each campaign maintained by the system includes an existing stated goal and/or purpose, along with considerable amounts of customized information. This customized information is invaluable in helping to promote fundraising activities and boost participation. Referring now to FIG. 7, a general illustration of an individual or personal campaign dashboard 700 is provided. Generally speaking, personal campaign dashboard 700 will provide several pieces of information for all users and provide a platform for an athlete or participant to promote their campaign involvement. This information includes a general summary 710 of the campaign involved, including tools to express an individual's involvement or personal perspective, and/or a summary of progress achieved 720. Again, the individual is considered an entity by the present system, and a related entity record is maintained, thus allowing for coordination of all entities and systems involved.

Most significantly, as will be further discussed below, each dashboard typically contains information regarding a relevant campaign(s) for that entity, the campaign goals, and a graphical illustration showing the progress involved. In this manner, any time a dashboard is viewed, progress and results can be immediately seen. Further, because information related to fundraising activities, and particularly the information related to the physical activities which are being utilized as the basis for fundraisers, are updated constantly and in real time, the progress indicator will also be continuously and virtually instantaneously updated. In this manner, an up-to-date indication of results is provided to anyone viewing the dashboard.

In addition to the sections outlined above, individual campaign dashboard 700 also provides comment area 730 for comments by donors, other athletes, friends, family members, or any other supporters. In many cases this will involve an indication of donations, and/or overall support provided by other individuals. It is further contemplated that this area 730 could also include links to relevant social media pages, and related content. These indicators and the general summary section 710 clearly provide information to anyone visiting individual campaign dashboard 700 so they clearly appreciate the efforts made by the particular individual, and the overall goals being pursued. In addition, this provides an easy and efficient manner for promoting these activities, and publicizing progress.

In addition to the individual campaign dashboard 700, the present system contemplates the use of a promotion page 800 which is more concise and targeted. As shown, individual promotion page 800 includes a campaign summary 810, personal information related to the athlete/promoter 820, and related links 830, allowing individuals to obtain additional information. In this case, these links include a connection to a current fundraiser 840, and a link to a past fundraiser 842. Naturally, these same type of links can be utilized throughout. Most significantly, it will be appreciated that individual promotion page 800 can be easily and effectively forwarded or presented to potential donors and others who may be interested in participating. This provides an easy and effective tool to disseminate information, and further promote activities of an individual directly, and general fundraising activities.

Figure 9A:
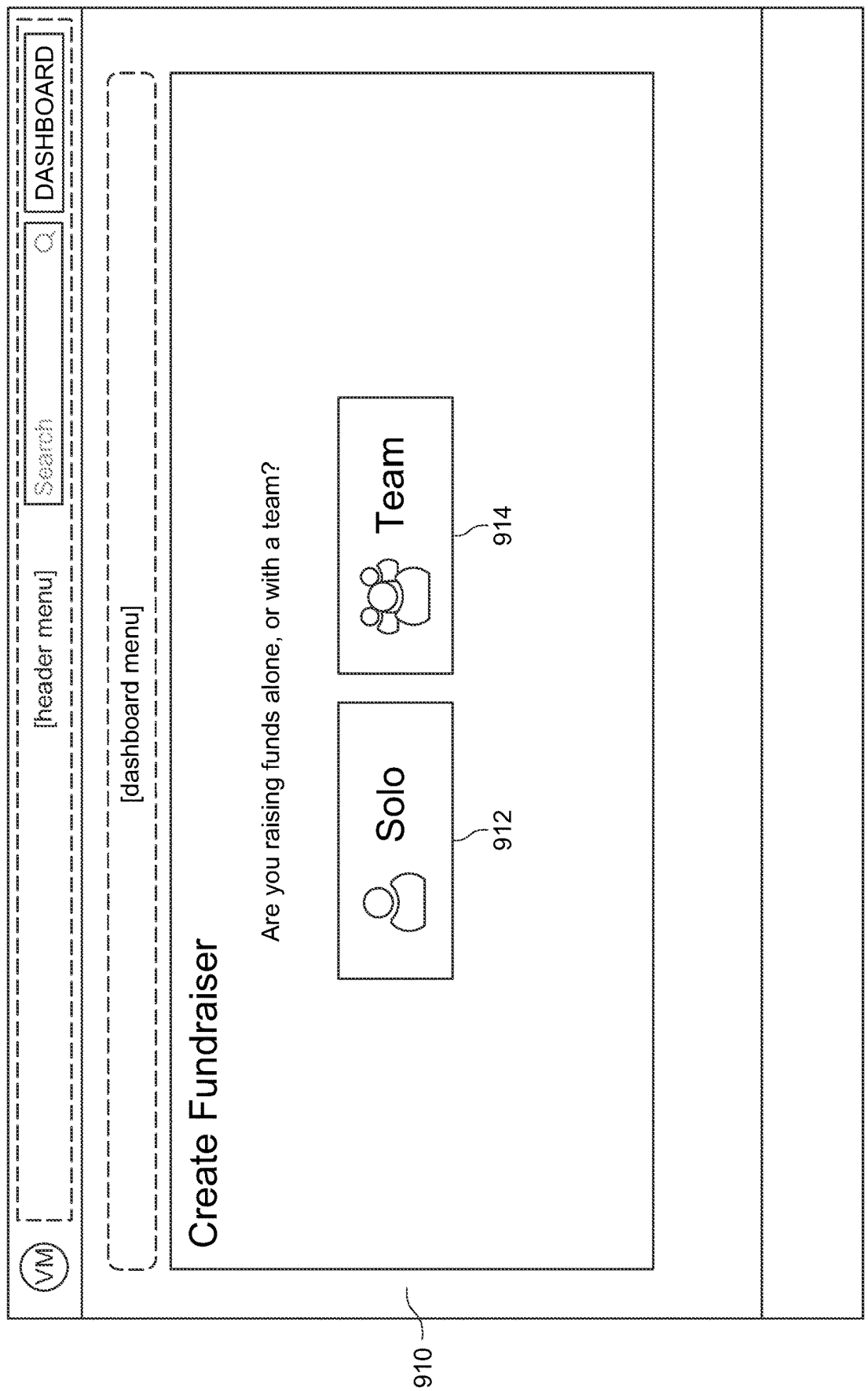
FIGS. 9A and 9B depict how a fundraiser is created.
Figure 9B:
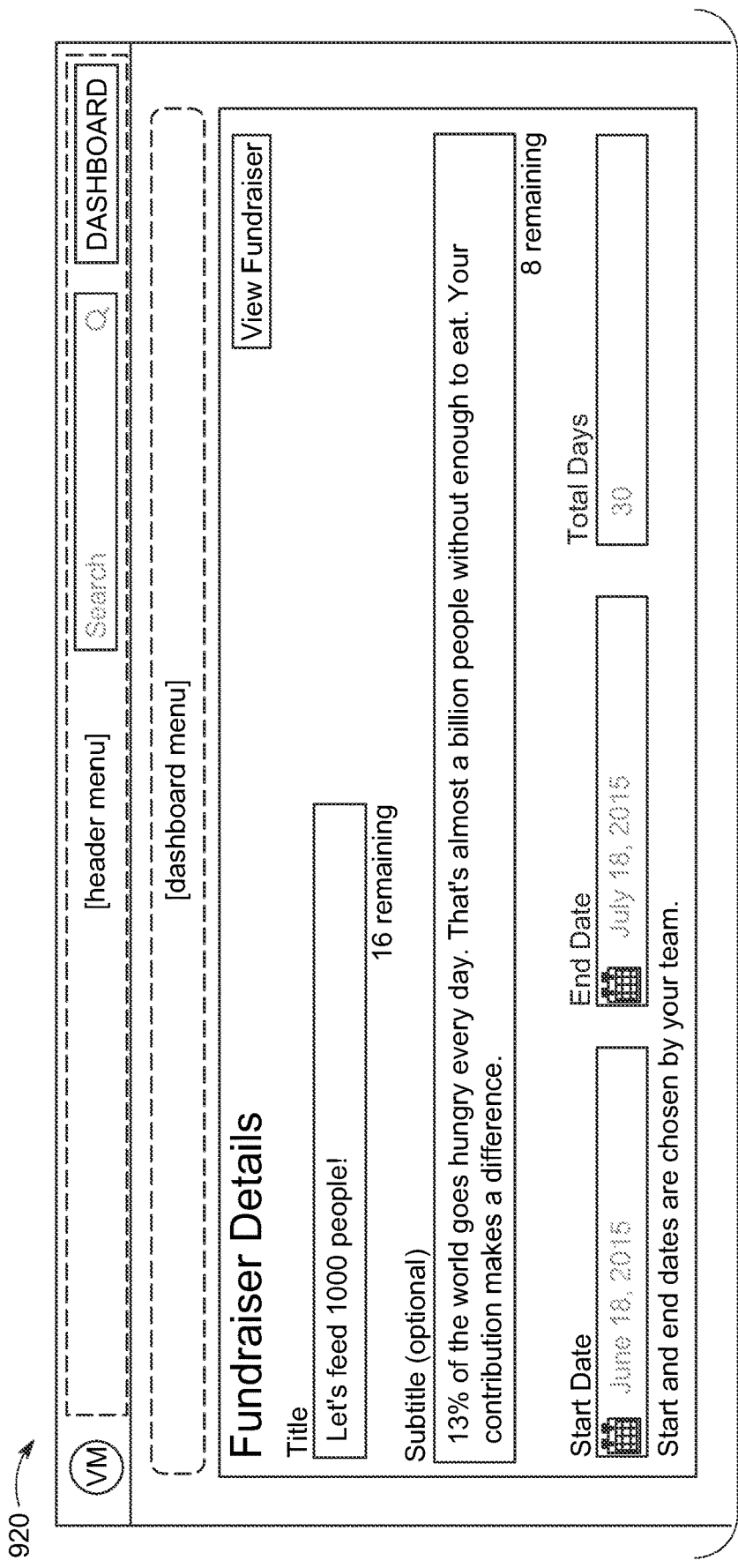
Figure 9B:
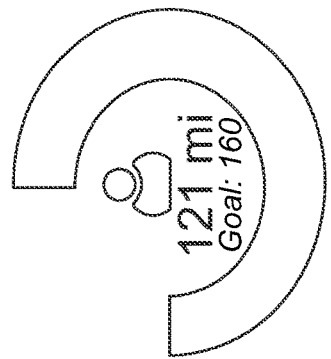
Figure 9B:

As mentioned above, certain tools are provided which allow users to create new campaigns or causes when necessary. Referring to FIG. 9A, an initial selection page 910 is provided, wherein a user will initially determine whether they are creating a solo fundraiser or a team fundraiser. As indicated, tools are provided to allow a user to make an appropriate selection. As anticipated, tools are provided to allow a user to make an appropriate selection. As anticipated, a user will select an individual campaign, using solo selection tool 912. Similarly, team campaign selection tool 914 will create an appropriate tool for a creation of a team campaign. Turning now to FIG. 9B, the solo campaign setup tool 920 is provided, thus allowing a user to input all necessary information related to the cause involved, the type of activity contemplated, the description, a name and subtitle, and appropriate timeframe. With this information, a designated solo fundraiser can thus be established. Again, even a solo campaign is considered a separate entity, to allow all necessary coordination. In addition, a progress screen and all necessary links can be displayed for the particular fundraiser involved.

Figure 10:
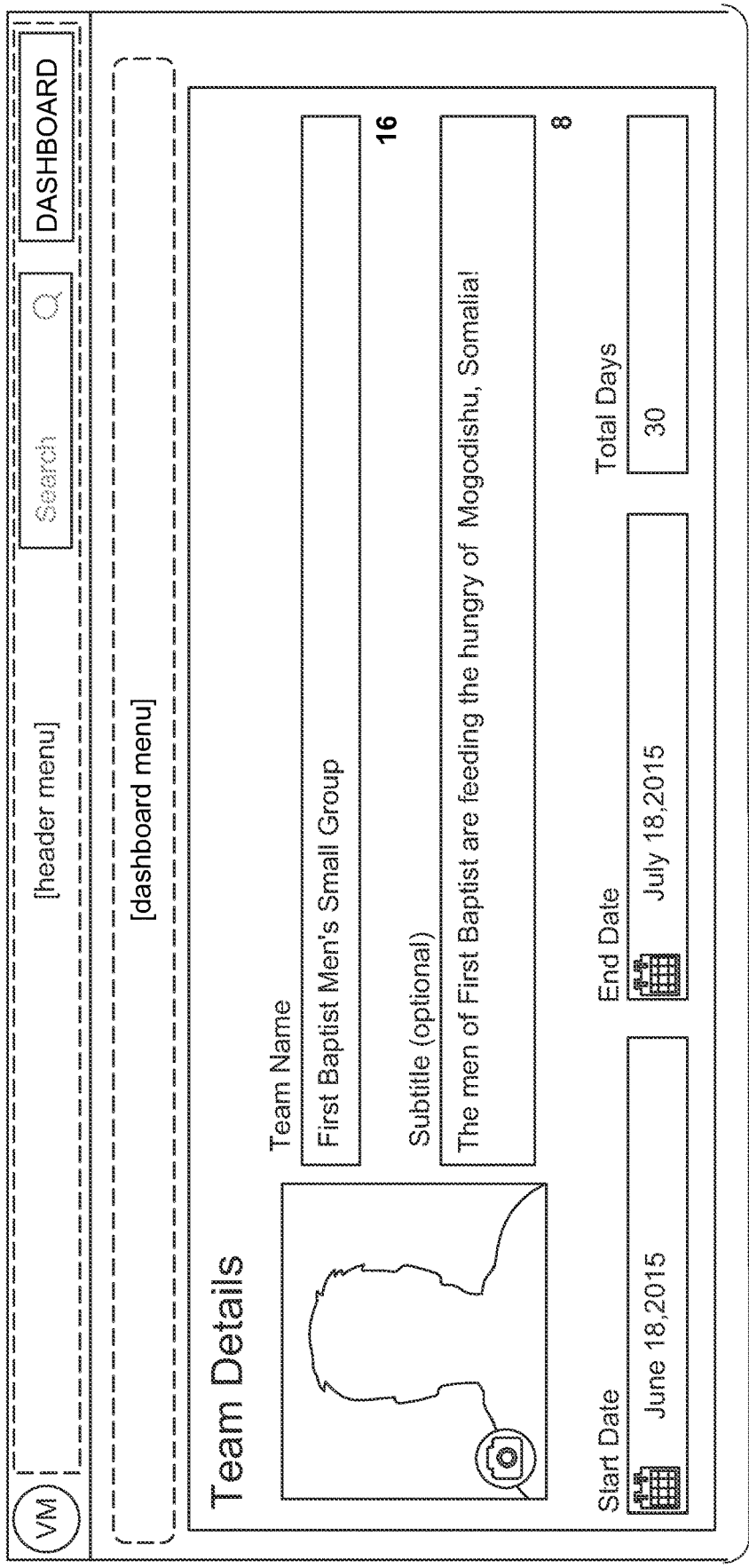
FIG. 10 shows a tool for creating a team.
Figure 10:
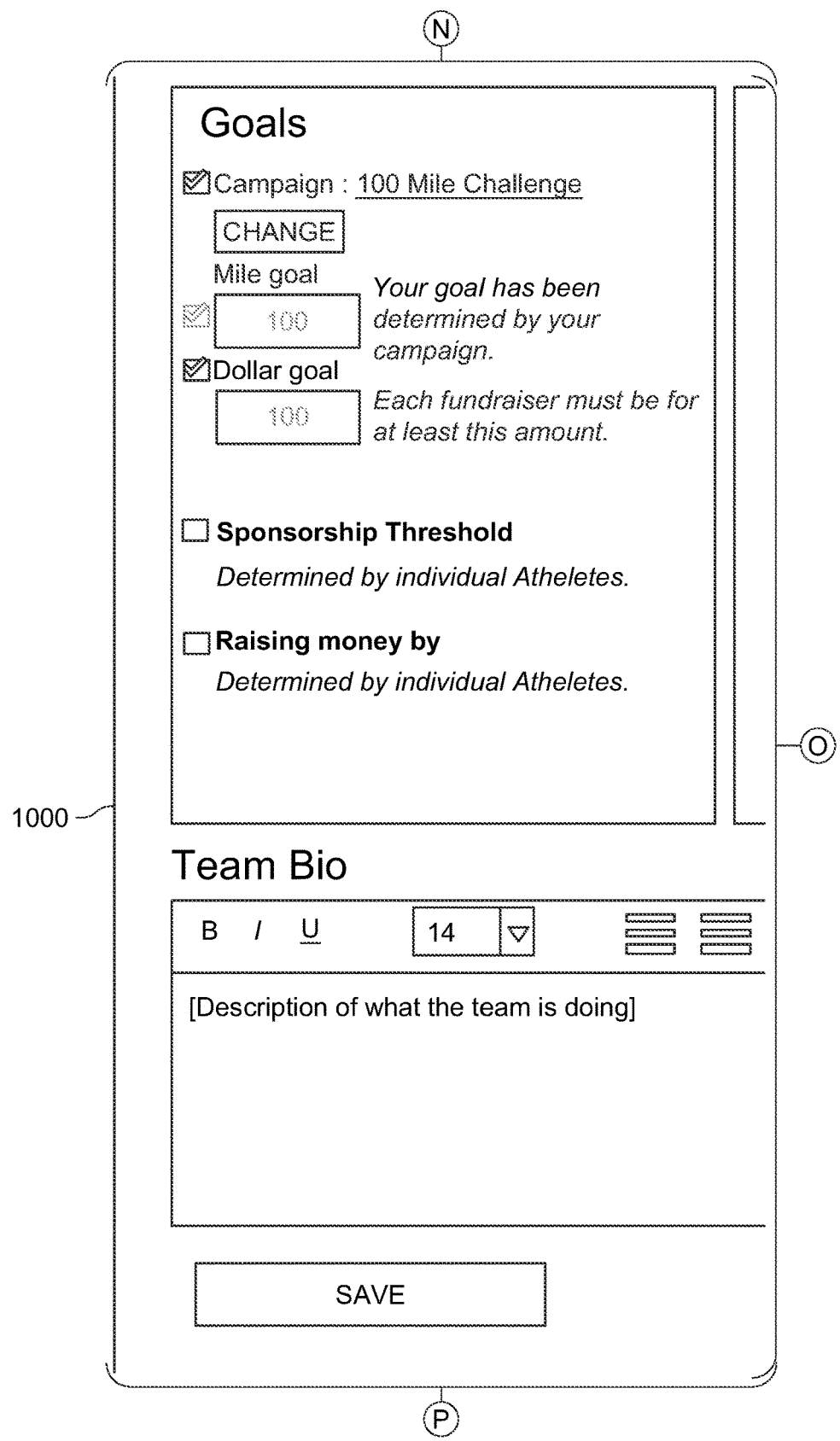
Figure 10:
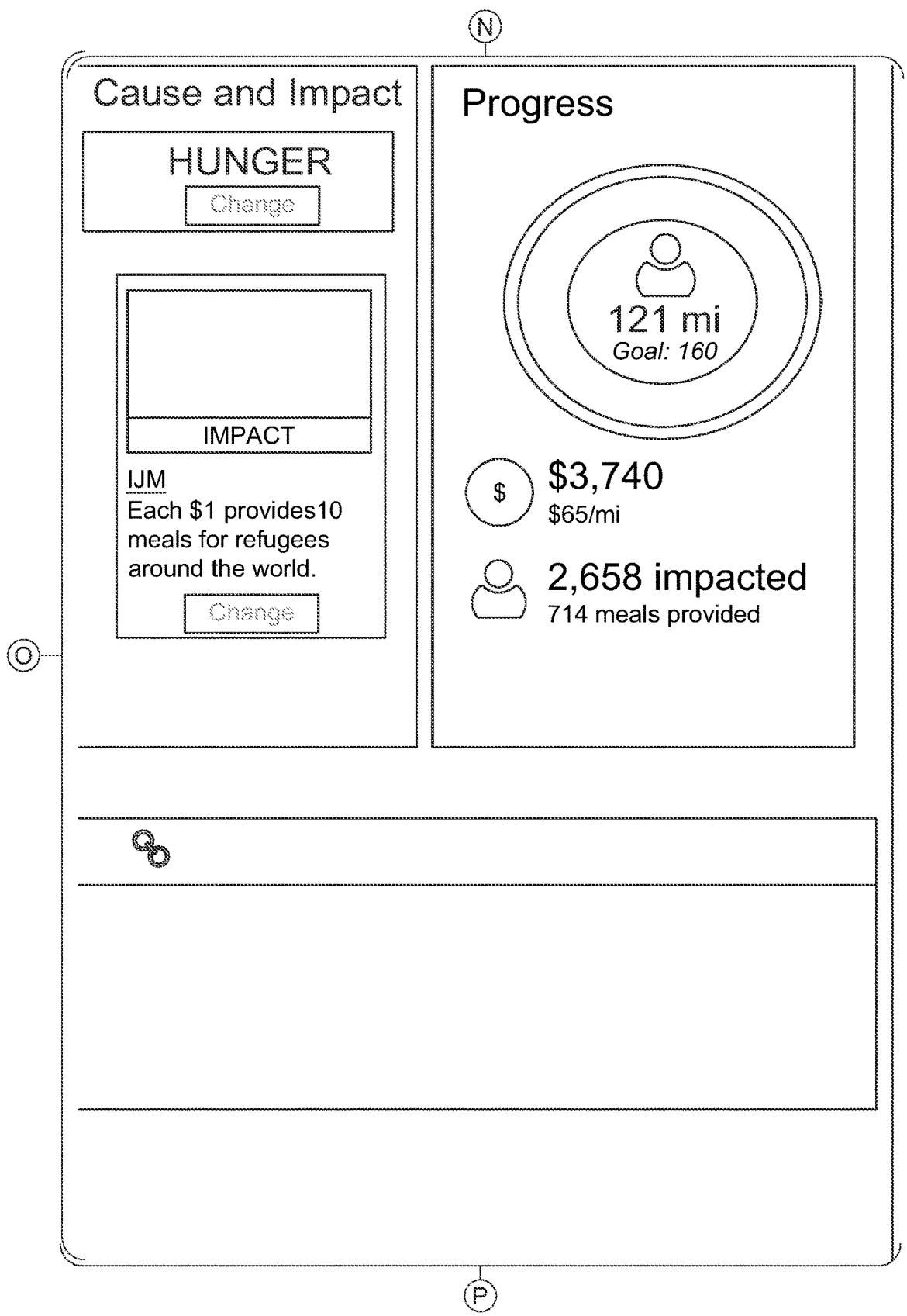
Figure 10:
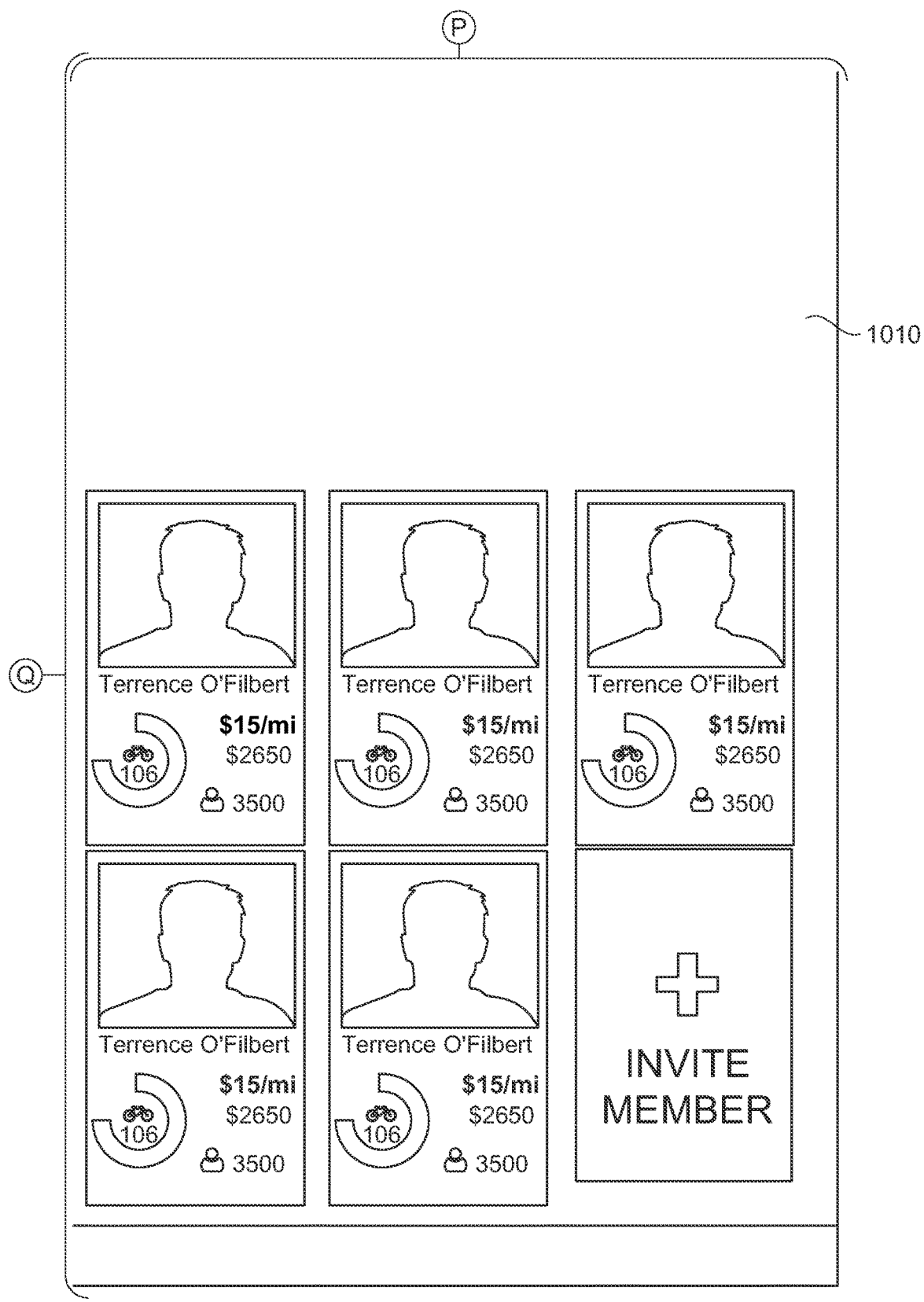
Figure 15:
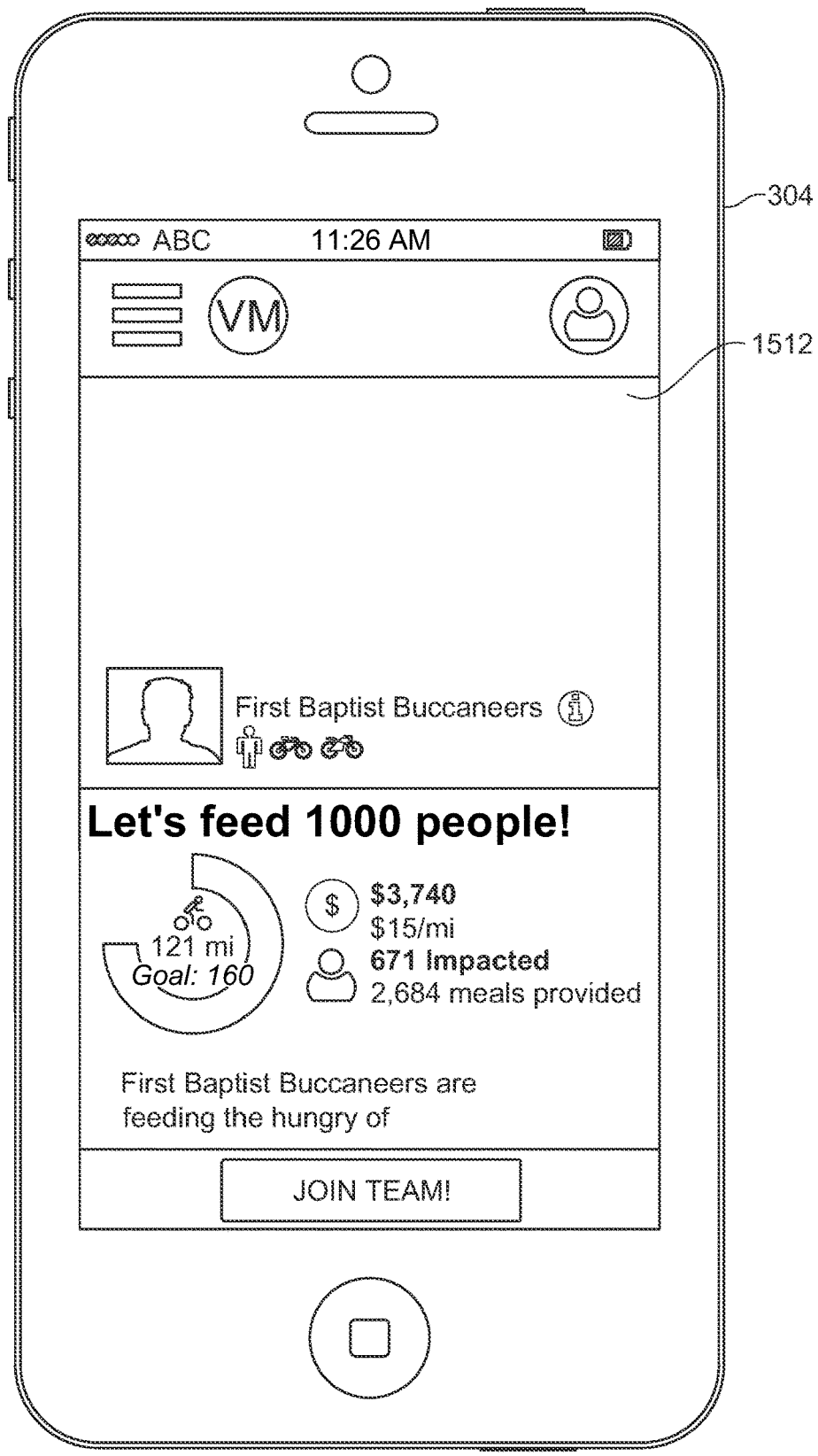
FIG. 15 is illustrates an example leaderboard presented by the mobile app.

As mentioned above, it is also desirable in certain circumstances to create a team campaign. FIG. 10 illustrates a team campaign setup tool 1000. In a manner somewhat similar to the individual campaign, tool 1000 also includes necessary tools to establish a team and to input a title, subtitle, start dates, goals, outline an impact and cause, and provide a team description. In addition, a team roster 1010 is provided, which lists existing members of the team, and also identifies those individuals who have made requests to join. This will involve the appropriate linking to entity records for each of the team members involved. In this manner, team rosters, and details of a team campaign can easily be managed. In addition, the display information outlined in FIG. 10 provides one example of a team dashboard 1012 which displays information related to the team activities and membership. In addition, FIG. 15 illustrates an alternative team dashboard 1512, as displayed on mobile device 304.

Figure 11A:
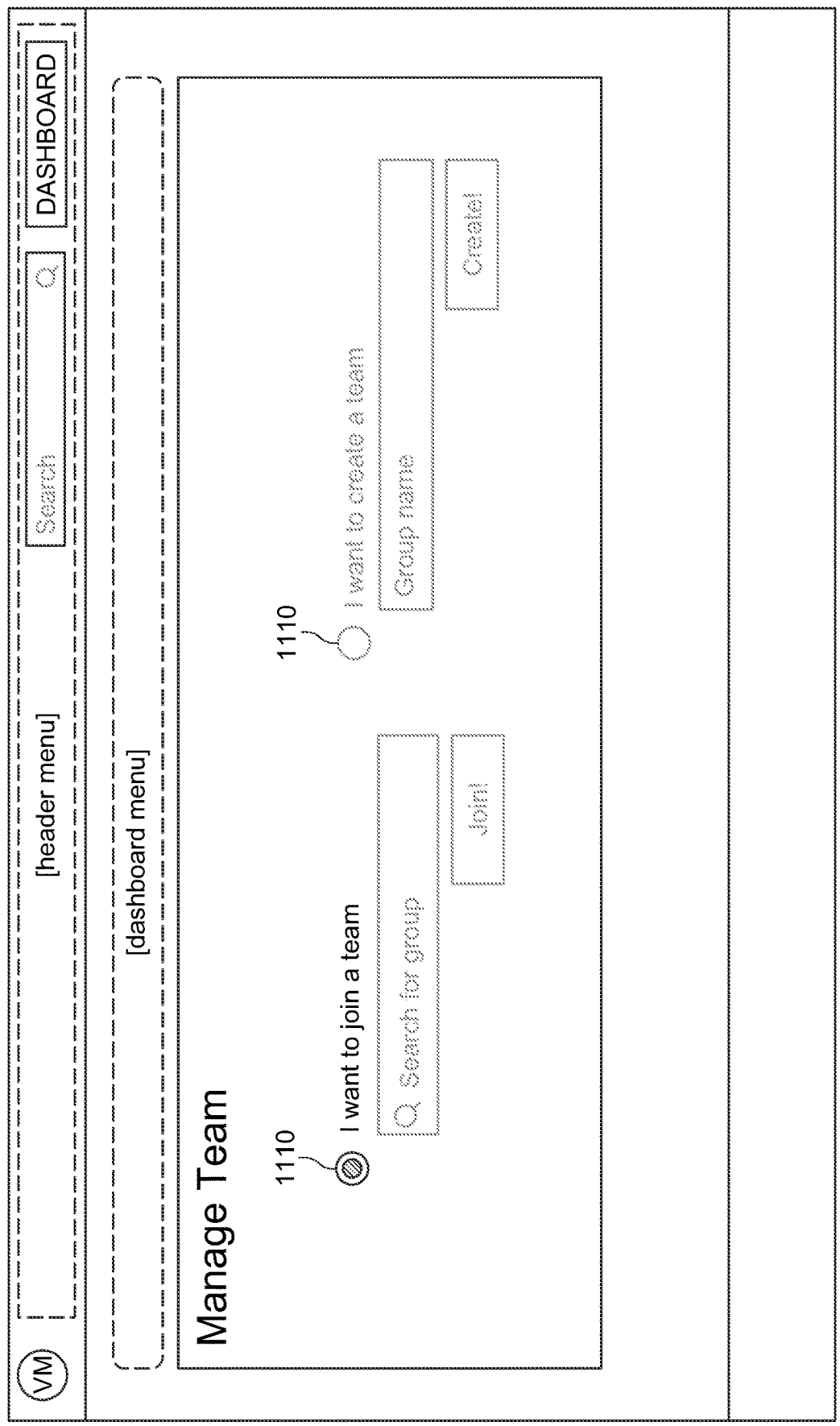
FIGS. 11A, 11B, 11C and 11D all present further tools to join, create or manage teams.
Figure 11B:
Figure 11C:
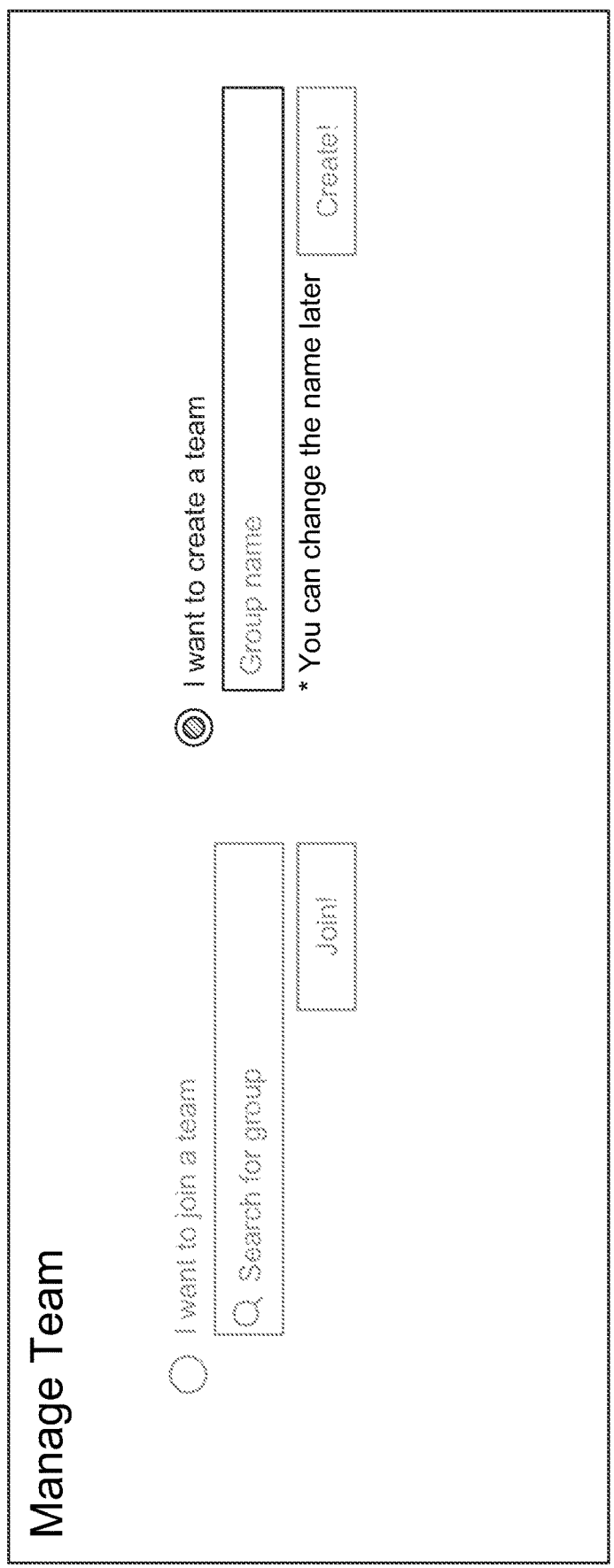
Figure 11D:
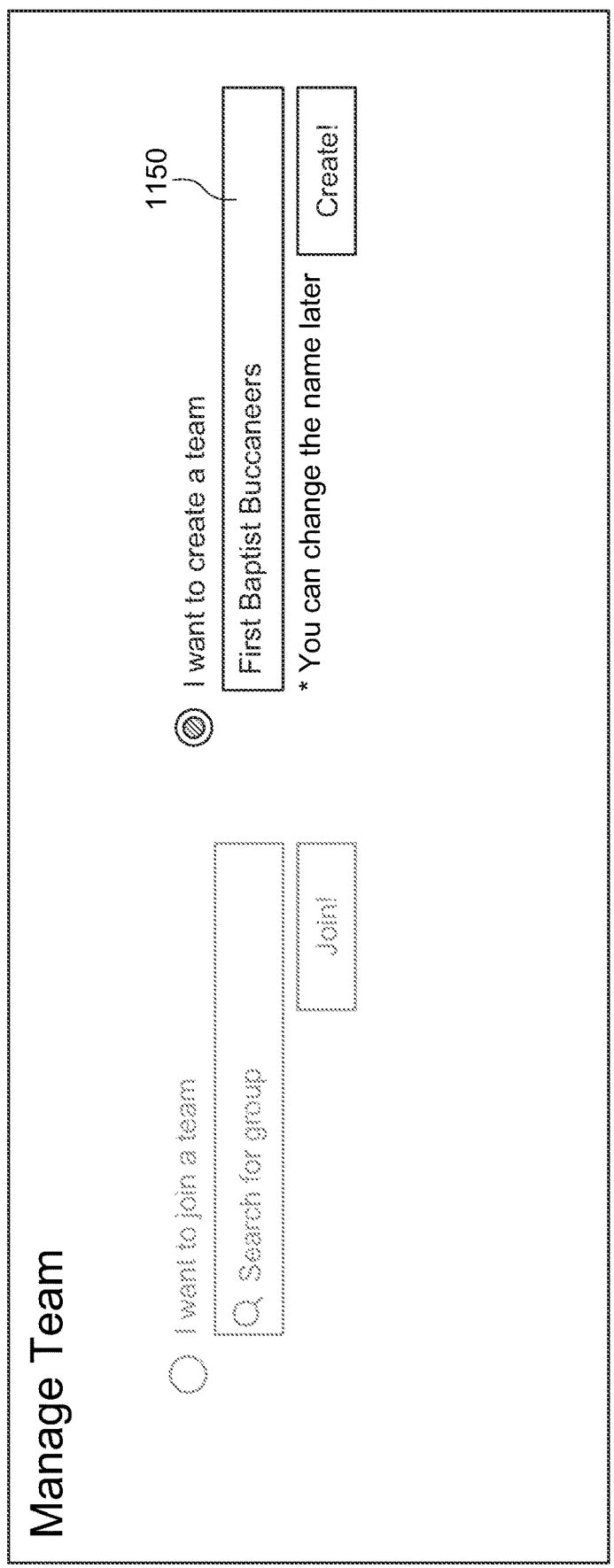

Further details related to team management are set forth in FIGS. 11A through 11D. As illustrated in FIG. 11A, an initial team selection screen is provided, allowing an individual to join a particular team by selecting an appropriate selection tool 1110 by making an appropriate selection, a drop-down menu then appears, which is similar to that illustrated in FIG. 11B. As can be seen, a subsequent tool identifies a listing of possible teams, and when selected, a "join" button 1120 is provided. By making this appropriate selection, a request is produced, and sent to the appropriate team manager. Once this request has been transmitted, an indication 1130 is provided to the user confirming that their request has been transmitted. Information from the related entity records is then tied to the selected team.

In those circumstances where an individual would prefer to create a new team, FIG. 11C illustrates the tools available to carry out this process. Specifically, FIG. 11C allow for the selection of a team creation tool, by first inputting a title at input box 1150. Once the "create" button is hit, the system will then revert to the team creation tool illustrated in FIG. 10 above.

Figure 12:
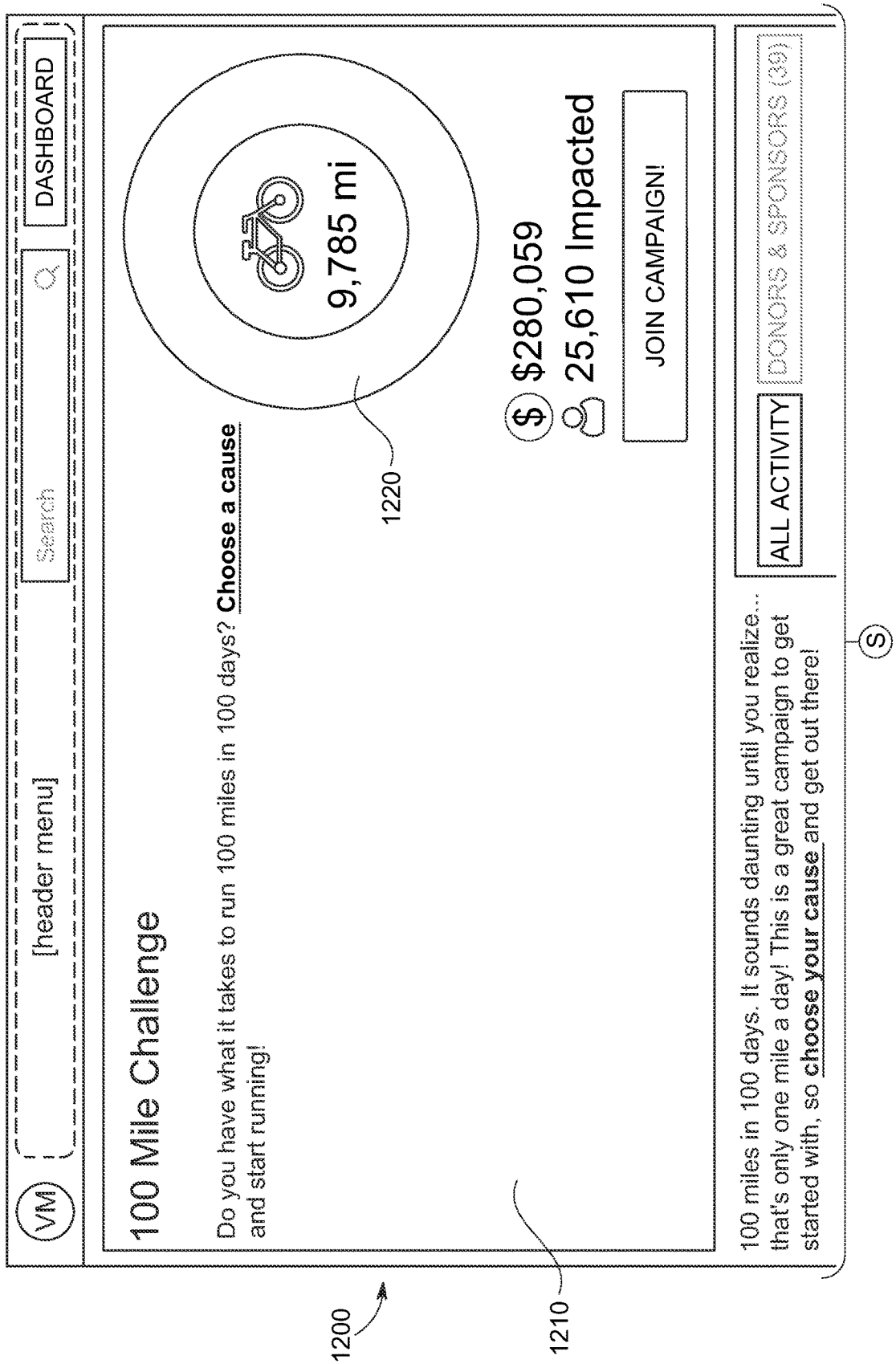
FIG. 12 illustrates a campaign overview.
Figure 12:
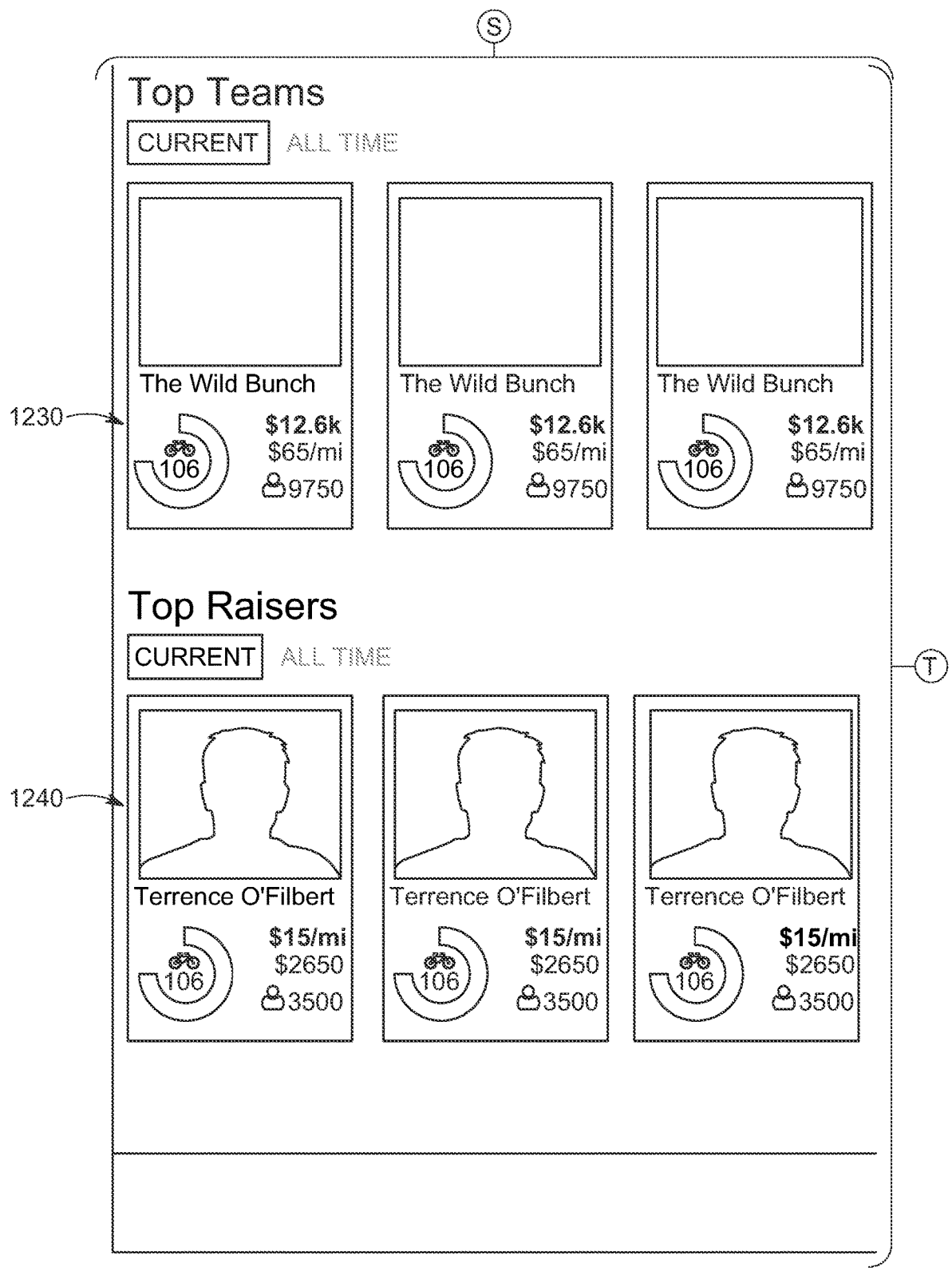
Figure 12:
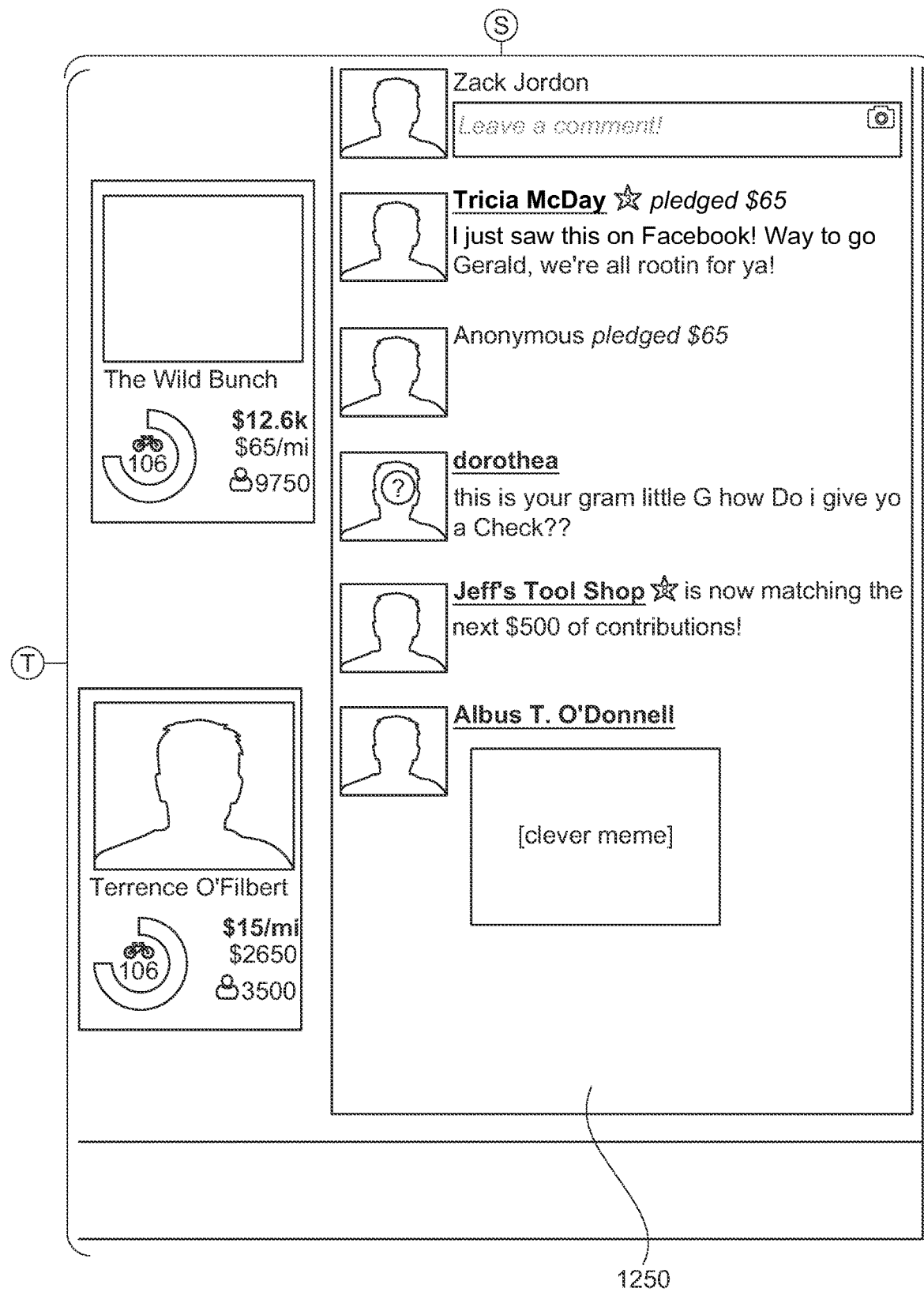

As anticipated, there are often instances where it is desirable to know or publicize who the top participants/achievers might be. Referring now to FIG. 12, a general leader board 1200 is illustrated which provides one mechanism for further promotion and sharing of information. As shown, the particular cause is first illustrated in the summary section 1210. Although not included here, it is anticipated that a written description or summary may be included in summary section 1210, which is obviously customizable. Linking to previous information about this particular fundraiser or cause, the detailed information is summarized and reproduced here for easy republication. In addition, a progress wheel 1220 is displayed. This is consistent with the previous progress displays discussed above. Further, the top teams 1230 and top individuals 1240 are each listed in respective sections of this overall leader board. Lastly, a comments section 1250 is provided, thus allowing other individuals to make notes about contributions, and provide words of encouragement. In this manner, progress and achievements are easily displayed and disseminated by directing appropriate individuals to this page. As outlined below, further promotion tools will also coordinate with this information.

Figure 13:
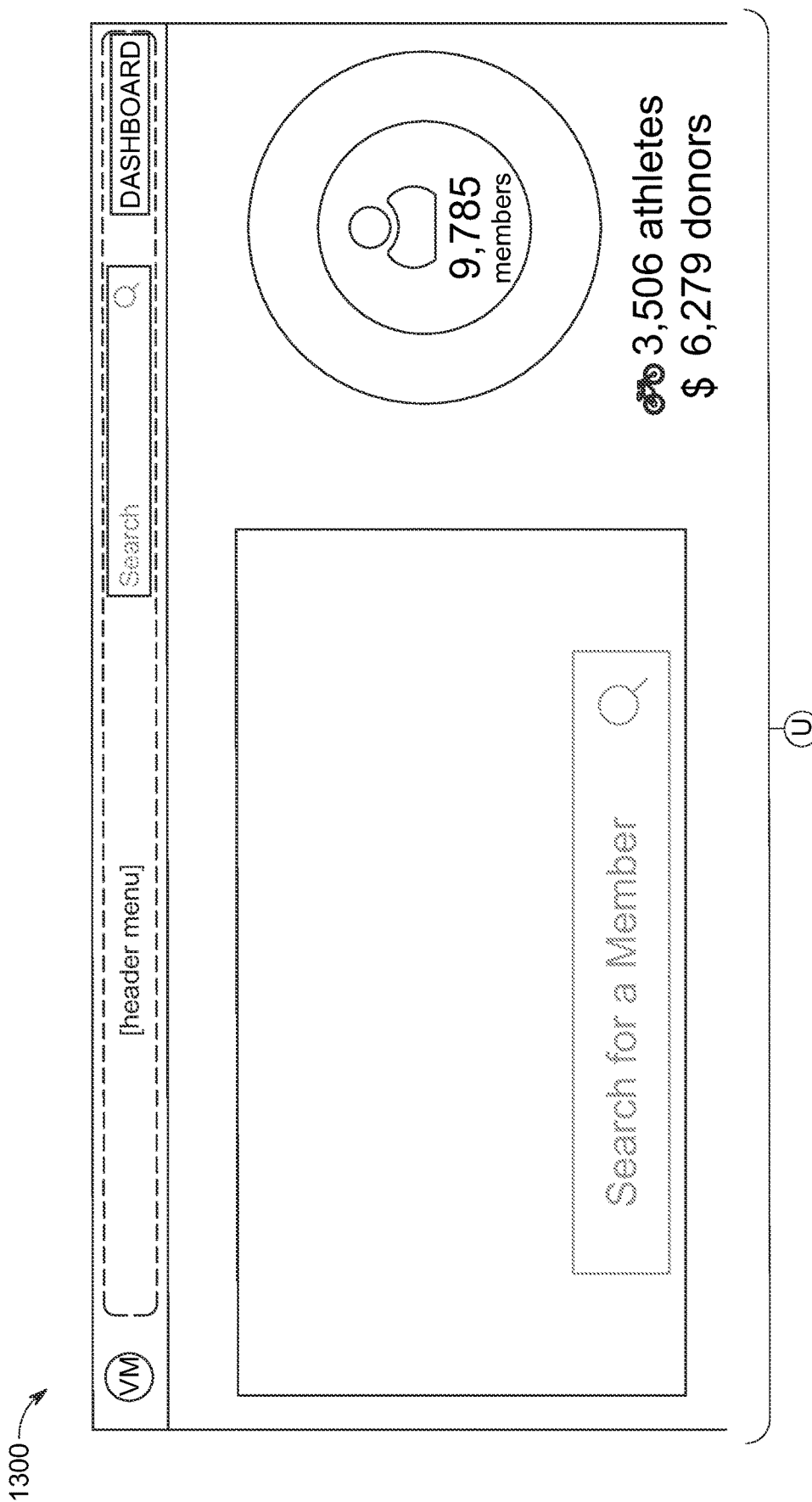
FIG. 13 shows an example leaderboard.
Figure 13:
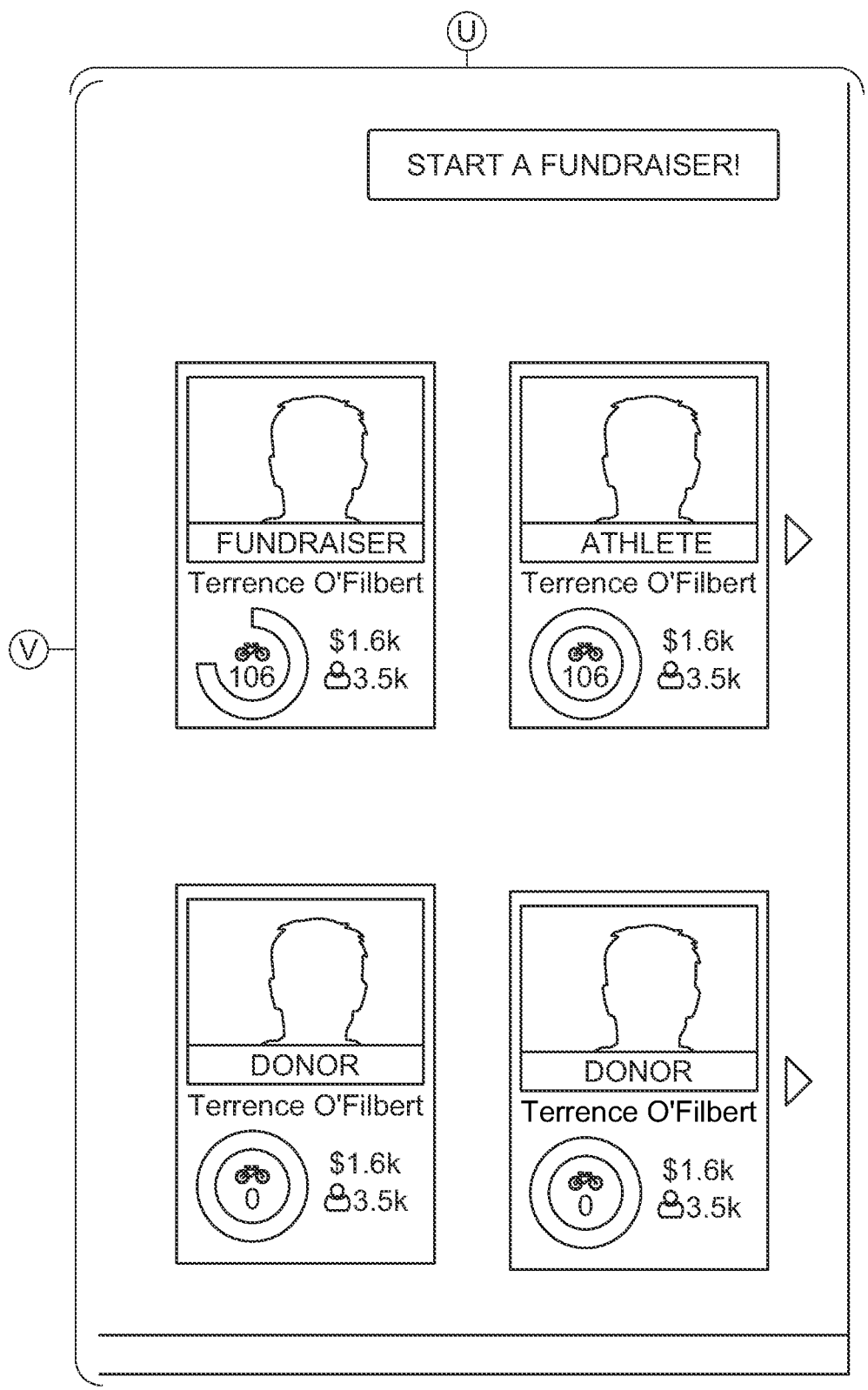

In a similar manner, the fundraising progress system 10 also has the ability to generate leaderboards at virtually any point in time. As shown in FIG. 13, a members leaderboard 1300 will generally illustrate an indicator of progress, and a listing of the top athletes and the top contributors. It is contemplated that the top contributors will be automatically updated. In addition, this members leaderboard will provide a link to individual dashboards of athletes or participants involved. As shown, the members leaderboard 1300 itself will also provide small snapshots of individual progress, again using graphical illustrations showing this information. Based upon the treatment of various entities, to cover virtually every user or participant, the necessary correlation and tying of information can be achieved.

Although the above leaderboard and dashboards are generally illustrated as screen shots, it is contemplated that this same information could be available via a mobile app operating on any type of mobile device. In addition, one advantage of the mobile app is its ability to operate as a tracking device, or its ability to coordinate with a stand-alone personal tracking device. In this way, again, information is accurately and instantaneously updated when fundraising activities are carried out.

As also mentioned above, the ability to easily and efficiently coordinate collection and payment activities is a unique tool of fundraising coordination system 10. FIG. 14 illustrates a diagram related to the payment and collection module. As shown, and as previously suggested, when donations are made, donors are provided with the ability to supply information related to their financial institutions, and payment mechanisms that may exist. As illustrated in FIG. 14, the donor will supply this information, which is thus securely saved within system 10. In addition, secure communication capabilities are also provided, thus allowing system 10 to cooperate with these financial institutions as necessary.

More specifically, FIG. 14 illustrates a pledge-per-mile tool 1410 and a one-time donation tool 1420. Clearly, pledge-per-mile tool 1410 includes an ability to input a dollar amount per mile in input range 1412. Based upon information previously provided, other details regarding the donation are automatically populated, such as the anticipated distance to be traveled, and the resulting impact of the donation. In addition, to provide user flexibility, a max donation limit 1414 can also be input. In addition, other links and tools may be provided to accommodate easy operation. Most significantly, an authorization tool 1416 allows a user to enable the system to provide for automatic payments. As contemplated, the present system overcomes many technical challenges to achieve this. For example, secure communication is necessary and inherent when dealing with financial transactions. As such, all communication related to sensitive financial information is encrypted and strictly controlled. Further, tools are provided allowing for (and requiring) passwords and PIN numbers to assure additional levels of security. In this manner, the financial transactions can be easily and efficiently carried out.

In a similar manner to that discussed above, one-time donation tool 1420 allows for all of the same type of mechanisms, however, are tailored for one-time donations. Again, the system will naturally provide related calculations based upon the donation, such as estimated meals provided and estimated lives impacted, based upon the single donation input to donation field 1422. While not illustrated in FIG. 14, the next steps involve payment coordination as desired. As can be contemplated, this would take place in a related payment screen, which would be presented to a user in the next steps.

Figure 14A:
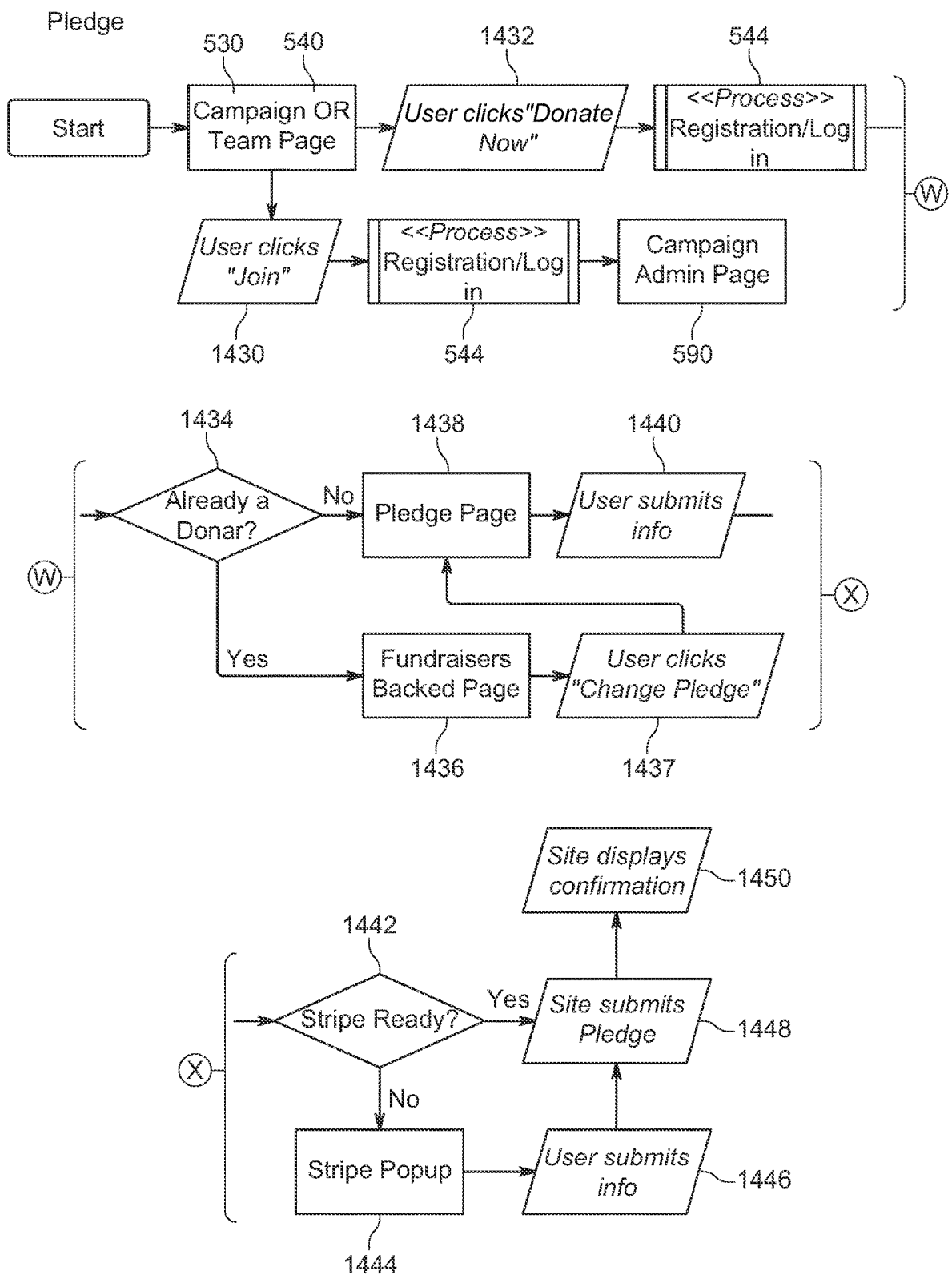
FIG. 14 is flow diagram related to the payment module one particular embodiment, with FIG. 14A illustrating a flow diagram relating to one donation process.

For the details regarding the donation or pledge process are illustrated in FIG. 14A. As generally discussed above, the system will include both a team page 530 or a campaign page 540. Those pages are collectively illustrated as one block in FIG. 14A due to the common funtionality provided therein. From this page, the user is allowed to "join" 1430, which will again bring a user to registration page 544. Through this process, the campaign administration page 590 is displayed, which is discussed above in relation to FIG. 5A. Through this process, a user is allowed to join a campaign or a team and thus move forward.

Similarly, a user can click donate now 1432, which again will cause the user to be brought to a registration/login process 544. From here, the system determines if the user is an existing donor at decision step 1434. If the user is already a donor, they are brought to a fundraiser's fact page, which lists the various campaigns for which the donor is already participating. If not already a donor, the user is brought to a pledge page 1438, which allows the submission of user information 1440. In order to process financial transactions, this page then acquires whether the user has previously submitted financial information at decision block 1442. If no, a financial page is presented at step 1444, which allows the user to submit financial information 1446, and then is brought to a financial processing page 1448 where the pledge is submitted. Naturally, if a user already has submitted financial information, decision block 1442 will recognize this and bring them directly to a pledge submission page 1448. Lastly, once the transaction has been processed, a confirmation is presented at step 1450.

Generally outlined above are several tools and coordinating systems which allow for fundraising campaigns to be carried out smoothly and efficiently. While each of the tools has been explained from a user perspective generally, it is also contemplated that several tools will exist to perform further functions. Generally these tools, or operating modules, will collectively utilize the information and systems discussed above to carry out specific goals unique to the fundraising process. Examples of these modules will likely include: (1) a Communication and Promotion module 80; (2) an event coordination module 70; (3) a financial/collections module 100; and (4) a setup module. Each of these tools or modules will allow an appropriate administrator or user to complete a particular function or set of functions related to the relevant task.

Figure 17:
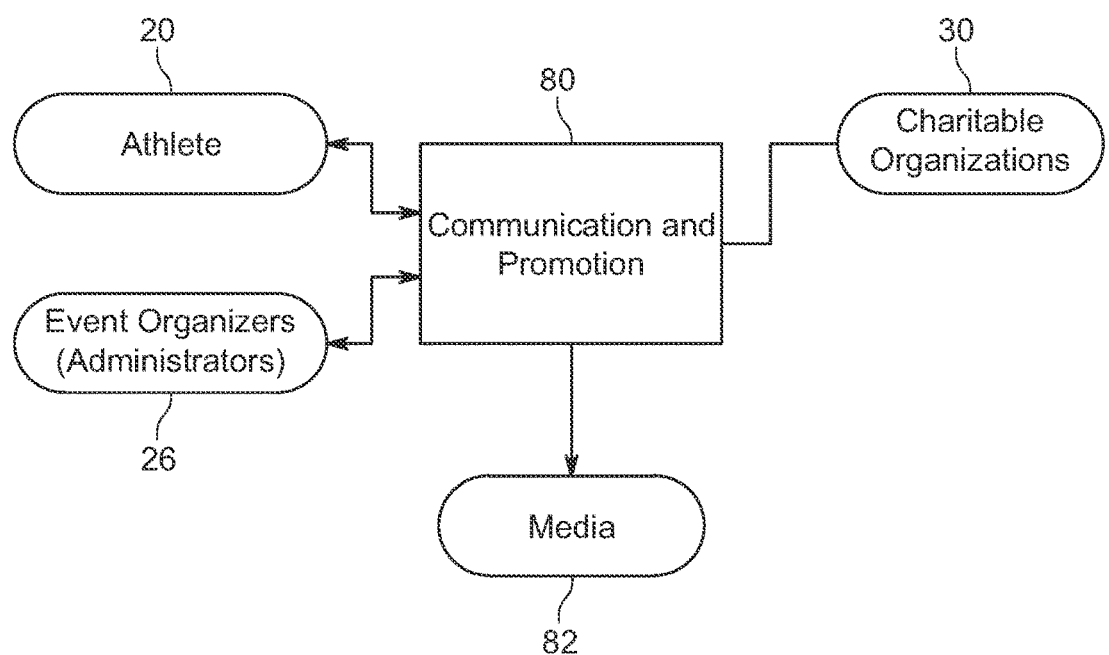
FIG. 17 is a schematic diagram showing a Communications and Promotion module.

As mentioned numerous times above, promoting of fundraising events is often critical. The level of participation, and the success or failure of an event can be greatly influenced by appropriate promotion and publicity. An administrator wishing to provide further publicity is provided with tools that allow for the efficient collection of information from the various dashboards mentioned above, so that this same information can be utilized for promotional purposes. FIG. 17 schematically illustrates communication and promotion module 80, as contemplated. As shown, communication and promotion module 80 will provide communication links to the athlete 20, the charitable organization 30, and event organizers 26. Utilizing these links, and the information generally outlined above, communication and promotion module 80 can easily pull and aggregate all statements and comments by the various athletes, and the charitable organization 30, to create collective advertising/promotional pieces which are timely and appropriate. It is further contemplated that the event organizers themselves may have input regarding the content of any promotion pieces, thus the link to their information is included. Eventually, some type of media 82 is created, which may include print advertising, video, social media posts, sound recordings, photographs, and any other mixed media type message desired by the users. Naturally, this can be published or provided to any type of promotional outlet as desired.

As generally outlined above, all appropriate communication channels are provided by system 10, and access to individual content is readily accessible, thus making the advertising and promotion functions relatively easy, and very effective due to the genuine content involved. In this manner, publicity of fundraising activities becomes very coordinated and fairly straightforward.

Figure 18:
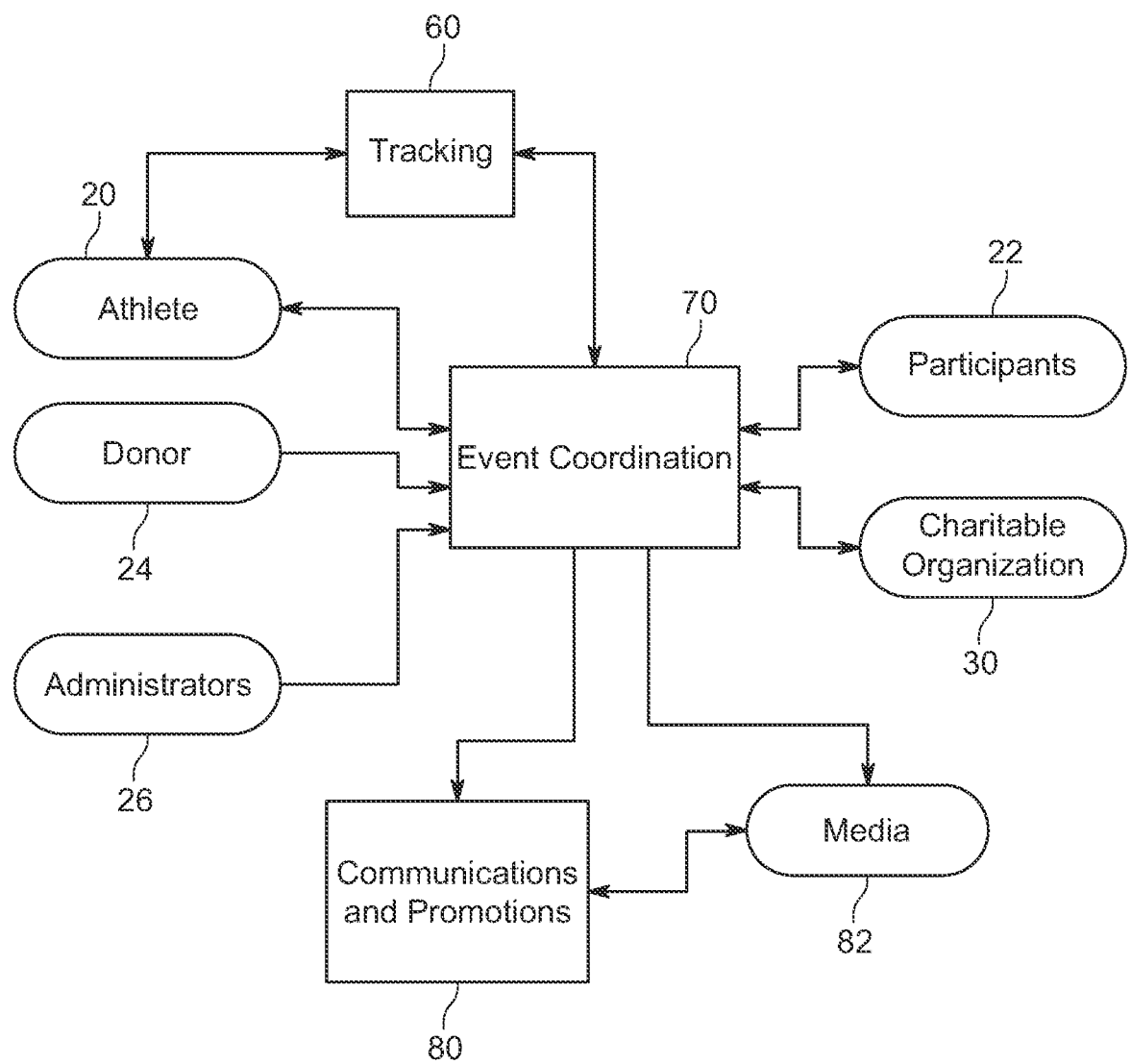
FIG. 18 is a schematic diagram illustrating an event coordination module.

If a campaign involves a particular event (e.g., a bike rally or 10K race), it is also possible for a user of this system to make use of an event coordination module 70 which can easily and effectively provide schedules, participant lists, volunteer lists, donation lists, donor lists, contact information and other information necessary to effectively and efficiently administer the event. A general schematic illustration of an event coordination module 70 is illustrated in FIG. 18. As can be seen, event coordination module 70 communicates with several different sources of information, including the entity records athletes 20, donors 24, administrators 26, other participants 22 and charitable organizations 30. It is contemplated that event coordination module 70 would be utilized for the initial setup and administration of events. As such, the links to athletes 20 would provide a participant list or roster as necessary. In a similar manner, other participants 22 could also be identified utilizing sign-up tools, etc. One example might include the coordination and identification of volunteers who would help in carrying out the particular event. In addition, event coordination module 70 would also likely communicate with each individual athlete tracking system 60, to provide real time up-to-date information regarding each athlete's progress and fundraising activity. Again, the use of tracking devices to provide automated and up-to-date information provides a level of efficiency not currently available. Further, it is anticipated that event coordination module 70 would also communicate with communication and promotion module 80 so that promotional information and promotional pieces for each particular event could be created at any time. As discussed above, various types of media 82 could thus be produced as desired.

Figure 16:
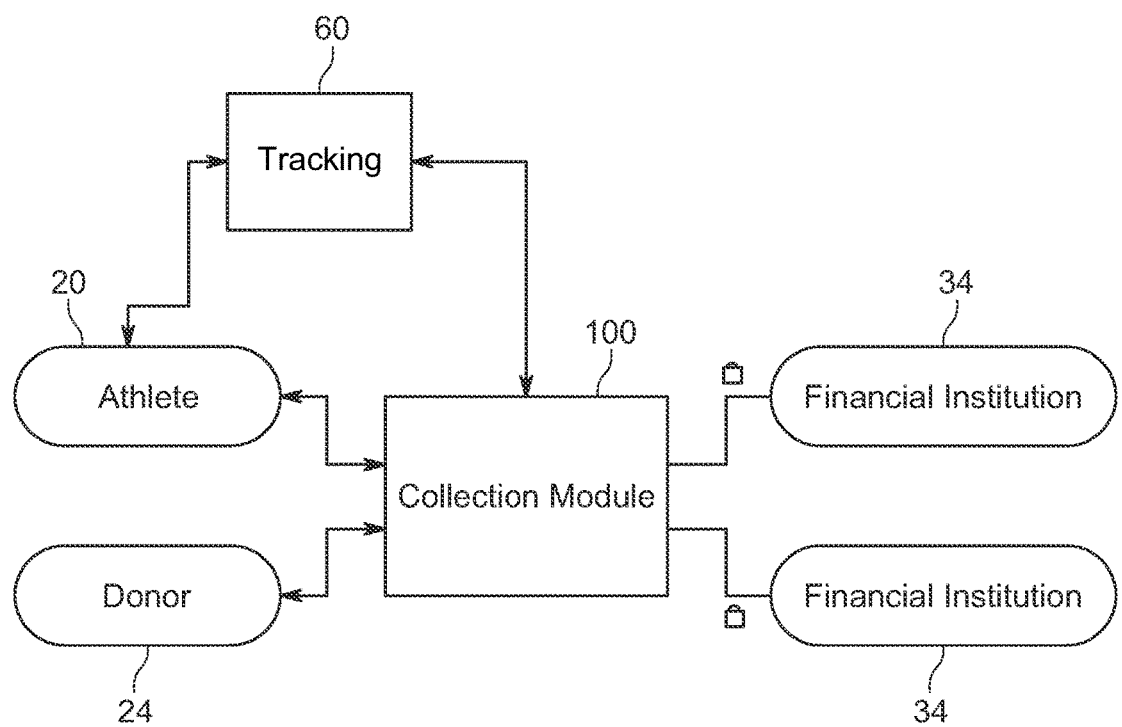
FIG. 16 is a general schematic diagram showing a collections module.

As mentioned above, the donation and progress reports/information related to fundraising activities are effectively and efficiently maintained utilizing various tools. In addition, it is contemplated that financial/collections module 100 would be provided, allowing accounting or financial personnel to easily determine amounts pledged, collected, and overall fundraising metrics. Since donations are conveniently recorded, and in some cases automatically pulled from appropriate financial accounts, the financial/collections module 100 will provide invaluable information by simply communicating appropriately with other portions of the overall system 10. Financial/collections module 100 is schematically illustrated in FIG. 16. As would be anticipated, financial/collections module 100 will communicate with athletes 20, donors 22, and financial institutions 34. It is anticipated that communication with the financial institutions would be carried out through secure communication channels, especially given the need for security and confidentiality of financial information. That said, this connection allows users to easily complete financial transactions, thus avoiding the need for continuous reminders, follow-ups, etc.

As shown in FIG. 16, financial/collections module 100 will interface with athlete/participant tracking mechanisms 60, utilized to track athlete performance and activities. In this manner, collections module 100 will have up-to-date information related to athletic or activity performance, which then can be translated to financial donations based upon the pre-established metrics discussed above (e.g. $1.00/mile). Although not shown, financial reports will typically be provided to charitable organizations 30 as well which summarize financial results in different ways. Financial/collections module 100 is configured to uniquely communicate with and handle all information necessary so that reports can be produced and pledges/donations can be quickly and easily collected.

As another instance where system 10 may be helpful, when carrying out fundraising activities, at some point the event or activity will be completed. At this point, it is contemplated that system 10 will automatically calculate the donation amount, and utilizing the above-referenced information related to the financial institution, automatically process payments. Again, security measures will be incorporated to effectively carry this out. In this manner, there is no need for the athlete or participant to follow up or carry out fundraising collections. In addition, the charity involved is more likely to obtain payment, thus helping them to achieve financial goals.

As would be anticipated, a mobile app running on mobile device 304, and coordinating with the above-mentioned fundraising system 10, provides a very beneficial and meaningful tool for tracking and administering fundraising campaigns. As mentioned above, a campaign may often involve some type of physical activity. Again, examples include running, biking, walking, etc. As also mentioned above, a mobile device 304 is often used for tracking physical activities and/or movements of an athlete/participant. By providing the mobile device with an appropriate app, which provides appropriate interface details to carry out communication with fundraising system 10, and which provides a movement tracking device for the athlete/participant, creates a more efficient, user-friendly and valuable tool for those involved with fundraising activities. As would be appreciated, the mobile app is configured to interface and communicate with fundraising coordination system 10, so that all information and activity is coordinated and consistently updated. That said, providing the mobile app running on mobile device 304 which also has an integrated tracking device, provides a unique ability to organize, manage and track fundraising activities when involved with a particular campaign.

Figure 19A:
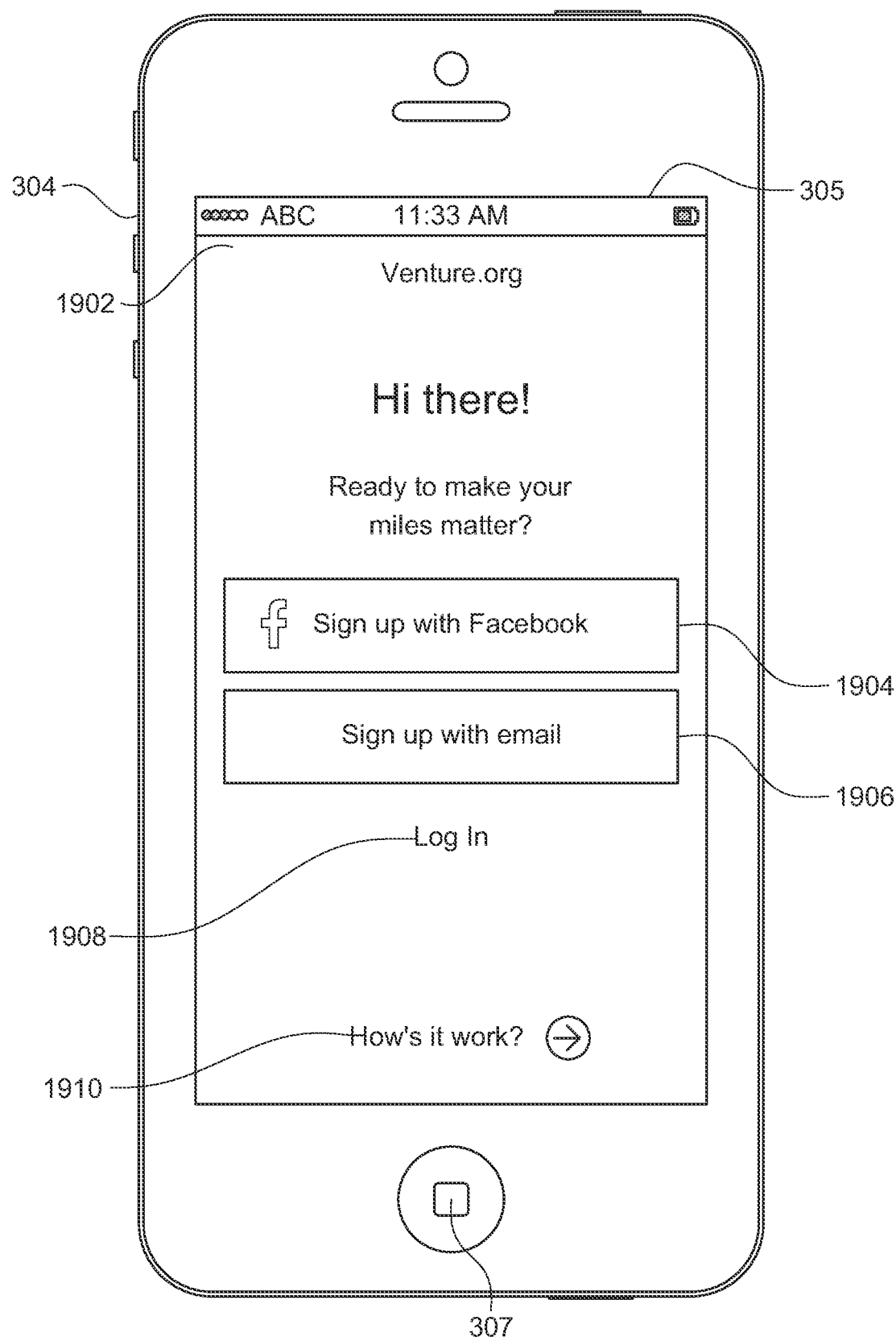
FIGS. 19A-19I illustrate various user interface screens presented by the mobile app.

Various screenshots from one embodiment of the mobile app are displayed in FIGS. 19A through 19I. As will be recognized to those skilled in the art, the communication and processing techniques involved to carry out the various functions involved requires specific coordination and management. Starting with FIG. 19A, mobile device 304 is generally illustrated having a display 305, and various interface buttons 307. As illustrated, FIG. 19A shows a welcome screen 1902 which provides a welcome message, and various interface mechanisms for user interaction. This specific embodiment includes a "signup with Facebook" button 1904 and a "signup with email" button 1906. These buttons or user interface tools are provided to allow first-time users to sign up or enroll with the system. In a similar manner, a "log-in" button 1908 is displayed, providing existing users with the ability to log in. As will be anticipated, the log-in process for the mobile app is generally similar to the log-in process outlined above, and typically involves user name and password-type log-in. In addition, the information button 1910 is provided, which allows additional information about the app and the various interface options to be displayed on the mobile device.

It is contemplated that the mobile app is appropriately downloaded and installed on the mobile device 304. This process is undertaken using the well-known mechanisms such as the Google Play Store™ and the App Store™ available from Apple. Naturally, other alternatives may exist.

Figure 19B:
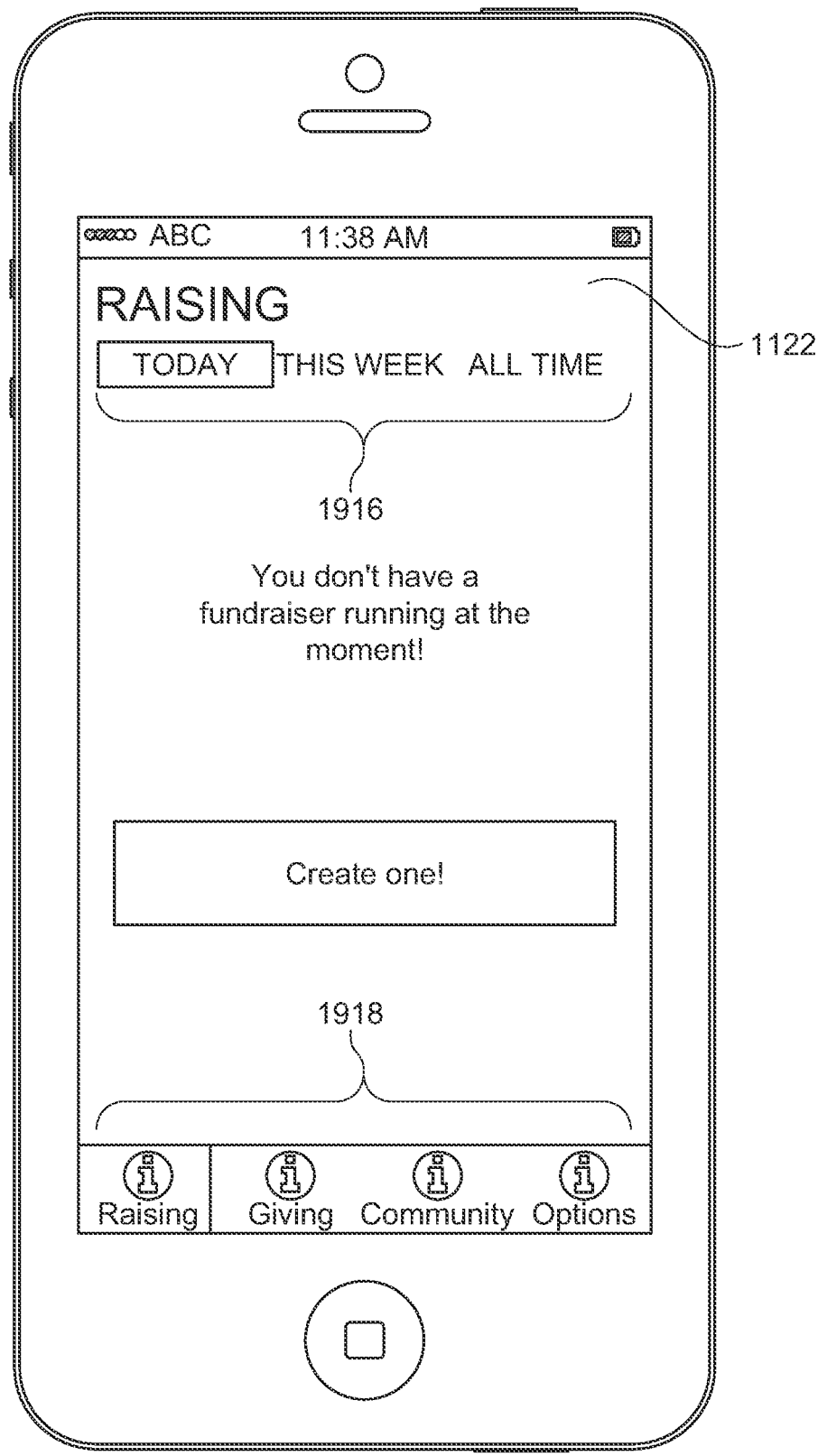

Turning now to FIG. 19B, once a user is logged in, they typically will be presented with an initial "raising" screen. This is directed toward quickly and efficiently displaying fundraising activities for the particular user. When a user may log in, and is not involved in a fundraiser or campaign of any type, the raising screen shown in FIG. 19B is presented. As seen, this allows a user to enroll in a fundraiser or create one. Alternatively, if the user has enrolled or is involved in a current campaign, as discussed above, raising screen 1920 illustrated in FIG. 19C, is presented to the user. As shown in both of these screens, the user is presented with a timeframe selection tool 1916, and various menus 1918 along the bottom. Referring to the menus 1918, the various display options include bringing up the above-mentioned raising screen, a related "giving" screen, a "community" screen, or an app options screen. Each of these will be discussed further below.

Figure 19C:
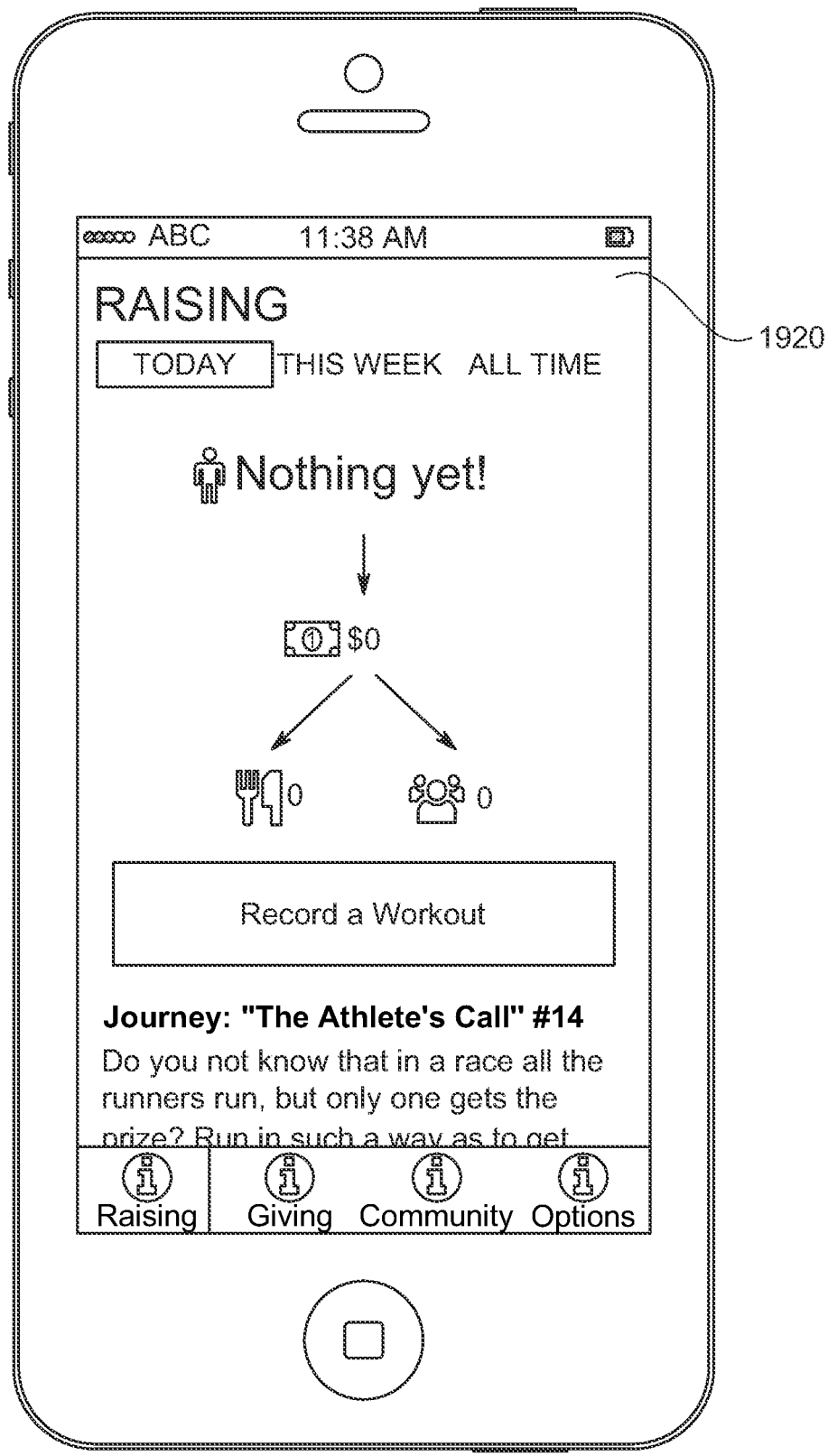
Figure 19D:
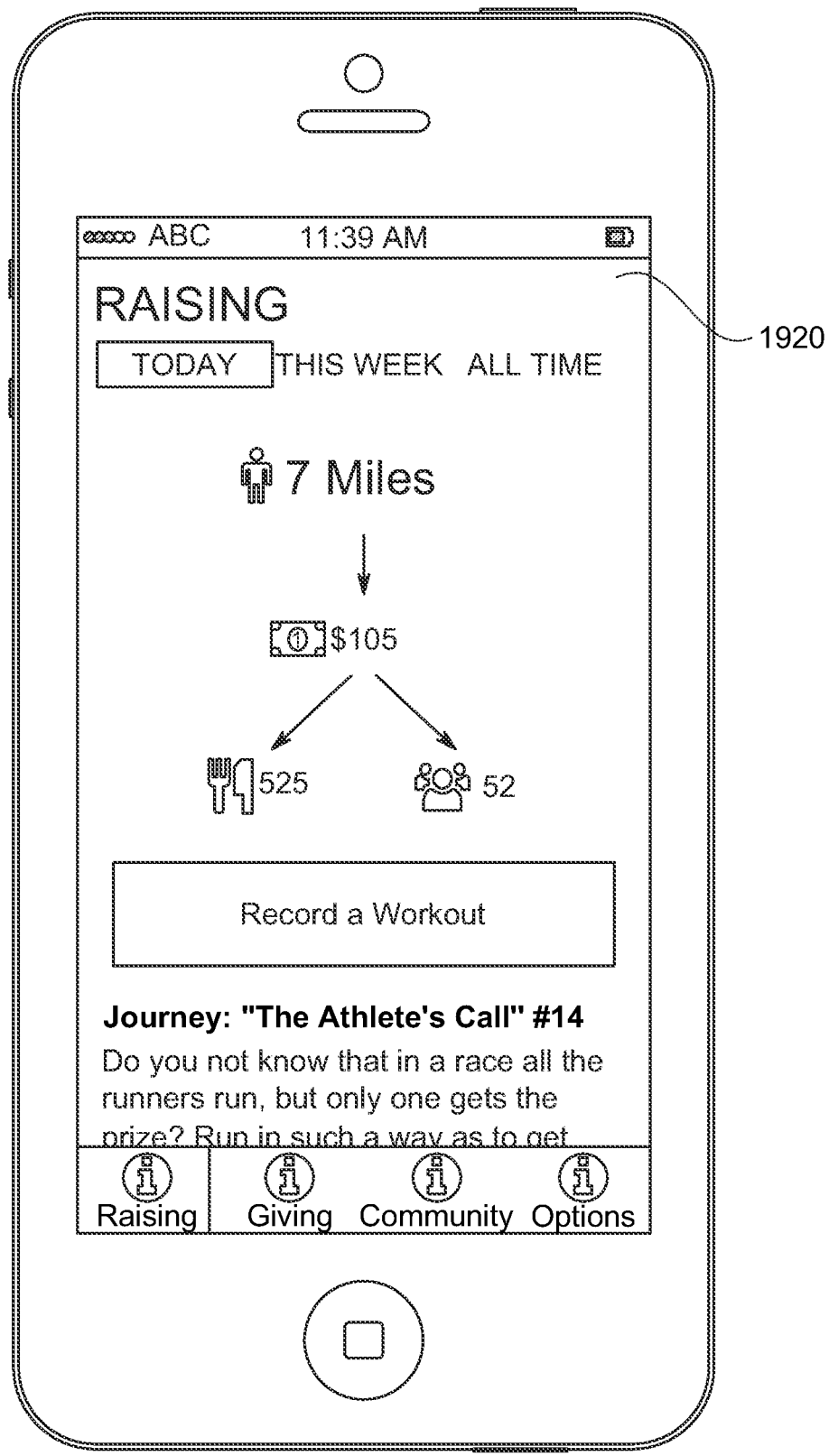

Again, if a user is participating in a current campaign or fundraiser, raising screen 1920, illustrated in both FIGS. 19C and 19D, are presented. FIG. 19C illustrates a situation where the athlete/user has not started a campaign, while FIG. 19D presents a situation where a campaign is in progress. As can be seen, each of these screens includes a selection option labeled "record a workout." By selecting this option, the system and app will correlates any subsequent activity with an identified campaign or fundraiser. More specifically, the tracking capability of the mobile device 304 is thus utilized to track physical movement and/or activity, and thus record distances traveled or time undertaken by the user participating in an activity. For example, a user/athlete running with the mobile device 304 will thus be tracked, and the distance traveled will be recorded. This distance is then communicated back to fundraising system 10 as the user progresses.

Although not specifically illustrated, it is also contemplated that the raising screen 1920 will include a button to designate the end of a workout, thereby providing an ability to record both a start point and an end point. Based upon the information recorded by the mobile device 304, and the related app, information regarding the actual activity undertaken is then communicated to fundraising system 10 in order to correlate these physical activities with the fundraising campaign, as generally discussed above. This status information is consistently communicated back to mobile device 304 (from system 10) so that current and up-to-date information is displayed to a user/athlete. This update is illustrated best by comparing FIGS. 19C and 19D wherein a user has traveled seven (7) miles, resulting in a related donation amount of $305.

As discussed above, the fundraising system 10, and the general focus of the contemplated campaign, involves a meaningful result or meaningful purpose, which may include things such as meals for needy individuals, or number of students assisted at a school. The translation from money to these meaningful results can be illustrated in the mobile app by display of appropriate icons and/or messages. For example, FIG. 19B illustrates that 525 meals have been provided and 52 students have been assisted.

Figure 19E:
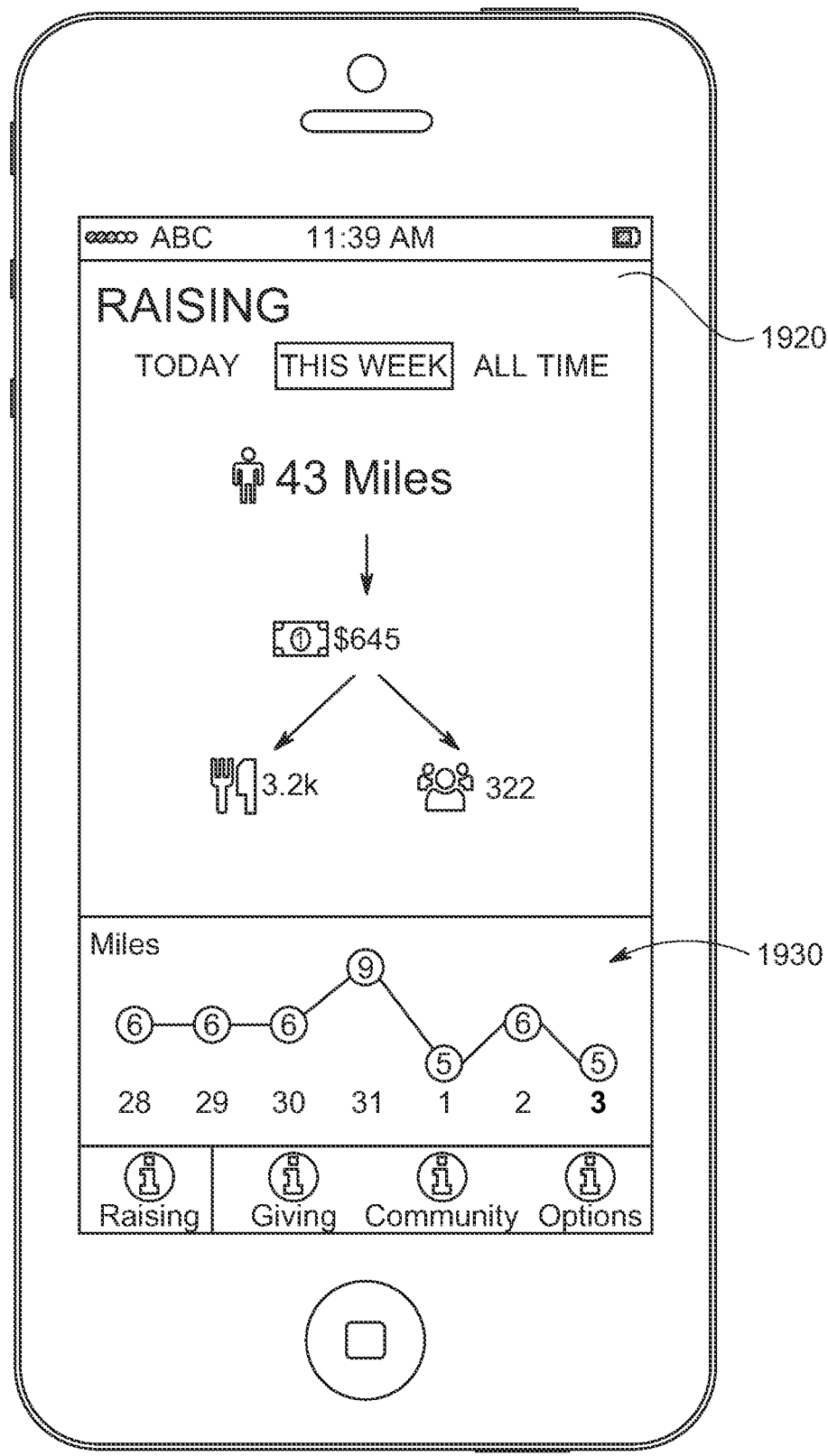
Figure 19F:
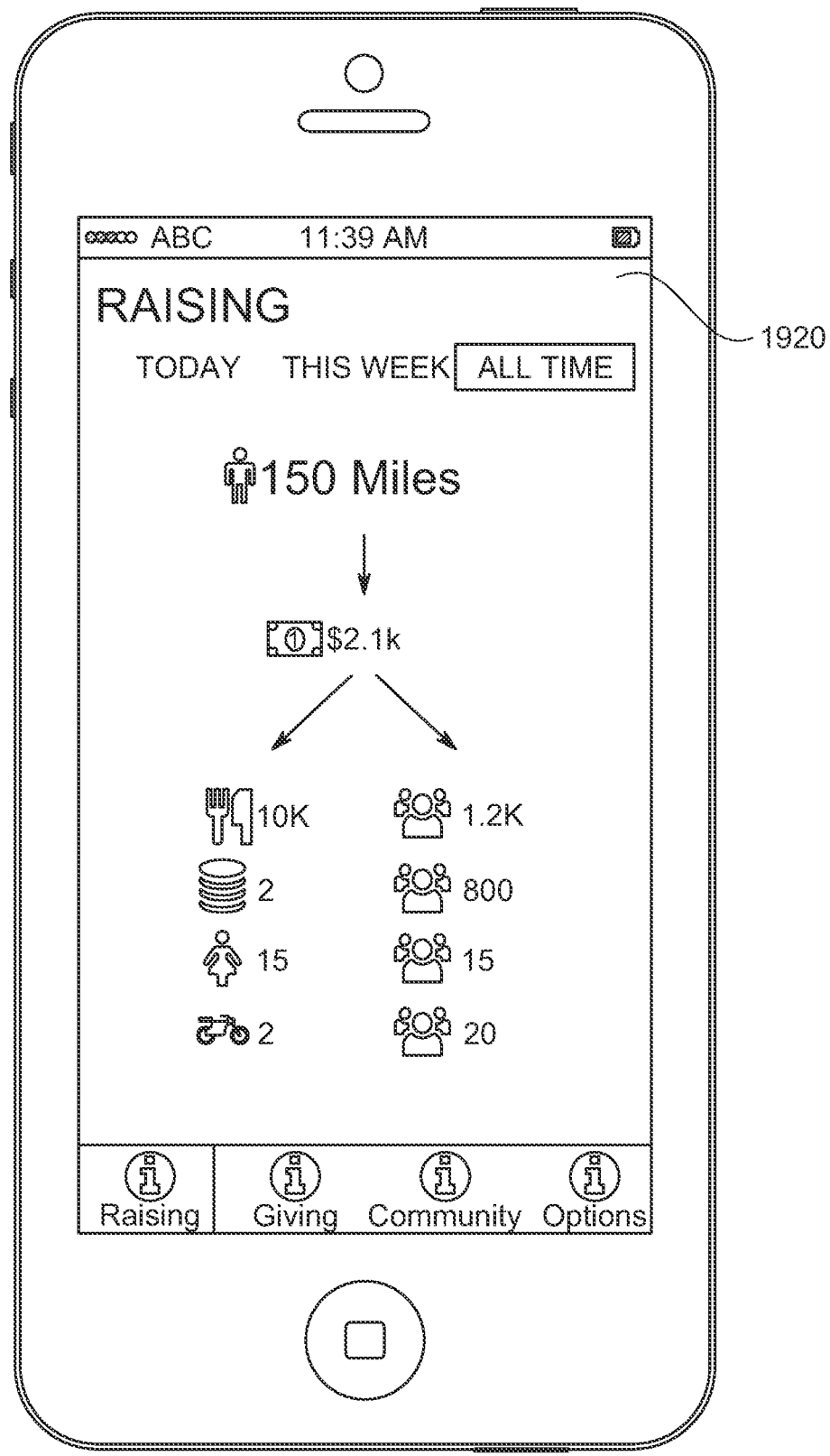

As mentioned above, time selection tool 1916 is provided to users of the mobile app. In FIGS. 19B through 19D, the "today" timeframe has been selected. As will be appreciated based upon this title, this selection results in information related to today's activities being displayed. Referring to FIG. 19E, the "this week" timeframe has been selected. As is shown, the display changes to show an up-to-date summary of the week's activities (see, FIG. 19D). In this case, 43 miles have been progressed by the user, and $645 has been raised. Again, this translates to 3.2 thousand meals, and 322 students assisted. Further, a weekly tracking grid 1930 is provided at the bottom of this display, which illustrates the user's activities. Similarly, in FIG. 19F, the "all time" timeframe has been selected. Again, this then presents the user with a cumulative, report based on their various activities showing all activities and the related meaningful impact provided.

Figure 19G:
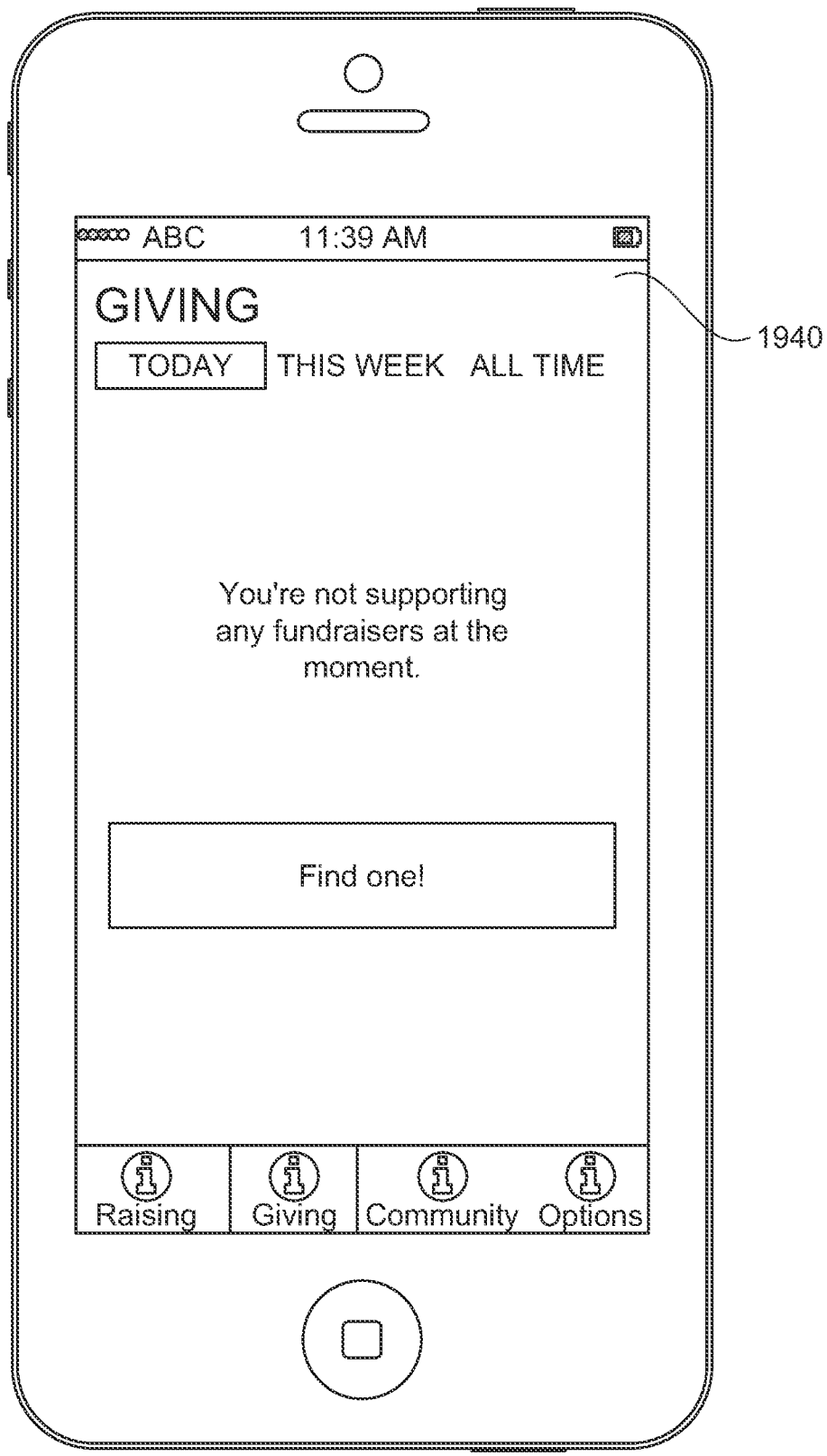

As mentioned above, various menu options 1918 are provided to the user at the bottom of display screen 1902. FIG. 19G illustrates an example of the display when the "giving" menu has been selected. It is contemplated that this portion of the mobile app will be utilized by those users wishing to make donations to various causes or campaigns. Turning specifically to FIG. 19G, a screen is presented to allow a user to search and find various fundraisers or campaigns which are ongoing. Typically, it is contemplated that the user will know certain details related to the fundraiser they are looking for, thus, the searching process should be straight forward. Naturally, various tools can be provided to the user to accomplish this searching feature. Most importantly, this will require appropriate communication between mobile device 304 and fundraising system 10 so that up-to-date and current information can be provided.

Figure 19H:
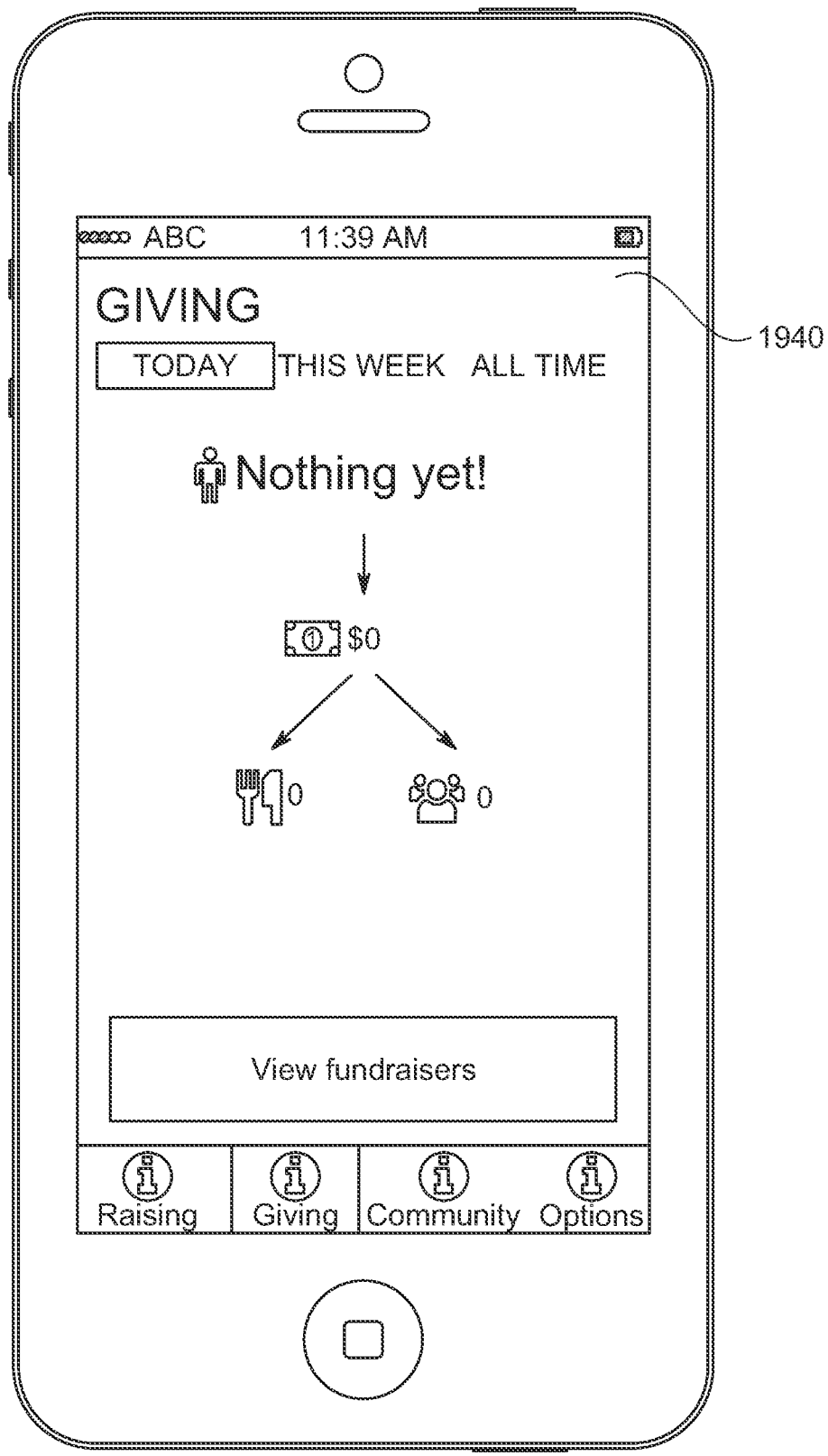

Next, FIG. 19H illustrates a giving display screen, once the desired fundraiser has been selected. It is anticipated that this will closely mirror the above-mentioned "raising" screen, and will provide information to donors about the participant's/athlete's activities. This display can be presented to the donor, thus giving them the ability to easily track donations and activities. As shown, this will include information about activities, and the related impact.

Figure 19I:
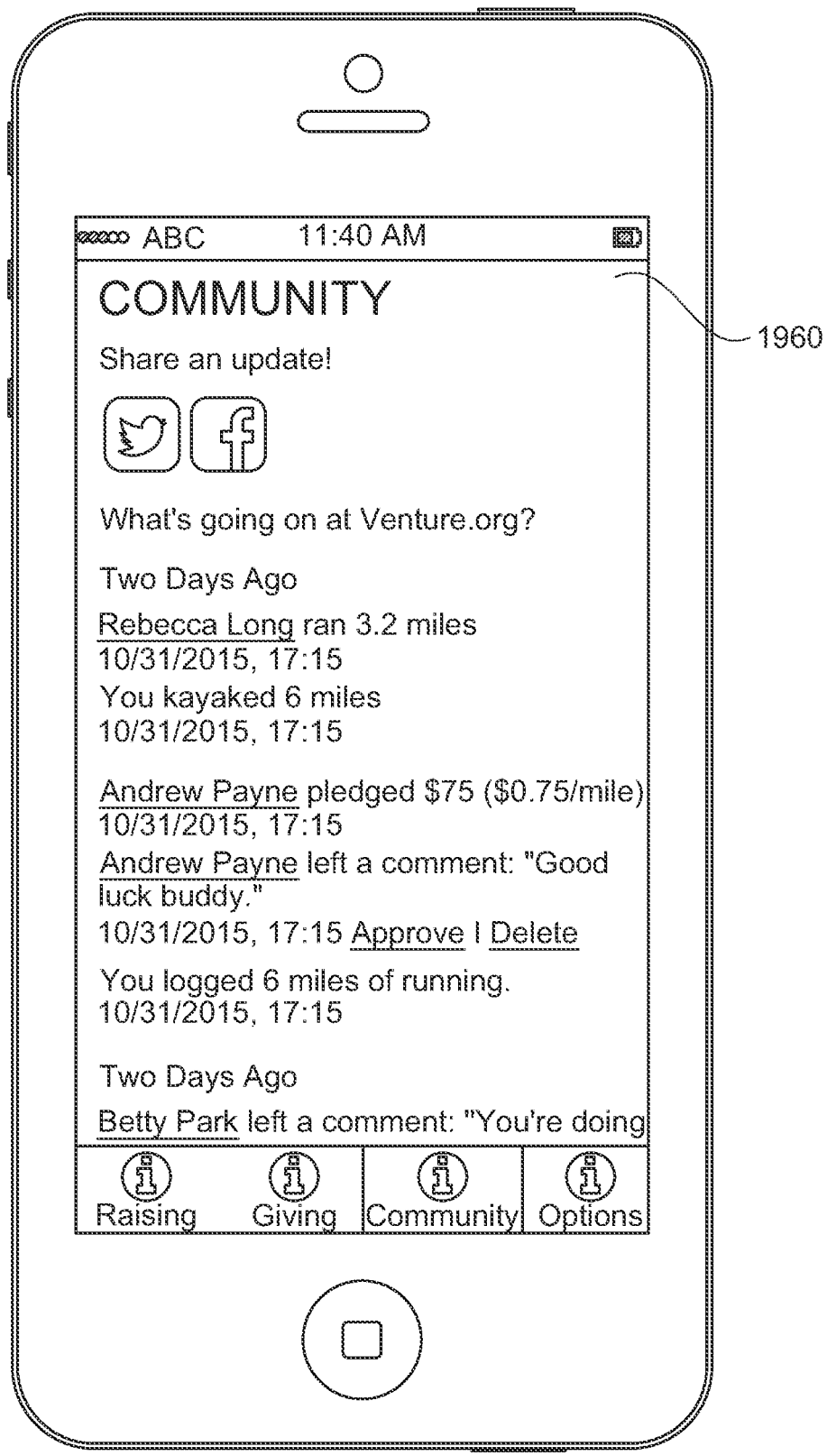

Also mentioned above, the menu options 1918 include a "community" option. Community screen 1960 is illustrated in FIG. 19I. This screen will generally provide information related to the various organizations, campaigns or activities which the user is involved in. Since the mobile app will closely communicate with the fundraising system 10, current and up-to-date information is readily available.

Lastly, as illustrated, menu options 1918 includes an "options" button. Here, options may involve various settings for the mobile app, such as its correlation to social media and other systems. Further, the user will be allowed to select certain notifications they may wish to receive. That said, one significant option is the ability of the mobile app to be correlated with other exercise or calorie-tracking apps. This option will allow for the tracking of activities, along with the potential use of features already existing in these related exercise or calorie-tracking tracking apps. Again, this correlation will provide the mobile device 304 with the ability to track movement and activity, as it relates to fundraising activities, and effectively update the fundraising system, in a manner which is not readily available.

While particular user interfaces or screenshots are not provided for each module or possible variation of the system, those skilled in the art will clearly appreciate that the implementation details, especially given the amount of automated information provided by the system can take on many different forms. Additionally, various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A method for allowing a user to participate in fundraising activities for a charitable organization using a Global Positioning System (GPS) enabled mobile computing device in communication with a fundraising system, the method comprising:

downloading an application to the mobile computing device, the application configured to cause a processor within the mobile computing device to communicate with a transceiver, a GPS tracking system and an interactive display;

inputting, via the interactive display, user information comprising personal information, a cause to support the charitable organization and a fundraising activity to be undertaken;

transmitting, via the transceiver, the user information to the fundraising system which will cause the fundraising system to publish the user information as part of a crowdfunding campaign and receive donations from a donor and collect related donation information, wherein the donation information comprises a pledge rate directly related to the fundraising activity received from the donor and financial account information related to the donor;

the mobile computing device receiving donation information from the fundraising system;

presenting, on the interactive display, tools for the user to recording the fundraising activity, wherein the tools comprise a start button to allow the user to initiate the start of fundraising activities, and a stop button to allow the user to indicate an end of the fundraising activities;

tracking the fundraising activities of the user after the start button has been initiated and until the stop button has been initiated using signals received from the GPS tracking system of the mobile computing device, wherein the signals received from the GPS tracking device are indicative of an ongoing distance traveled by the user as tracked by the mobile computing device, and presenting the user with a real time calculation of an ongoing fundraising amount on the interactive display as the user participates in the fundraising activity, wherein the ongoing fundraising amount is dependent upon the pledge rate;

transmitting to the fundraising system, activity information indicative of the fundraising activity as the user participates in the fundraising activities, thereby causing the activity information to be published as part of the crowdfunding campaign in real time as the user participates in the fundraising activity;

after the stop button has been initiated, the processor recording a total distance traveled which is equal to the ongoing distance when the stop button was initiated and generating fundraising calculation information comprising a calculated pledge due amount which is dependent upon the pledge rate and the total distance traveled;

transmitting the fundraising calculation information to the fundraising system thereby causing the fundraising system to publish the fundraising calculation as part of the crowdfunding campaign; and the fundraising system collecting the calculated pledge amount due directly from the donor using the financial account information related to the donor without any further involvement by the donor, wherein the financial mechanism allows for direct collection of the calculated pledge after completion of the fundraising activity.

2. The method of claim 1 wherein the publication is achieved via a social media system that accommodates publication to third parties.

3. The method of claim 1 wherein the publication achieved via a website system managed by the fundraising system.

4. The method of claim 1 wherein the processor is further configured to transmit the user information to a social media platform, and to allow publication of the cause, an additional supporting statement by the user, the real time pledge amount and the calculated pledge amount as the user carries out the physical activity.

5. The method of claim 1 wherein the fundraising activity is selected from the group of running, walking, hiking, biking, swimming, skiing and skating, and the GPS tracking system of the mobile computing device is configured to track a distance traveled, a route followed and an activity time.

6. The method of claim 5 wherein the fundraising system receives a plurality of donations from a plurality of donors, and the donation information transmitted to the user comprises an aggregate pledge rate for all donations, and wherein the ongoing fundraising amount and the fundraising calculation information is based upon the aggregate pledge rate.

7. The method of claim 1 wherein the user information further comprises a user promotion statement generated by the user, which is published by fundraising system.

8. The method of claim 1 wherein multiple users are in communication with the fundraising system to simultaneously participate in the fundraising activity, and wherein real-time information related to each of the multiple users is published as part of the crowdfunding campaign.

* * * * *